(12) United States Patent
Lisseman et al.

(10) Patent No.: US 11,713,048 B2
(45) Date of Patent: Aug. 1, 2023

(54) INTEGRATION OF OCCUPANT MONITORING SYSTEMS WITH VEHICLE CONTROL SYSTEMS

(71) Applicant: Joyson Safety Systems Acquisition LLC, Auburn Hills, MI (US)

(72) Inventors: Jason Carl Lisseman, Utica, MI (US); Len Cech, Brighton, MI (US); Blaine Dolcetti, Oxford, MI (US)

(73) Assignee: Joyson Safety Systems Acquisition LLC, Auburn Hills, MI (US)

( * ) Notice: Subject to any disclaimer, the term of this patent is extended or adjusted under 35 U.S.C. 154(b) by 0 days.

(21) Appl. No.: 15/974,232

(22) Filed: May 8, 2018

(65) Prior Publication Data

US 2018/0319407 A1 Nov. 8, 2018

Related U.S. Application Data

(60) Provisional application No. 62/591,896, filed on Nov. 29, 2017, provisional application No. 62/502,874, filed on May 8, 2017.

(51) Int. Cl.
*B60W 50/00* (2006.01)
*G05D 1/00* (2006.01)
(Continued)

(52) U.S. Cl.
CPC ........ *B60W 50/0098* (2013.01); *B60W 10/20* (2013.01); *B60W 10/30* (2013.01);
(Continued)

(58) Field of Classification Search
CPC .. B60W 50/0098; B60W 10/20; B60W 50/14; B60W 10/30; B60W 2540/00;
(Continued)

(56) References Cited

U.S. PATENT DOCUMENTS 6,476,857 B1 11/2002 Agatsuma et al.
7,380,951 B2 6/2008 Plaster
(Continued)

FOREIGN PATENT DOCUMENTS

WO 2016009123 1/2016
WO 2016092796 A1 6/2016

OTHER PUBLICATIONS

International Search Report and Written Opinion conducted in corresponding International Application No. PCT/US2018/031601, dated Aug. 30, 2018.
(Continued)

*Primary Examiner* — Jess Whittington
(74) *Attorney, Agent, or Firm* — Meunier Carlin & Curfman LLC

(57) ABSTRACT

The disclosed method is stored as computer readable instructions and carried out by a processor that is part of a disclosed occupant monitoring system (OMS). The method starts with the receipt of an external signal by the processor. The external signal can be the starting of the vehicle engine, an indication of semi-autonomous or autonomous driving mode, or an indication that the occupant is seated, is in contact with a steering wheel, and/or is in contact with at least one dashboard control. The receipt of the external signal causes the processor to capture an image, analyze the image to determine if at least one monitoring condition is met, generate an adjustment signal if the monitoring condition is not met, and communicate the adjustment signal to at least one VCS, and repeating the monitoring loop. In some implementations, multiple images are captured and analyzed during the cycling of a monitoring loop.

19 Claims, 32 Drawing Sheets

(51) Int. Cl.
*B60W 50/14* (2020.01)
*B60W 10/20* (2006.01)
*B60W 10/30* (2006.01)
*G06V 20/59* (2022.01)
*H04L 67/12* (2022.01)

(52) U.S. Cl.
CPC .......... *B60W 50/14* (2013.01); *G05D 1/0088* (2013.01); *G06V 20/593* (2022.01); *G06V 20/597* (2022.01); *B60W 2420/42* (2013.01); *B60W 2540/00* (2013.01); *H04L 67/12* (2013.01)

(58) Field of Classification Search
CPC .......... B60W 2420/42; G06K 9/00838; G06K 9/00845; G05D 1/0088; H04L 67/12
See application file for complete search history.

(56) References Cited

U.S. PATENT DOCUMENTS

| | | |
|---|---|---|
| 7,756,618 B2 | 7/2010 | Mizusawa |
| 8,264,531 B2 | 9/2012 | Jung et al. |
| 8,391,554 B2 * | 3/2013 | Lee .................. G06V 40/19 |
| | | 382/104 |
| 8,676,450 B2 | 3/2014 | Kohara |
| 8,702,250 B2 | 4/2014 | Raz et al. |
| 9,041,789 B2 | 5/2015 | Schamp |
| 9,150,238 B2 | 10/2015 | Alcazar et al. |
| 9,201,424 B1 | 12/2015 | Ogale |
| 9,342,074 B2 * | 5/2016 | Dolgov ................. B60W 50/14 |
| 2001/0029416 A1 * | 10/2001 | Breed .................. B60N 2/0248 |
| | | 340/5.2 |
| 2006/0208169 A1 | 9/2006 | Breed et al. |
| 2006/0267780 A1 | 11/2006 | Adams et al. |
| 2012/0002028 A1 | 1/2012 | Takahashi et al. |
| 2013/0286204 A1 | 10/2013 | Cheng |
| 2013/0325264 A1 * | 12/2013 | Alcazar ................. B62D 1/181 |
| | | 701/49 |
| 2014/0093133 A1 * | 4/2014 | Frank .................... B60R 21/015 |
| | | 382/104 |
| 2015/0156383 A1 | 6/2015 | Biemer et al. |
| 2016/0185354 A1 | 6/2016 | Lisseman et al. |
| 2016/0264131 A1 | 9/2016 | Chan et al. |
| 2017/0050542 A1 * | 2/2017 | Shigeta .............. G02B 27/0149 |
| 2017/0057090 A1 * | 3/2017 | Fukuda .................. B25J 9/1697 |
| 2018/0093675 A1 * | 4/2018 | Holub ................... B60W 50/14 |
| 2018/0126986 A1 * | 5/2018 | Kim ..................... B60W 30/12 |
| 2018/0208319 A1 * | 7/2018 | McCarley ............. B33Y 10/00 |
| 2022/0283796 A1 * | 9/2022 | McFarland, Jr. ....... H04W 4/44 |

OTHER PUBLICATIONS

Extended European Search Report issued in EP application No. 18798061.0; dated Jan. 12, 2021; 8 pages.

* cited by examiner

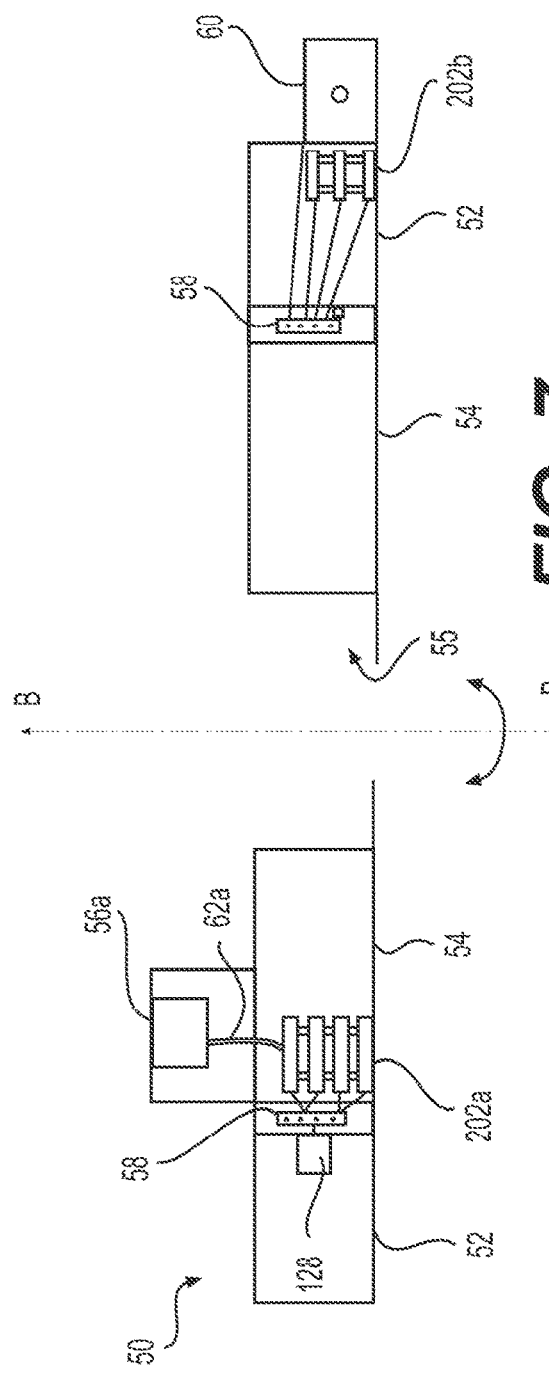
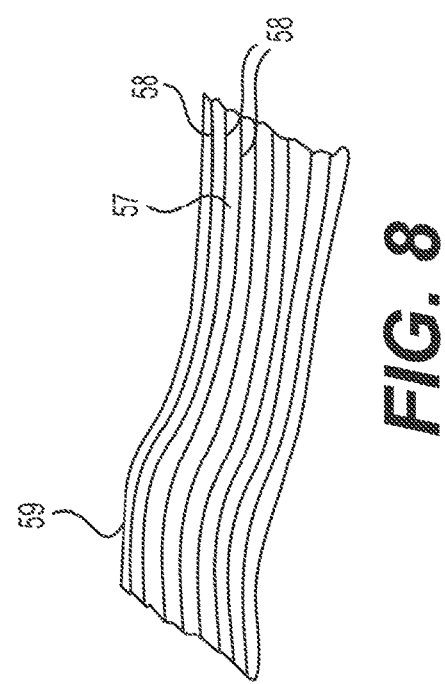

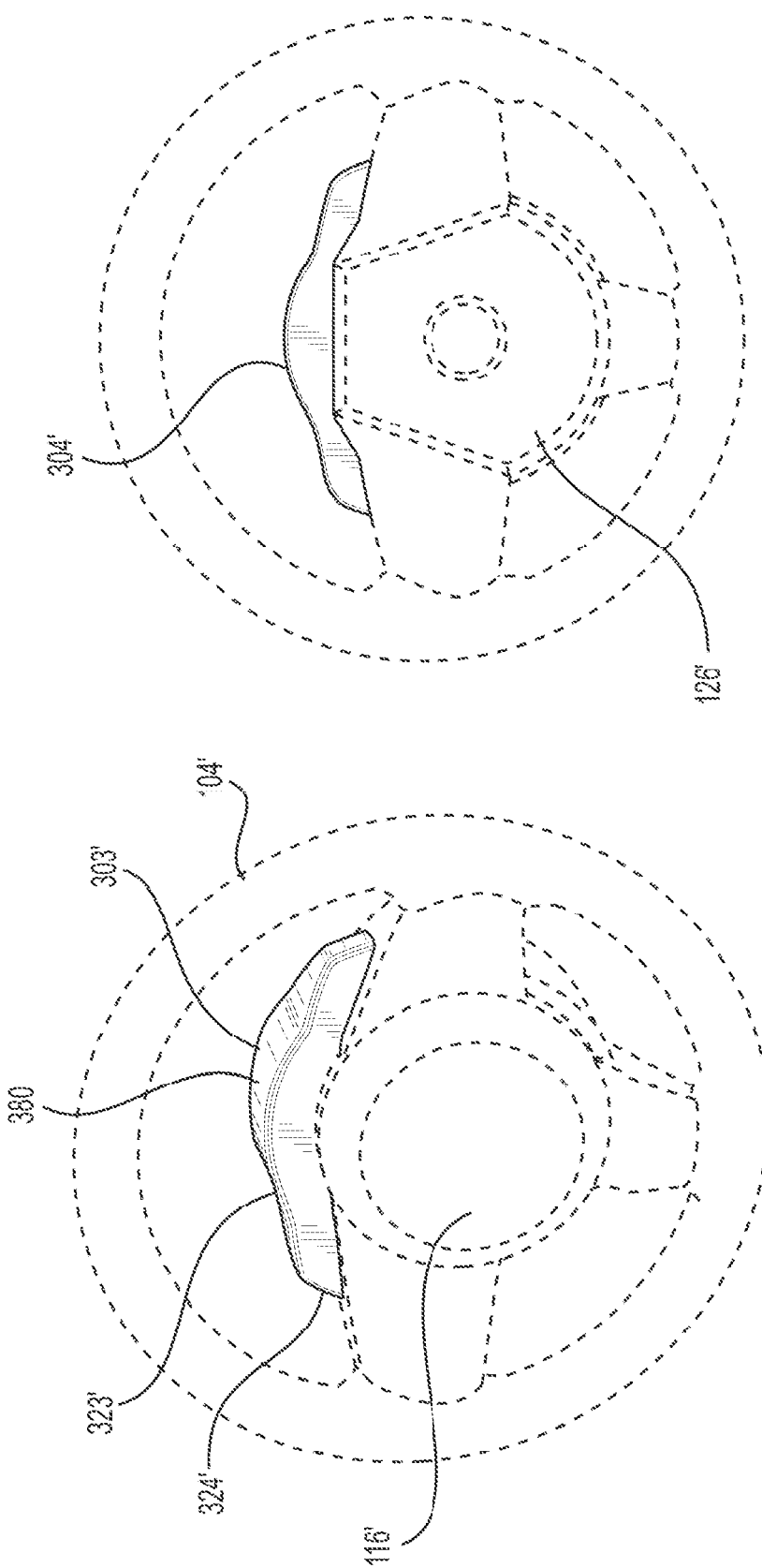

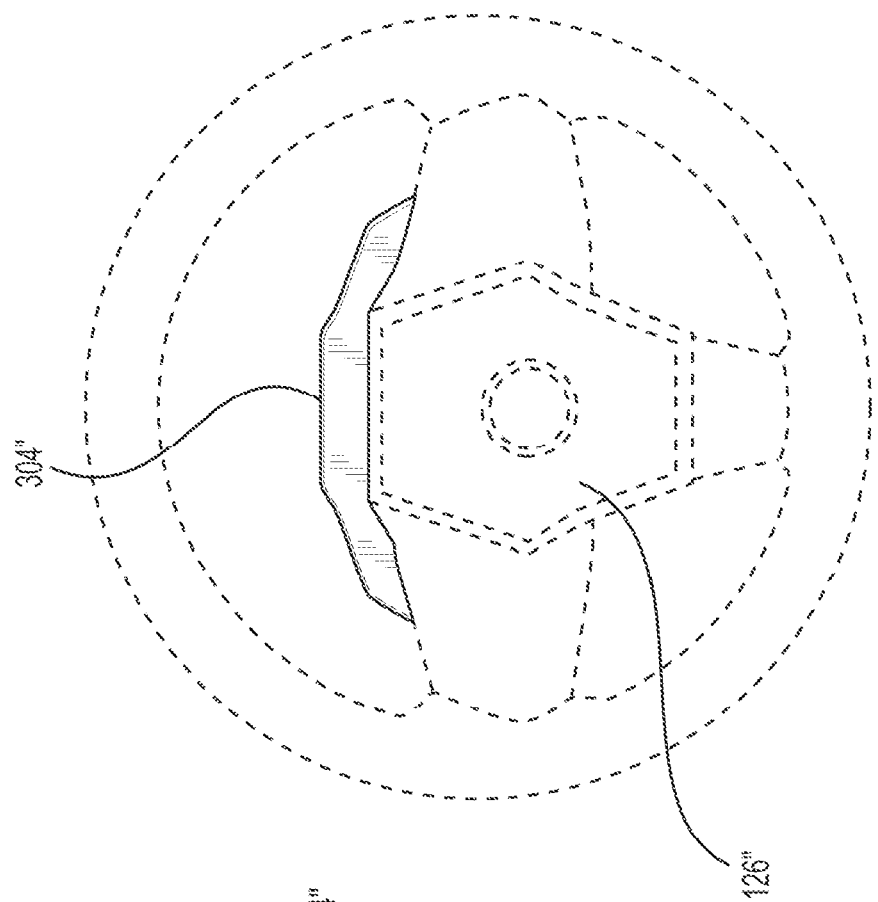
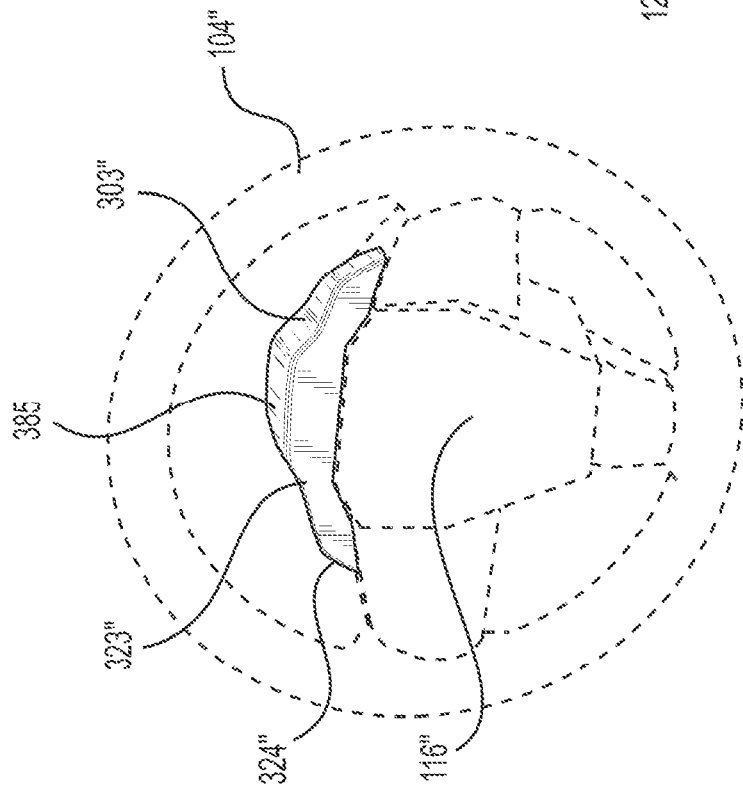
FIG. 19A
FIG. 19B

INTEGRATION OF OCCUPANT MONITORING SYSTEMS WITH VEHICLE CONTROL SYSTEMS

CROSS REFERENCE TO RELATED APPLICATIONS

This claims the benefit of U.S. Provisional Application No. 62/502,874, filed May 8, 2017. This application also claims the benefit of U.S. Provisional Application No. 62/591,896, filed Nov. 29, 2017. Each of these applications are incorporated by reference in their entireties for all purposes.

TECHNICAL FIELD

This disclosure generally relates to an occupant monitoring system. More specifically, this disclosure relates to a vehicle steering assembly including an occupant monitoring system.

BACKGROUND

Various advanced driver assistance systems incorporate visual, acoustic, and/or sensor warnings. Many of these warnings are in response to outside dangers (e.g., proximity of another object). However, in recent times, the number of potential distractions inside the cabin for a driver or other occupant has increased (e.g., mobile phones, mp3 players, internal displays, etc.). Thus, there is a need in the art to warn or alert the driver or other occupant when the driver or other occupant is detected to be in a non-alert state.

SUMMARY

Disclosed herein are methods and systems for monitoring at least one vehicle occupant. The method is stored as computer readable instructions and carried out by a processor that is part of an occupant monitoring system (OMS). The method starts upon receipt of an external signal by the processor. The processor is in communication with an imaging unit, a memory, and one or more vehicle control systems disposed within the vehicle. The processor executes computer-readable instructions, stored on the memory, that cause the processor to capture an image within the field of view of the imaging unit, analyze the image to determine if at least one monitoring condition is met, and generate an adjustment signal if the monitoring condition is not met. The external signal, can be, for example, the starting of the vehicle engine. Alternatively, the external signal can be from a vehicle control system (VCS) indicating that the vehicle is operating in semi-autonomous or autonomous driving mode. In some implementations, the external signal indicates the occupant is in a seat, is in contact with a steering wheel, and/or is in contact with at least one dashboard control. In some implementations, the receipt of the external signal initiates or causes a continuation of the cycling of a monitoring loop. The monitoring loop goes through the steps of capturing an image in the field of view (FOV) of the imaging unit, analyzing the image to determine if at least one monitoring condition is met, generating an adjustment signal if the monitoring condition is not met, and repeating the monitoring loop. In some implementations, the monitoring loop can be repeated continuously without input from an occupant.

The monitoring condition can include at least one of the following criteria: the presence of the occupant in the FOV, the position of the occupant within the FOV, the proximity of the occupant to the imaging unit, the area of the occupant's face, and/or the angle of the occupant's face. In some implementations, an occupant dataset can be generated based on the captured image, wherein data of the occupant dataset includes at least one value pertaining to the presence of the occupant in the FOV, the position of the occupant within the FOV, the proximity of the occupant to the imaging unit, the area of the occupant's face, and/or the angle of the occupant's face. The processor can compare the occupant dataset to a monitoring conditions dataset, and generate an adjustment signal based on deviations from the monitoring conditions dataset. In some implementations, the adjustment signal can be communicated to at least one VCS. In some implementations, the processor can store the occupant dataset to the memory with a time stamp, such that newer occupant dataset values can be compared to older occupant dataset values.

In some implementations, the external signal can be associated with the start of the vehicle engine. Upon starting the vehicle engine, the processor can generate and communicate an alert signal to an occupant if the monitoring condition is not met, either based on the analysis of a single image, or after an analysis of several images from a predetermined number of monitoring loops. This alert signal can be, for example, a seat or a seat belt vibration. In some implementations, the external signal can be a request to check at least one monitoring condition for compatibility with semi-autonomous or autonomous driving mode. If the monitoring condition is met, the processor can generate and communicate an authorization signal to a VCS to initiate semi-autonomous or autonomous driving mode. If the monitoring condition is not met, the processor can generate and communicate a prohibition signal to a VCS to prohibit semi-autonomous or autonomous driving mode. If the monitoring condition is not met, the computer-readable instructions can cause the processor to generate and communicate to a VCS a restriction signal that reduces the occupant's ability to adjust the seat and/or steering wheel.

In some implementations, the starting of the vehicle engine initiates a method of setting steering assembly position boundaries. The boundaries are set based on whether at least one monitoring condition is met over a range of possible steering assembly positions. In this method, receipt of the signal that the engine has started can cause the processor to calculate steering assembly position boundaries based on one or more image analyses (for example, those acquired during the repetition of the monitoring loop). Movement of the steering assembly is then restricted to positions within the steering assembly position boundaries. In some implementations, restricting the movement of the steering assembly occurs prior to enabling movement of the vehicle.

In some implementations, the external signal comes from a VCS, and indicates that the vehicle is currently operating in a semi-autonomous or autonomous driving mode. The processor can communicate an occupant-preferred position signal associated with an occupant preferred position associated with semi-autonomous or autonomous driving mode to a seat positioning system and/or a steering assembly positioning system. The seat positioning system and/or steering assembly positioning system can adjust the seat and/or steering unit position to the occupant preferred position associated with the occupant-preferred position signal associated with semi-autonomous or autonomous driving mode. During semi-autonomous or autonomous driving mode, the processor can also determine if the monitoring condition is met, and generate and communicate an alert signal to the occupant if the monitoring condition is not met after analysis of a single image, or after analysis of several images captured during a predetermined number of monitoring loops.

While the vehicle is operating in semi-autonomous or autonomous driving mode, the processor can receive a signal from at least one vehicle control system indicating that the vehicle is entering an occupant-controlled driving mode, and end the monitoring loop in response to receiving the occupant-controlled driving mode signal. In some implementations, the processor may detect a discontinuation of the semi-autonomous or autonomous driving mode signal from the vehicle control system, and end the monitoring loop in response to detecting the discontinuation of the semi-autonomous or autonomous driving mode signal. In response to receiving the signal that the vehicle is entering occupant-controlled driving mode, the processor may generate an occupant-controlled driving signal and communicate an occupant-preferred position signal associated with occupant-controlled driving mode to a seat positioning system and/or a steering assembly positioning system. The seat positioning system and/or steering assembly positioning system can adjust the seat and/or steering unit position to an occupant preferred position associated with the occupant preferred position signal.

In some implementations, the processor can receive a signal from the occupant to discontinue the semi-autonomous or autonomous driving mode signal. The signal from the occupant to discontinue the semi-autonomous or autonomous driving mode can be sent to the processor from a VCS or a user interface. The processor can be configured to accept occupant inputs from a user interface. The occupant inputs can include a user identification signal, occupant height, occupant weight, and/or occupant's desire for the vehicle to enter a semi-autonomous or autonomous driving mode, and/or the occupant's desire for the vehicle to enter an occupant-controlled driving mode. The processor can, upon receiving these inputs, generate and communicate an adjustment signal to a VCS, such as a seat positioning system or a steering assembly positioning system. In some implementations, the user interface is configured to generate and communicate an external signal to the processor. The external signal can be, for example, a request to check the monitoring conditions for compatibility with semi-autonomous or autonomous driving mode or to discontinue semi-autonomous or autonomous driving mode.

In some implementations, the external signal indicates that the occupant is in a seat. The external signal can, for example, indicate that the occupant is in contact with a steering wheel, or that the occupant is in contact with at least one dashboard control.

The imaging unit can, in some implementations, be fixed to one of a steering wheel, a steering column, or a dashboard. To maximize the area captured in the field of view, the imaging unit can include a wide angle lens or an articulating lens, or can be fixed to an articulating camera mount structure.

The details of one or more implementations of the invention are set forth in the accompanying drawings and the description below. Other features, objects, and advantages of the invention will be apparent from the description and drawings, and from the claims.

DESCRIPTION OF DRAWINGS

The device is explained in even greater detail in the following drawings. The drawings are merely exemplary to illustrate the structure of preferred devices and certain features that may be used singularly or in combination with other features. The invention should not be limited to the examples shown.

FIG. 7 is a side cut out view of the clock spring shown in FIG. 6 as viewed along the C-C line.

FIG. 8 is a perspective view of a wire ribbon according to one implementation.

FIGS. 18A and 18B are front perspective and rear views, respectively, of a housing according to another implementation.

FIGS. 19A and 19B are front perspective and rear views, respectively, of a housing according to yet another implementation.

Like reference symbols in the various drawings indicate like elements.

DETAILED DESCRIPTION

Certain exemplary implementations of the invention will now be described with reference to the drawings. In general, such implementations relate to an occupant monitoring system (OMS) for monitoring occupants in a vehicle via one or more imaging units. For example, in various implementations, the OMS includes an imaging unit, such as a camera, that is coupled to a rotating portion of a steering wheel assembly, such as the central hub portion. The imaging unit has a field of view directed toward one or more occupants in the vehicle and is configured to capture an image signal corresponding to an imaging area in the field of view. The imaging area can be configured to encapsulate an expected position of the occupant, for example. The OMS also includes one or more processing units in electrical communication with the imaging unit that receives and processes the image signal from the imaging unit to determine an occupant state and, in some implementations, provide feedback (e.g., output) based on the determined occupant state. In some implementations, a monitoring loop continuously monitors drivers or other occupants. This monitoring loop is particularly useful, for example, when the vehicle is operating in a semi-autonomous or autonomous driving mode. The processing unit uses information gathered during the monitoring loop to send adjustment signals to vehicle control systems, such as the seat positioning or steering assembly positioning systems, ensuring that the occupant is continuously positioned in the optimal spatial region for monitoring by the OMS.

Figure 1A:
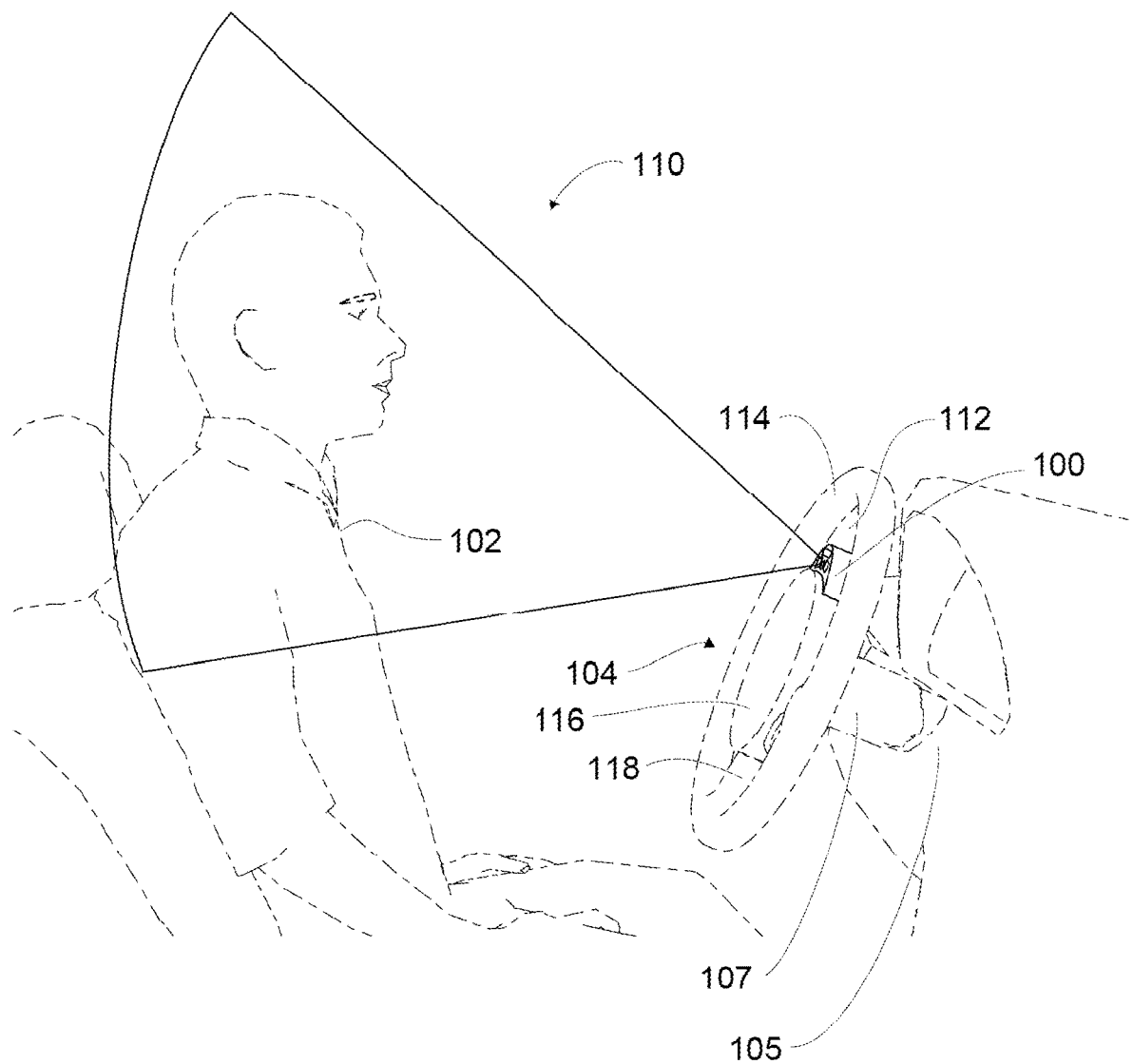
FIGS. 1A and 1B are schematic views of exemplary occupant monitoring systems.

FIG. 1A is a schematic view of an exemplary occupant monitoring system (OMS) 100 for monitoring a driver 102 or other occupant in a vehicle. In this implementation, the OMS 100 may be coupled to the vehicle's steering wheel assembly 104. The OMS 100 and/or the steering wheel assembly 104 can be configured to rotate relative to the vehicle's steering column 106. The steering wheel assembly 104 can be coupled to the vehicle's steering input shaft 107, steering column 106, or any other vehicle component used to translate driver input to control instructions for the vehicle (e.g., including drive by wire technology). For example, as illustrated in FIG. 1A, the steering wheel assembly 104 can be coupled to the vehicle's steering input shaft 107 that is in turn coupled to the vehicle's steering column 106.

The steering column 106 can be a non-rotating component within the vehicle. In some implementations, the steering column 106 may include a tilt and/or extension mechanism (e.g., a telescopic mechanism) that allows for the adjustment of the steering wheel assembly 104 closer to, away from, or at a different angle relative to the driver or other occupant. The tilt/extension mechanism may be referred to as "tilt and telescope" or "reach and rake," for example.

In some implementations, the steering column 106 can receive the steering shaft 107 that extends along a steering axis and serves to translate rotational movement of the steering wheel assembly 104 to the wheels of the vehicle. Rotational movement of the steering wheel assembly 104 can be transmitted to the wheels by mechanical and/or electrical means.

Figure 1B:
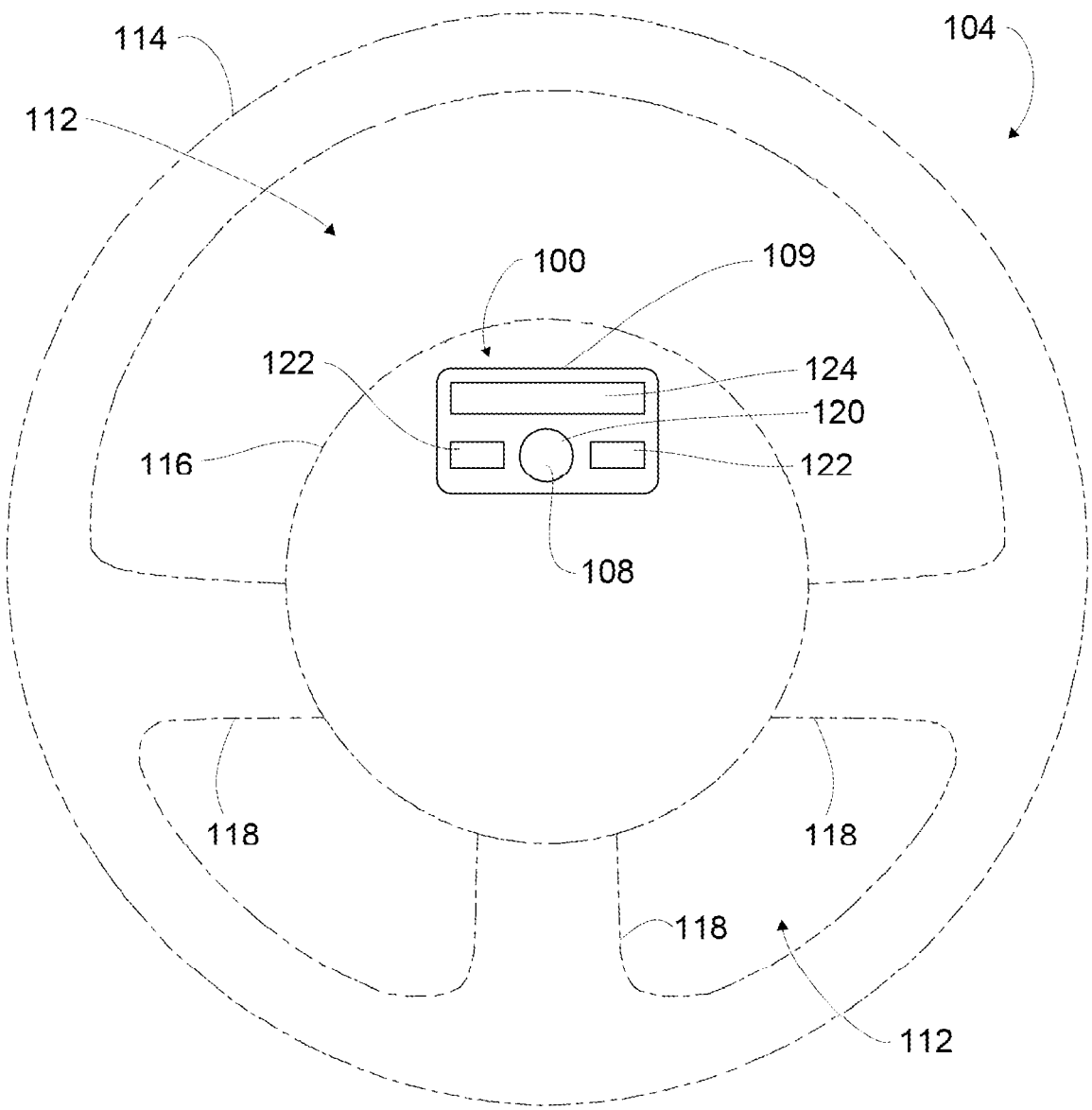

As illustrated in the exemplary system shown in FIG. 1B, the steering wheel assembly 104 includes a rim 114 and a hub 116. The steering wheel assembly 104 can also include at least one spoke 118 connecting the rim 114 to the hub 116. The rim 114 can comprise a single continuous portion or any number of unique sections that the driver can grip to facilitate control of the vehicle. For example, the rim 114 can include an annular ring shape with an outer contour that is essentially circular in shape. In alternate implementations, the rim 114 can define any suitable shape including, for example, circular, elliptical, square, rectangular, semi-circular, semi-elliptical, or any other regular or irregular shape. In addition, in some implementations, the rim may include two or more semi-circular, semi-elliptical, semi-rectangular, or other regular or irregular shaped portions coupled to the hub. For example, in one implementation, the rim may include two semi-circular rim sections coupled to the hub (e.g., resembling a flight yoke). The hub 116 can be disposed central to the rim 114. The hub 116 can provide the connection point between the steering wheel assembly 104 and the vehicle's steering shaft 107/steering column 106.

As illustrated in implementations shown in FIGS. 1A and 1B, the OMS 100 is coupled to a central portion 112 of the steering wheel assembly 104. The central portion 112 can include, for example, the spoke 118, the hub 116, and/or any other portion of the steering wheel assembly 104 centrally located with respect to the rim 114. As used herein "and/or" includes implementations having element A alone, element B alone, or elements A and B taken together. For example, the central portion 112 can include the spoke 118 and/or the hub 116 is meant to include implementations wherein the central portion 112 includes the spoke 118, the hub 116, or the spoke 118 and the hub 116.

Coupling and integrating the OMS 100 with the central portion 112 of the steering wheel assembly 104 can allow for increased viewing angles and improved resolution of the imaging area by an imaging unit 108 of the OMS 100 of the driver 102 and/or other vehicle occupant regardless of the rotation of the steering wheel assembly 104. For example, if the OMS 100 were mounted to a non-rotating component, such as the steering column 106, the OMS 100 view of the driver 102 or occupant could be obscured by the spoke(s) 118 when the steering wheel assembly 104 is rotated, or by the rim 114 by being positioned rearwards in relation to the steering wheel assembly 104. In addition, mounting the OMS 100 to a non-rotating component of the vehicle would increase the distance between the imaging unit 108 and the occupants in the vehicle. However, in some implementations, the imaging unit 108 is mounted on the steering column 106. In still other implementations, the imaging unit 108 is mounted to the dashboard of the vehicle or other stationary portion of the vehicle.

In addition, the central portion 112 of the steering wheel assembly 104 in a vehicle can also contain an airbag. Generally, the driver knows to position his/her hands and/or body in certain positions relative to the steering wheel assembly 104 for safety due to the airbag. Coupling the OMS 100 to the central portion 112 of the steering wheel assembly 104 can also take advantage of this conditioned driver positioning and minimizes the likelihood of the driver 102 obscuring the OMS 100.

Furthermore, one or more components of the OMS 100 may be mounted to the rim 114 in some implementations. For example, as described more below, a light source for illuminating at least a portion of a field of view of the imaging unit 108 may be included in a light bar system disposed on the rim 114. However, by mounting components of the OMS 100 to the central portion 112, the OMS 100 components may be less likely to be obscured by the driver's hands during normal operation of the vehicle.

Furthermore, the three-dimensional position of the steering wheel assembly 104 in a vehicle (e.g., height, angle, tilt, etc.) is usually adjustable to accommodate a wide range of drivers and/or other vehicle occupants (e.g., drivers or occupants of varying heights, weights, proportions, ages, ethnicities, genders, experience, etc.). Incorporation of the OMS 100 into the steering wheel assembly 104 can allow for the OMS 100 to take advantage of this adjustment, and therefore accommodate a wide range of drivers and/or other vehicle occupants and driver and/or occupant positions.

As noted above, the OMS 100 includes at least one imaging unit 108 configured to capture an image signal corresponding to an imaging area 110 in the vehicle. The imaging area 110 may include the field of view of the imaging unit 108 or a portion thereof. The image signal, for example, can comprise an optical representation of an instant value of the imaging area 110. The image can be a two dimensional or a three dimensional image. In some implementations, the imaging area 110 can be configured to encapsulate an expected position of the driver 102 and/or other vehicle occupant. The imaging unit 108 can be configured for rotating with the steering wheel assembly 104 of the vehicle. In various implementations, the imaging unit 108 can be disposed on any portion of the central portion 112 of the steering wheel assembly 104.

Figure 2A:
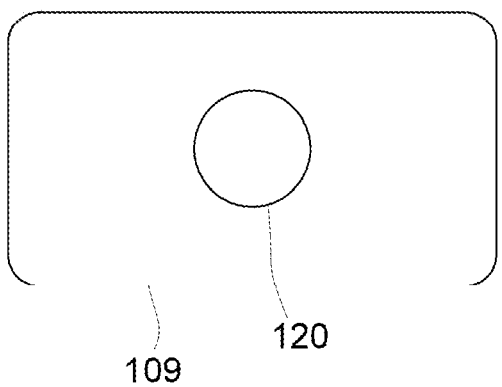
FIGS. 2A-F are schematic views of exemplary imaging units.

The imaging unit 108 can include an instrument capable of capturing an image signal corresponding to the imaging area 110. For example, the imaging unit 108 can comprise a spectrometer, a photometer, a camera, or a combination thereof. In some implementations, such as in FIG. 2A, the imaging unit 108 includes a camera 120. The camera 120 can be any type of camera consistent with the systems and methods described herein. In some implementations, the camera can have a high resolution, low resolution, capable of capturing still and/or moving images. In some implementations, the camera 120 can be any suitable digital camera that can capture an image signal corresponding to the imaging area. Suitable camera platforms are known in the art and commercially available from companies such as Zeiss, Canon, Applied Spectral Imaging, and others, and such platforms are readily adaptable for use in the systems and methods described herein. In one implementation, the camera 120 may include a fish eye camera. The camera 120 can feature simultaneous or sequential capture of one or more wavelengths using either embedded optical filters within the camera 120 or external filters. The camera 120 can, in some implementations, comprise a lens (e.g., a wide angle lens, a fisheye lens, etc.), adaptive optics, other evolving optics, or a combination thereof. In some implementations, the lens is an articulating lens.

In some implementations, the imaging unit 108 may be part of a vehicle occupant imaging system 109 that is part of the OMS 100. The vehicle occupant imaging system 109 can also include at least one light source 122. The light source 122 can be any type of light source capable of illuminating at least a portion of the field of view of the imaging unit 108 and/or the imaging area 110. The imaging unit 108 can comprise a single light source 122 or any number of light sources 122. Moreover, different types of light sources 122 may be implemented. In some implementations, the one or more light sources 122 can illuminate the imaging area 110 with light of different wavelengths (e.g., one light source 122 can illuminate with a different wavelength or range of wavelengths than the other light source(s) 122). Examples of suitable light sources 122 include artificial light sources such as incandescent light bulbs, light emitting diodes, and the like. Furthermore, the light source can be a continuous light source (e.g., incandescent light bulbs, light emitting diodes, continuous wave lasers, etc.), a pulsed light source (e.g., pulsed lasers), or a combination thereof. In addition, in implementations that include light sources 122 configured for illuminating with different wavelengths, such as, for example, a first light source configured for illuminating infrared light and a second light source configured for illuminating visible light, the light sources 122 having different wavelengths may be configured for performing different functions. For example, the infrared light source may be configured for illuminating at least a portion of the field of view of the imaging unit 108 and the visible light source may be configured for communicating information to the driver or other occupants.

In some embodiments, the light source 122 can be any light source that emits one or more wavelength between 300 and 2500 nm. In some embodiments, the light source 122 emits a broad range of wavelengths, and a filter can be used to select a wavelength of interest. In some embodiments, a range of wavelengths is selected. Any type of filter consistent with the systems and methods described herein can be used. For example, the filter can be an absorptive filter, a dichroic filter, a monochromatic filter, a longpass filter, a bandpass filter, a shortpass filter, or a combination thereof. In some embodiments, the filter is an external filter. In some embodiments, the filter is embedded in the light source 122. In some embodiments, the filter is embedded in the vehicle occupant imaging system 109 and/or may include at least one optical film. In some implementations, the light source 122 can emit a wavelength or range of wavelengths of interest. In some implementations, the light source 122 can emit a range of wavelengths of from 800 nm to 1000 nm. In some implementations, the light source 122 can comprise an infrared light source (e.g., a light source emitting one or more wavelengths from 750 nm to 1,000,000 nm), such as a near-infrared light source, a mid-infrared light source, a far-infrared light source, or a combination thereof.

In certain implementations, a processing unit may be configured for adjusting an intensity of the light source 122 based on ambient lighting conditions in the field of view of the imaging unit 108. For example, the intensity of light emitted from the light source 122 may be determined by the processing unit based on the image signals received from by the imaging unit 108, according to one implementation.

In some implementations, the light source 122 can include a light bar 124. The light bar 124 can include, for example, a liquid crystal display (LCD), thin-film-transistor display, active-matrix display, a segmented display (e.g., improved black nematic (INB), super twisted nematic (STN), etc.), one or more light-emitting diodes (LED), a liquid crystal display, laser, halogen, fluorescent, an infra-red (IR) LED illuminator, or any other suitable light emitting element. For example, in some implementations, the light bar 124 may include one or more LEDs that emit one or more wavelengths in the visible range (e.g., 350 nm to 750 nm). In another implementation, the light bar 124 may include one or more LEDs that emit infrared light. And, in yet another implementation, the light bar 124 may include a first set of LEDs that emit one or more wavelengths in the visible range and a second set of LEDs that emit one or more wavelengths in the infrared range. For example, in various implementations, the light bar 124 includes at least a first section of LEDs that emit visible light and at least a second section of LEDs that emit infrared light. The LEDs in the second section may be configured for illuminating at least a portion of the field of view of the imaging unit 108, and the LEDs in the first section may be configured for communicating information to the driver or other occupant. For example, in one implementation, the LEDs in the first section are configured for illuminating visible light in response to the OMS being in one of an operational mode or a non-operational mode. In another implementation, the LEDs in the first section may be configured to illuminate during vehicle operation to provide a warning to the driver or other occupants. And, in yet another implementation, the LEDs in the first section may be configured to flash one or more times at vehicle start up to indicate that the OMS is in an operational mode and then illuminate during vehicle operation to provide a warning to the driver or other occupants.

In some examples, the vehicle occupant imaging system 109 may use an external light source in addition to or instead of light source 122. As used herein, an external light source includes any light source that is not part of the OMS 100. For example, the external light source can include a natural light source, such as the sun. Other examples of external light sources include ambient light, such as from street lamps, the headlights and/or taillights from other vehicles, electronic displays within the vehicle cabin, cabin lights, etc. In some examples, the vehicle occupant imaging system 109 can use an external light source (not shown) that is electrically coupled to the vehicle occupant imaging system 109 such that the external light source is configured to illuminate the field of view of the imaging unit 108 and/or the imaging area 110.

In some implementations, the light source 122 may include the light bar 124, another light source, such as those described above, or a combination thereof.

It is to be understood that as used herein, the singular forms "a", "an," and "the" include the plural referants unless the context clearly dictates otherwise. Thus, for example, reference to "a camera," "a light source," or "a light bar" includes combinations of two or more such cameras, light sources, or light bars, and the like. The components comprising the vehicle occupant imaging system 109 can be configured in any way consistent with the systems and methods described herein.

Some exemplary configurations of the vehicle occupant imaging system 109 are illustrated in FIG. 2A-2F. In the implementation shown in FIG. 2A, the vehicle occupant imaging system 109 includes a camera 120. An external light source (not shown), such as an artificial light source, the sun or other available ambient light, is used to illuminate the field of view and/or imaging area of the camera 120.

Figure 2B:
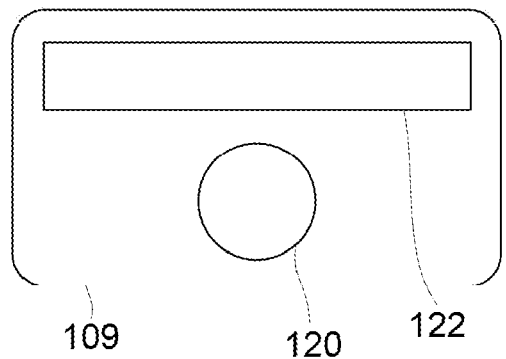
Figure 2C:
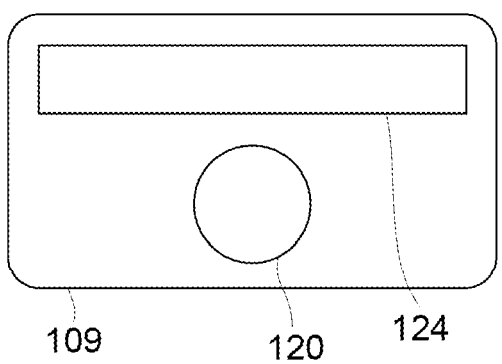
Figure 2D:
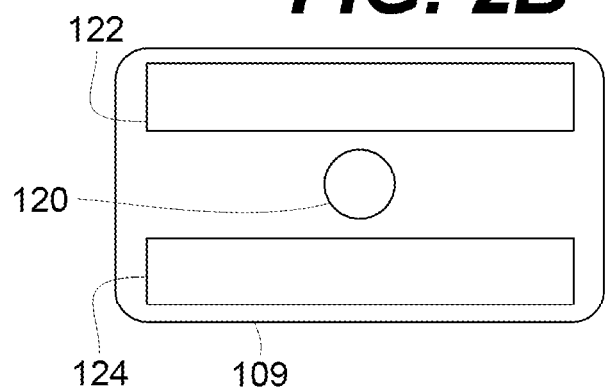
Figure 2E:
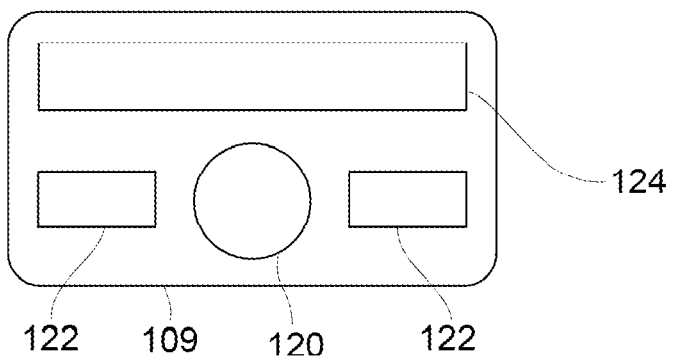

In the implementation shown in FIG. 2B, the vehicle occupant imaging system 109 includes camera 120 and one or more light sources 122 disposed proximate and above the camera 120. In the implementation shown in FIG. 2C, the vehicle occupant imaging system 109 includes camera 120 and light bar 124 disposed proximate and above the camera 120.

Figure 2F:
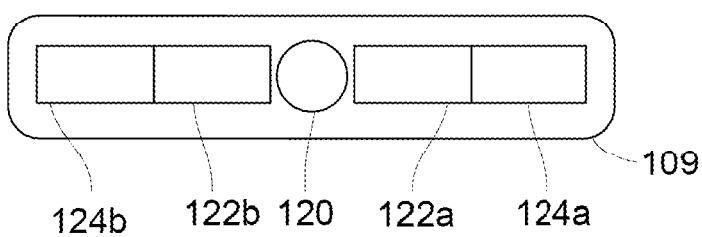

In other implementations, one or more individual light sources 122 or light bars 124 (or combinations thereof) may be disposed below and/or to the sides of the camera 120 or adjacent other locations on the steering wheel assembly 104, vehicle, or vehicle occupant imaging system 109. For example, in the implementation shown in FIG. 2D, the vehicle occupant imaging system 109 includes camera 120, individual light source 122 disposed proximate and above camera 120, and light bar 124 disposed proximate and below camera 120. As another example, the vehicle occupant imaging system 109 shown in FIG. 2E includes camera 120, two individual light sources 122 disposed proximate and to the sides of camera 120, and light bar 124 disposed proximate and above the camera 120. In another example, as illustrated in FIG. 2F, the vehicle occupant imaging system 109 may include camera 120, two individual light sources 122a, 122b, and two light bars 124a, 124b. A first light source 122a is disposed proximate to a right side of the camera 120, a second light source 122b is disposed proximate to a left side of the camera 120, a first light bar 124a is disposed proximate to a right side of the first light source 122a, and a second light bar 124b is disposed proximate to a left side of the second light source 122b.

Any number of cameras 120, light sources 122, and/or light bar 124 combinations or configurations is contemplated.

During normal operation of a vehicle, the central portion 112 of the steering wheel assembly 104 is readily observable by the driver 102. In order for the presence of the OMS 100 to not alter the driver's normal operation of the vehicle, the OMS 100 may be coupled to the steering wheel assembly 104 so as to be non-visible or unobtrusive to the driver 102. For example, the OMS 100 can be hidden from the driver 102 or other occupant behind a style element. Moreover, the position of the vehicle occupant imaging system 109 can also be optimized for safety of the driver's or other occupant's eyes.

For example, one or more components of the OMS 100, such as the imaging unit 108 and/or the light source 122, may be disposed within a housing. The housing can be permanently and/or removably coupled to the steering wheel assembly 104. In addition, the housing may be integrally formed with or separately formed from and mounted to the steering wheel assembly 104 according to various implementations. For example, in some implementations, the housing may be integrally formed with a backcover 126 of the hub 116, and one or more components of the OMS 100 can be disposed in the housing formed with the backcover 126. In one such implementation, the OMS 100 components disposed in the backcover 126 rotate with the steering wheel assembly 104. In other implementations, the housing may be integrally formed with a portion of the hub 116 that is adjacent to or includes a driver air bag or switch assembly. And, in other implementations, the housing may be separately formed from the steering wheel assembly 104 and coupled to it using any suitable fastening technique, such as, for example, screws, hooks, clips, adhesive (e.g., glue), soldering, or welding. The housing may be coupled directly to the steering wheel assembly 104 or to a mounting bracket, such as mounting bracket 301 described below in relation to FIGS. 12-15, or other structure that is coupled to the steering wheel assembly 104.

Figure 3A:
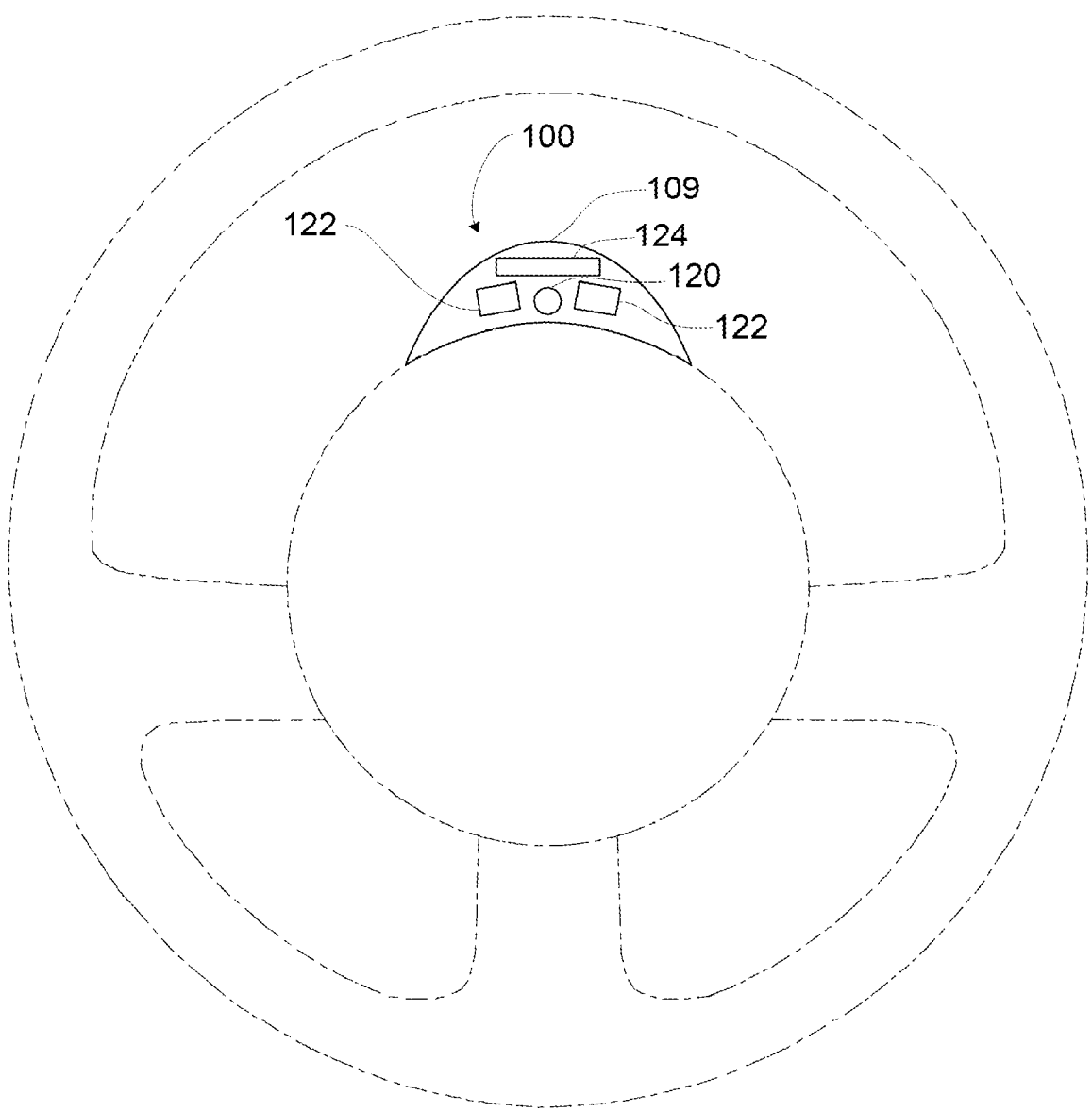
FIGS. 3A and 3B are schematic views of exemplary occupant monitoring systems.
Figure 3B:
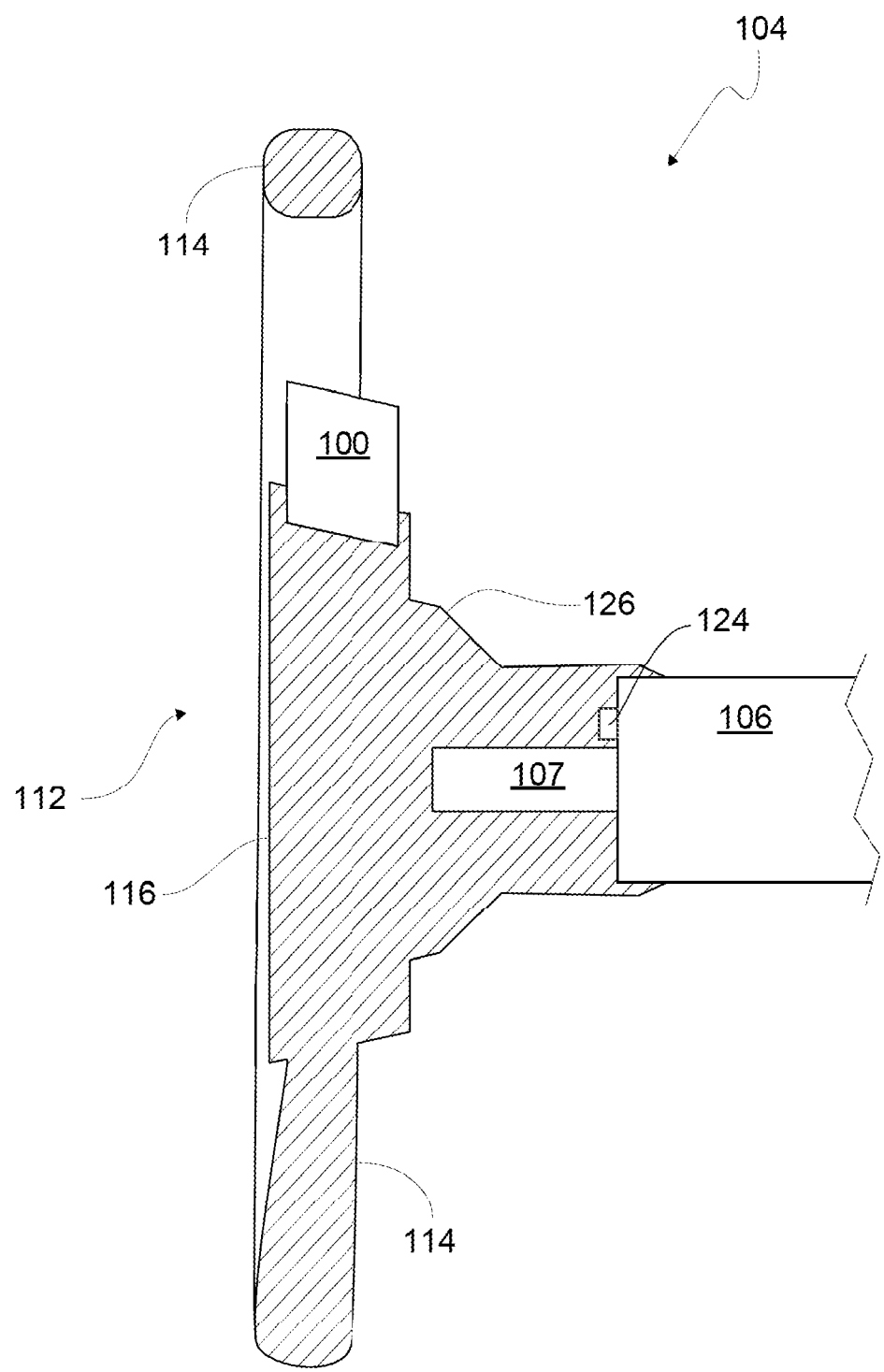

FIGS. 3A through 3B illustrate various implementations of the housing of the vehicle occupant imaging system 109 coupled to the steering wheel assembly 104. For example, in the implementation shown in FIG. 3A, the housing for the vehicle occupant imaging system 109 is coupled to an upper portion of the hub 116 of the steering wheel assembly 104. Components of the vehicle occupant imaging system 109 are disposed within the housing. FIG. 3B illustrates a side view of the housing for the vehicle occupant imaging system 109 that is shown in FIG. 3A. The backcover 126 to which the housing is coupled is part of the hub 116.

Figure 4A:
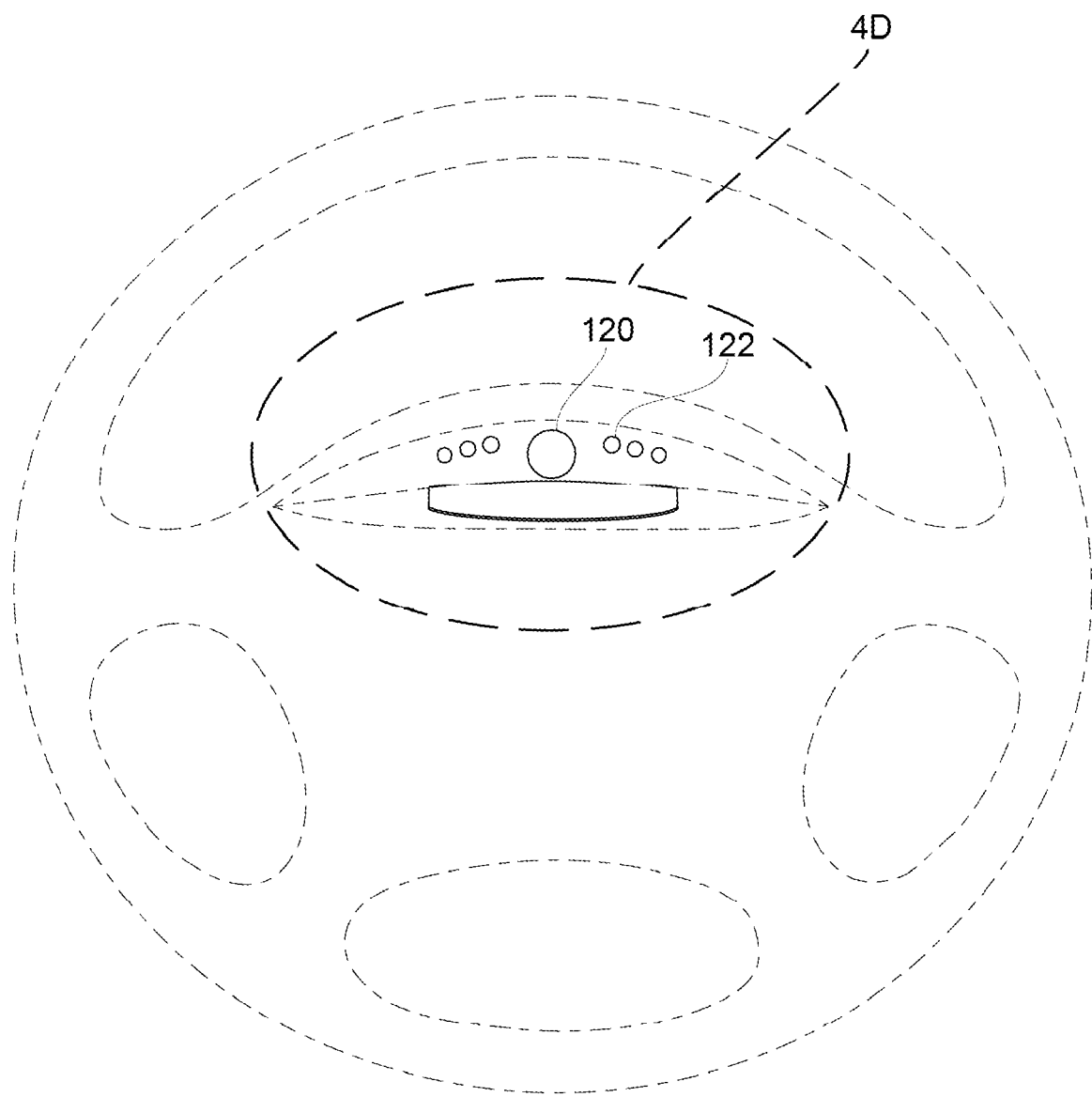
FIGS. 4A-D are schematic views of exemplary occupant monitoring systems.
Figure 4B:
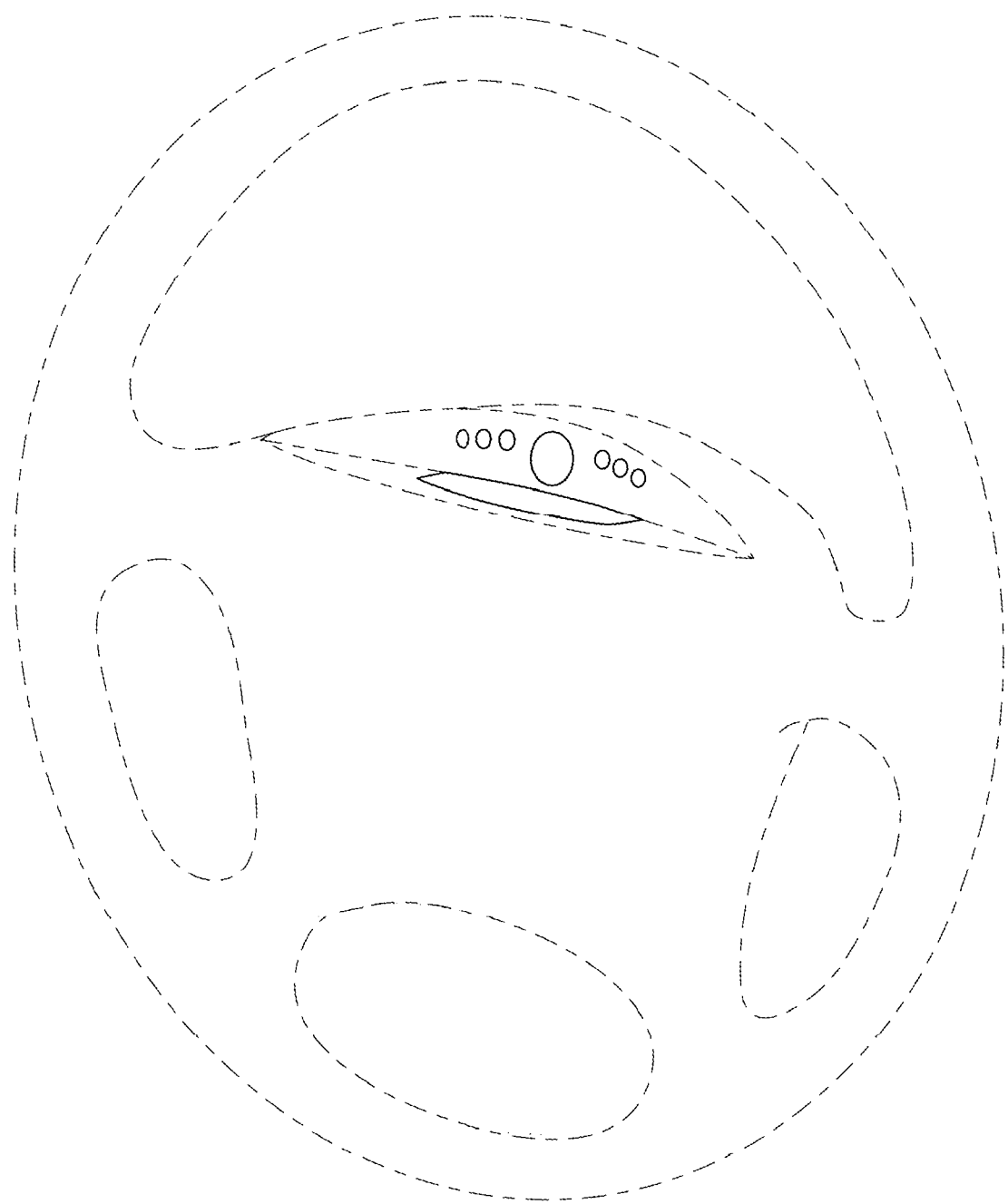
Figure 4C:
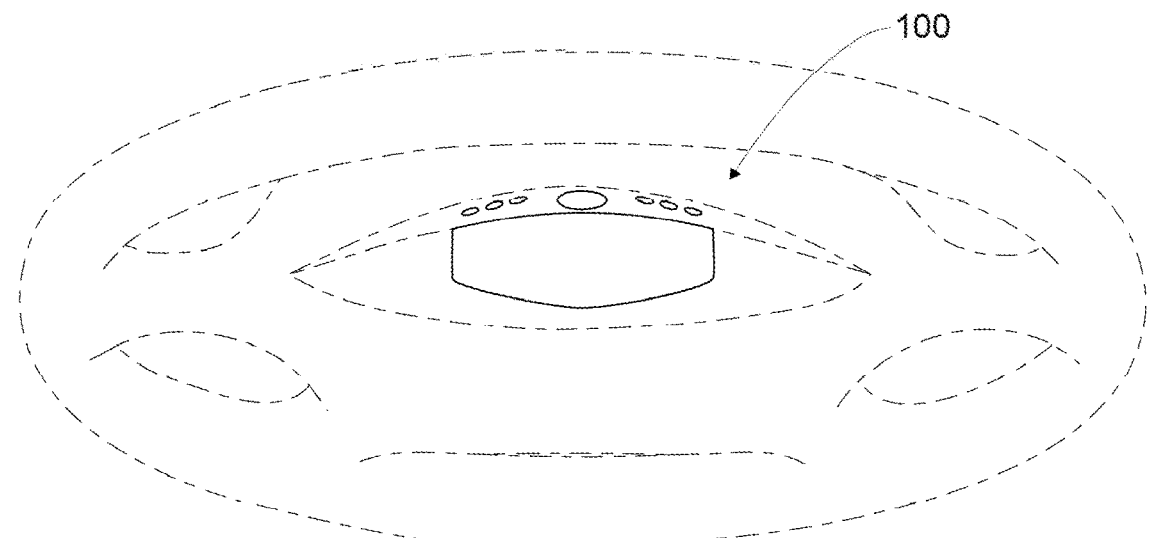
Figure 4D:
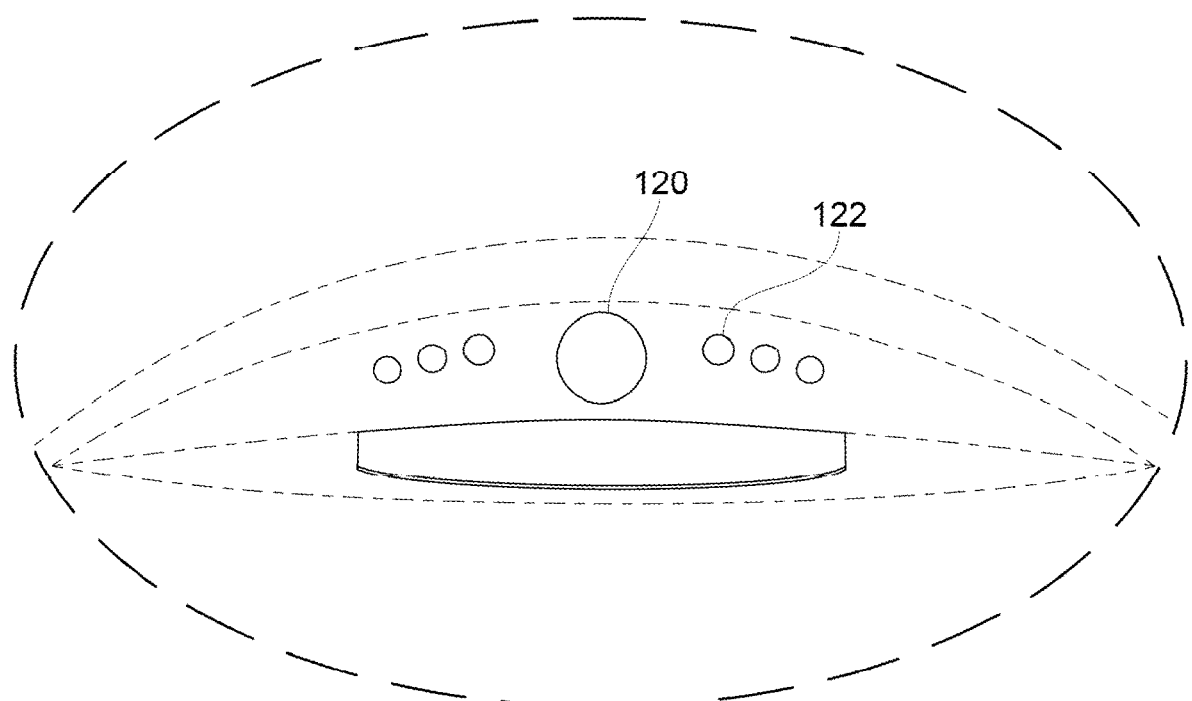

FIG. 4A through 4D illustrate various implementations of components of the vehicle occupant imaging system 109 coupled adjacent to the steering wheel assembly 104. In particular, FIG. 4A provides a front view of the steering wheel assembly 104 with components of the vehicle occupant imaging system 109 coupled adjacent to the backcover 126. For example, in some implementations, the components may be coupled directly to the steering wheel assembly and/or the housing noted above in FIGS. 3A and 3B. In other implementations, the components may be coupled to at least one mounting bracket or other intermediate structure(s) that is coupled directly to the steering wheel assembly and/or housing FIG. 4B provides an angled front view of the steering wheel assembly 104 with components of the vehicle occupant imaging system 109 coupled adjacent to the backcover 126. FIG. 4C provides a top-down view of the steering wheel assembly 104 with components of the vehicle occupant imaging system 109 coupled adjacent to the backcover 126. FIG. 4D provides a close up view of the section marked "4D" in FIG. 4A showing components of the vehicle occupant imaging system 109 coupled adjacent to the backcover 126. In these or other implementations, other components of the OMS 100, such as one or more processing units, may also be disposed adjacent to the steering wheel assembly, such as within the housing coupled to the backcover 126. Alternatively, the other components of the OMS 100 may be disposed on other portions of the steering wheel assembly 104 or outside of the steering wheel assembly 104 within the vehicle.

In some implementations, it may be desirable to thermally couple the OMS 100 or portions thereof to the backcover 126 and/or other portions of the steering wheel assembly 104 to dissipate heat away from the portions of the OMS 100 and allow for improved heat exchange. For example, the housing in which components of the vehicle occupant imaging system 109 are disposed may be formed of a thermally conductive material and coupled to the backcover 126 using a thermally conductive "gap pad" or other thermally conductive adhesive or mechanical heat sink, according to certain implementations. For example, the housing, backcover 126, and steering wheel assembly 104 may be constructed of materials having high thermal conductivity, including, for example, magnesium alloy (diecast) (1.575 W/cm·°C.), aluminum alloy (diecast) (2.165 W/cm·°C.), and steel (low carbon) (0.669 W/cm·°C.).

In some implementations, the housing can be coupled to the backcover 126 or other portions of the steering wheel assembly 104 using a mounting bracket, such as shown and described below in relation to FIGS. 12 through 20, or may be directly coupled to the back cover 126 or other portions of the steering wheel assembly 104. Heat from the OMS 100 components disposed within the housing are conducted from the housing to the backcover 126 and/or the steering wheel assembly 104 directly or via the mounting bracket, allowing the back cover 126 and/or steering wheel assembly 104 to act as a heat sink for the OMS 100.

Figure 6:
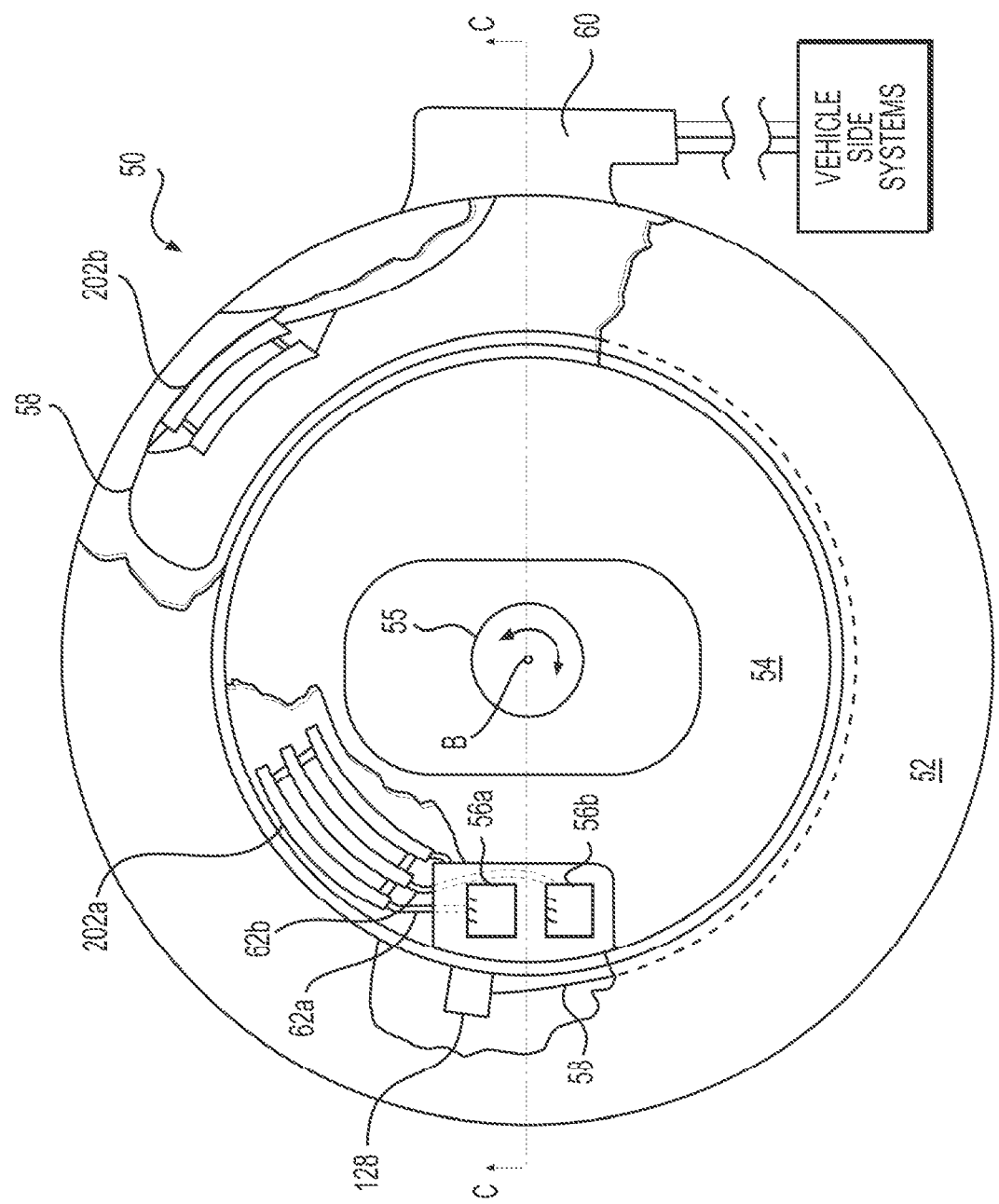
FIG. 6 is a front view of a steering wheel according to one implementation.

In some implementations, the OMS 100 can further include a steering angle sensor 128, as shown in FIG. 3B. The steering angle sensor 128 can be mounted proximate to the steering wheel assembly 104 and can provide active feedback about the position, angle, rate of rotation, and/or orientation of the steering wheel assembly 104. The steering angle sensor 128 may be disposed between a non-rotating and a rotating element of the steering wheel assembly 104. For example, as shown in FIG. 3B, the steering angle sensor 128 may be coupled to the steering column 106, which does not rotate. Alternatively (not shown), the steering angle sensor 128 may be coupled to the steering shaft 107, which rotates relative to the steering column 106. In another example, which is shown in FIG. 6, the steering angle sensor 128 is disposed in a stator of an automotive clock spring. Alternatively (not shown), the steering angle sensor 128 may be disposed in a rotor of the automotive clock spring.

The steering angle sensor 128 can be an analog device, a digital device, or a combination thereof. For example, the steering angle sensor 128 can include a rotating, slotted disc; an LED light; and a detector. The LED light is positioned to transmit light through the slotted disc to then be collected by the detector. The detector can output a signal based on whether or not any light is detected according to the slit position. By knowing the slit positions and counting the number of times light/no light are detected, the rotation speed and direction can be determined. The OMS 100 can utilize a dedicated steering angle sensor 128, or the OMS 100 can utilize an existing sensor integrated in the steering wheel assembly 104 and/or other vehicle component.

In various implementations, the OMS 100 is associated with control circuitry for controlling its operation. For example, the OMS 100 can be associated with circuitry for controlling operation of the vehicle occupant imaging system 109 including, for example, operation of the camera 120 and/or light source 122. In an exemplary implementation, the OMS 100 may be wired directly to the control circuitry of the steering wheel assembly 104. For example, the light source 122 can be wired through an inline resistor to a steering wheel assembly power source (not shown).

Figure 5:
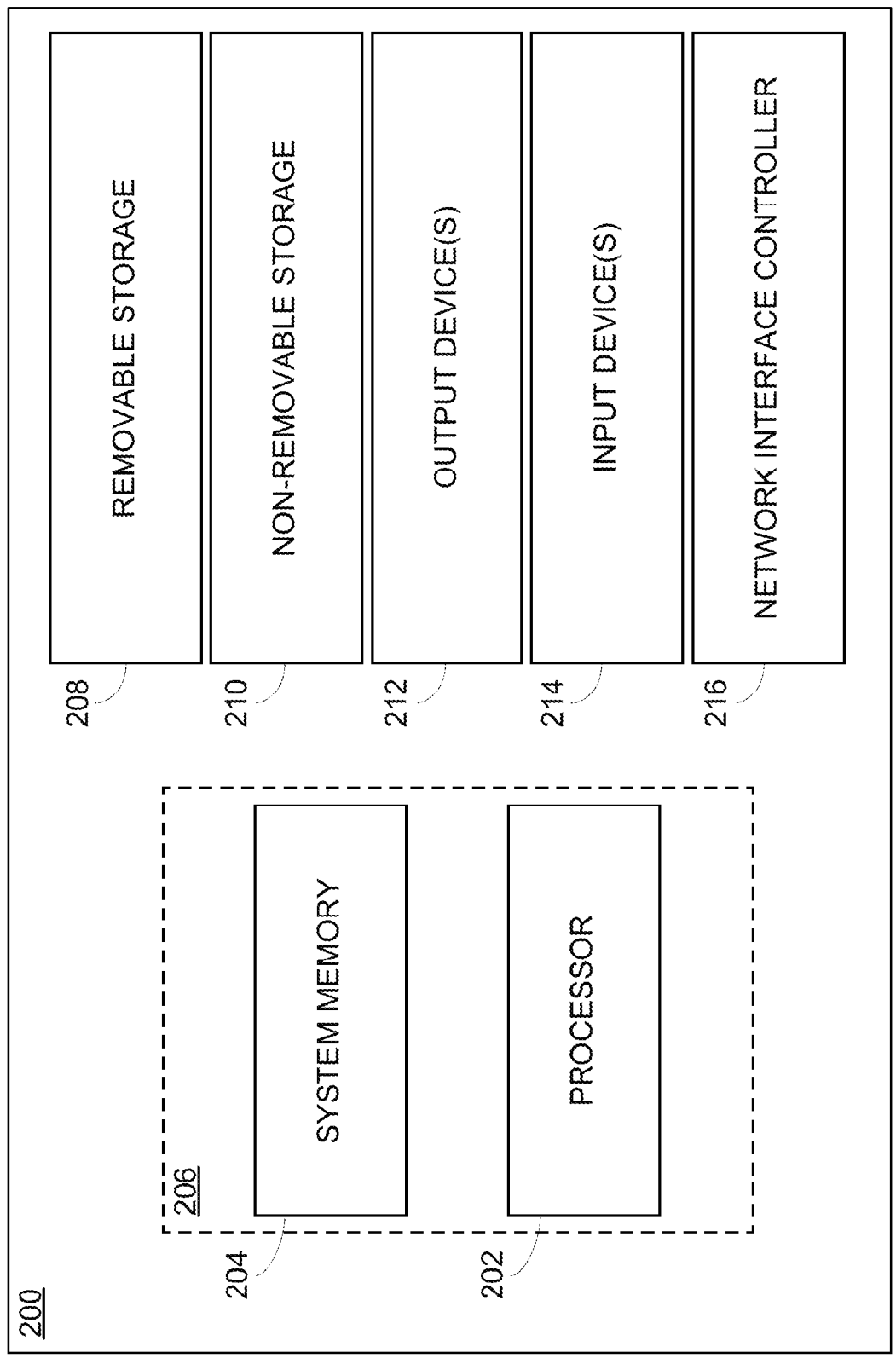
FIG. 5 is a schematic view of an exemplary processing unit.

In some implementations, the OMS 100 includes a processing unit 200, as shown in FIG. 5 The processing unit 200 can be configured to provide operation instructions to/from the vehicle and various OMS 100 components. The processing unit 200 can be configured to direct operation of the OMS 100. The processing unit 200 can be part of and disposed adjacent the vehicle occupant imaging system 109 and/or disposed on or otherwise associated with the electronic control unit (ECU) of the vehicle. In a further implementation, the processing unit 200 may be located on or otherwise associated with another vehicle system. Where the processing unit 200 is associated with a system other than the OMS 100, communication lines (i.e., data and/or power wires) may be provided between the alternate system and the OMS 100. For example, the OMS 100 may be connected to the vehicle's electronic control unit (ECU) by one or more wires extending between the ECU unit and the vehicle occupant imaging system 109 of the OMS 100. Furthermore, in certain implementations, the steering angle sensor 128 is electrically coupled to the processing unit 200.

When the logical operations described herein are implemented in software, the process may execute on any type of computing architecture or platform. For example, the functions of the OMS 100 may be implemented on any type of computing architecture or platform.

The implementation shown in FIG. 5 illustrates computing device/processing unit 200 upon which implementations disclosed herein may be implemented. The processing unit 200 can include a bus or other communication mechanism for communicating information among various components of the processing unit 200. In its most basic configuration, processing unit 200 typically includes at least one processor 202 and system memory 204. Depending on the exact configuration and type of computing device, system memory 204 may be volatile (such as random access memory (RAM)), non-volatile (such as read-only memory (ROM), flash memory, etc.), or some combination of the two. This most basic configuration is illustrated in FIG. 5 by a dashed line 206. The processor 202 may be a standard programmable processor that performs arithmetic and logic operations necessary for operation of the processing unit 200.

The processing unit 200 can have additional features/functionality. For example, the processing unit 200 may include additional storage such as removable storage 208 and non-removable storage 210 including, but not limited to, magnetic or optical disks or tapes. For example, the processing unit 200 may be configured for storing at least a portion of the image signals received to one or more of the storage 208, 210. In one implementation, the image signals (or a portion thereof) may be stored on the non-removable storage 210 so as to keep the image signals secure. In addition, the image signals may be stored and/or transmitted in full or as a set of data related to portions of the image signals, such as data related to occupant information parameters described below.

In addition, the processing unit 200 may be configured for storing feature information related to image signals captured of at least one vehicle occupants just prior to the vehicle being turned off. This feature information may be stored in a temporary memory area that may be part of storage 210, for example, or is separate from storage 210. When the vehicle is started up again, the feature information may be retrieved by the processing unit 200 to accelerate startup of the OMS 100. In some implementations, the feature information may be stored for one or more of the prior vehicle shut downs. In one implementation, storing feature information for several of the prior vehicle shut downs increases the likelihood that the feature information stored includes information related to the at least one of the occupants in the vehicle at the next start up.

The processing unit 200 can also contain network connection(s) via a network interface controller 216 that allow the device to communicate with other devices. The processing unit 200 can also have input device(s) 214 such as a keyboard, mouse, touch screen, antenna or other systems configured to communicate with the OMS 100, imaging unit 108, light source 122, and/or steering angle sensor 128 in the system described above, etc. Output device(s) 212 such as a display, speakers, printer, etc. may also be included. The additional devices can be connected to the bus in order to facilitate communication of data among the components of the processing unit 200.

The processor 202 can be configured to execute program code encoded in tangible, computer-readable media. Computer-readable media refers to any media that is capable of providing data that causes the processing unit 200 (i.e., a machine) to operate in a particular fashion. Various computer-readable media can be utilized to provide instructions to the processor 202 for execution. Common forms of computer-readable media include, for example, magnetic media, optical media, physical media, memory chips or cartridges, a carrier wave, or any other medium from which a computer can read. Example computer-readable media can include, but is not limited to, volatile media, non-volatile media and transmission media. Volatile and non-volatile media can be implemented in any method or technology for storage of information such as computer readable instructions, data structures, program modules or other data and common forms are discussed in detail below. Transmission media can include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an exemplary implementation, the processor 202 can execute program code stored in the system memory 204. For example, the bus can carry data to the system memory 204, from which the processor 202 receives and executes instructions. The data received by the system memory 204 can optionally be stored on the removable storage 208 or the non-removable storage 210 before or after execution by the processor 202.

The processing unit 200 typically includes a variety of computer-readable media. Computer-readable media can be any available media that can be accessed by the processing unit (200) and includes both volatile and non-volatile media, removable and non-removable media. Computer storage media include volatile and non-volatile, and removable and non-removable media implemented in any method or technology for storage of information such as computer readable instructions, data structures, program modules or other data. System memory 204, removable storage 208, and non-removable storage 210 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the processing unit 200. Any such computer storage media can be part of the processing unit 200.

It should be understood that the various techniques described herein can be implemented in connection with hardware or software or, where appropriate, with a combination thereof. Thus, the methods, systems, and associated signal processing of the presently disclosed subject matter, or certain aspects or portions thereof, can take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs can implement or utilize the processes described in connection with the presently disclosed subject matter, e.g., through the use of an application programming interface (API), reusable controls, or the like. Such programs can be implemented in a high level procedural or object-oriented programming language to communicate with a computer system. However, the program(s) can be implemented in assembly or machine language, if desired. In any case, the language can be a compiled or interpreted language and it may be combined with hardware implementations.

In some implementations, the system memory 204 includes computer-executable instructions stored thereon that, when executed by the processor 202, can be used to direct operation of the OMS 100 to monitor the driver or other occupant (e.g., capture an image of the driver or other occupant), determine a state of the driver or other occupant, and provide an output signal based on the determined state. For example, the processor 202 can direct operation of the imaging unit 108 and/or the light source 122. In particular, the imaging unit 108 can be directed to capture an image of the imaging area 110 and output the captured image signal to the processor 202. The imaging unit 108 may also be configured for communicating data associated with the image signal to the processor 202. The processor 202 can analyze the image signal from the imaging unit 108 to determine information about the operator state and/or identify portions of the image signal that may provide information about the operator state.

In other implementations, the processor 202 may communicate all or a portion of the image signal and/or calculated data based on all or a portion of the image signal to another processor(s) disposed remotely from processor 202. The other processor may be configured for using the received image signal (or portions thereof) or data to determine a driver or occupant state.

For example, the processor 202 can receive the image signal from the imaging unit 108 and process the image signal to identify an analysis region. The analysis region can be a region of the imaging area 110 associated with the driver, non-driving vehicle occupant and/or other region of interest within or external to the vehicle. Identifying the analysis region can comprise determining the position and/or orientation of the driver's or other occupant's head and/or eyes. The analysis region can comprise the determined position of the driver's or other occupant's head and/or eyes.

The analysis region can be analyzed by the processor 202 (or another processor) to determine an occupant information parameter. The occupant information parameter can include, for example, information about the occupant corresponding to the occupant's alertness and/or attention or a state of the occupant or vehicle that would prevent the imaging unit 108 from capturing relevant data associated with the occupant. The occupant information parameter can include the position and/or orientation (e.g., yaw, pitch, roll) of the occupant's head, the rate of movement of the occupant's head, the dimensions of the occupant's head, determination if the occupant is wearing a certain article that can affect the image signal (e.g., a hat, glasses, sunglass, contact lenses, makeup, jewelry, etc.), movement of the occupant's mouth (e.g., determining if the occupant is talking, yawning, singing, sneezing, etc.), movement of the occupant's nose (e.g., determining if the occupant is breathing, sneezing, etc.), movement of the occupant's eyes (e.g., squinting, blinking, blink rate, saccades, smooth pursuit movements, vergence movements, vestibule-ocular movements, etc.), movement and/or position of the occupant's eye lids, gaze vector, heart rate, workload, occupant identification features, occupant age estimates, facial musculature movements (e.g., movements associated with expression, pain, squinting, blinking, talking, sneezing, singing, sleeping, physical impairment, etc.), and/or the position and/or orientation of the occupant's eyes. Accordingly, the analysis region can be analyzed to determine a deviation in the position and/or orientation of the occupant's head and/or eyes from a predetermined position.

One or more of the occupant information parameters can be analyzed to determine an occupant state. The occupant state can include, for example, whether the occupant's eyes are open or closed, whether or not the occupant is looking at the road, the center console, or elsewhere, whether or not the occupant is distracted, the relative alertness of the occupant, the occupant's emotion(s) (e.g., angry, sad, happy, excited, nervous, afraid, etc.), the occupant's physical condition (e.g., sleepy, hungry, ill, impaired, etc.), and/or the occupant's demeanor (e.g., posture, eating, drinking, giving verbal commands, completing manual tasks, direction of eye gaze, interested, etc.), and the like. Accordingly, analyzing the occupant information parameter to determine the occupant state can include determining that the position and/or orientation of the occupant head and/or eyes are deviated from a predetermined position. Analyzing the occupant information parameter may also include determining that the position and/or orientation of the occupant head and/or eyes are deviated from the predetermined position for at least a predetermined amount of time. Other examples include, assessing the occupant's visual distraction level (e.g., occupant state) through monitoring the occupant's eye/pupil vectors relative to the position of the windshield (e.g., occupant information parameter). Features of the mouth, such as corners and average separation of the lips, can be monitored to determine when a particular occupant is speaking, and audio signals captured in the vehicle may be correlated with the mouth features by a speech recognition system (e.g., such as used in hand's free processing systems) to filter out speech from unintended occupants and/or background noise. Monitoring the motion of the nose and/or mouth can be used to infer an estimate of respiration rate, which can be used, for example, to assess if the occupant has stopped breathing, or if respiration rate is elevated, which can occur during certain perturbed emotional states or medical emergencies. Monitoring the luminance of the face can be used to assess the appearance of sweat beads, which can be used to assess the occupant's comfort (e.g., determine if the climate controls should be adjusted) and/or fitness level (e.g., occupant is ill and/or experiencing a medical event). In addition, the intensity of the light source 122 may be altered to compensate for ambient light, to minimize the visibility of the light source 122, and/or to adjust for the skin tone of the occupant within the imaging area. Spectral analysis of the signal collected from the camera can be used to derive and/or estimate physiological response such as skin heating/cooling and/or electrocardial activity and rates. A wide range of occupant information parameters can be monitored to derive or estimate a wide range of occupant states, which, for example, can be used to establish unique health and behavior characteristics for individual occupants that can enhance the safety, health, comfort and convenience of the driver and other occupants.

In certain implementations, the processor 202 can output a signal based on the occupant state. In some implementations, the output signal can be the image signal corrected for the angle of rotation of the steering wheel assembly 104 and/or the rate of angular rotation of the steering wheel assembly 104. The output signal can also be instructions to adjust the imaging unit 108 to correct for the angle of rotation of the steering wheel assembly 104 and/or the rate of angular rotation of the steering wheel assembly 104, as discussed above. The output signal(s) can also be used by other vehicle systems to establish baseline occupant characteristics (e.g., health, attention, behavior), establish thresholds for actuating other vehicle systems (e.g., control, warning systems), and provide real-time occupant state features that can be compared against actuation thresholds.

The output signal can comprise an electrical signal, a wifi signal, or the like. The output signal can be output to another vehicle system to provide information about the occupant state to that vehicle system. In some implementations, the output signal can be provided to another vehicle system that can, for example, change vehicle parameters based on the state of the driver or other occupant (e.g., adjust the sensitivity of the steering wheel, brakes and/or accelerator, turn on or off music, adjust the volume of music, change the type of music, turn on/off interior lights, adjust the cabin temperature, inject a smell, adjust the wavelength and/or intensity of light being emitted by the light source 122, reduce or remove degrees of freedom for the operation of the vehicle from the driver, notify emergency services, modify thresholds of automation, etc.).

And, in some implementations, the output signal may include instructions for OMS 100 or another vehicle system to illuminate or alter the intensity of a light source, play a sound, and/or provide tactile feedback to the driver or other occupant via a haptic feedback device (e.g., vibration, heat, cooling, etc.). The light, sound, and/or haptic feedback may be used to warn the driver or other occupant, for example. In one implementation, the light to be illuminated may include a light bar system, which may part of or the same light bar 124 described above or a separate light bar disposed on another portion of the steering wheel assembly or elsewhere in the vehicle. Exemplary light bar systems are described in co-pending U.S. patent application Ser. No. 14/061,397 entitled "Steering Wheel Light Bar" and filed on Oct. 23, 2013, Ser. No. 14/061,383 entitled "Steering Wheel Light Bar" and filed on Oct. 23, 2013, and Ser. No. 14/061,408 entitled "Steering Wheel Light Bar" and filed on Oct. 23, 2013 and pending U.S. provisional patent application 62/027,969 entitled "Steering Grip Light Bar Systems" filed Jul. 23, 2014. These four applications are hereby incorporated by reference in their entirety. The haptic feedback device may include a heater pad disposed around the rim of steering wheel assembly or a vibratory exciter (e.g., a speaker) disposed within the rim or hub of the steering wheel assembly, for example.

Before, after and/or during analysis of the image signal received from the imaging unit 108, the processor 202 can be used to adjust the imaging unit 108 and/or received image signal based on the status of the steering wheel assembly 104. The processor 202 may also be used to adjust the light source 122 based on the status of the steering wheel assembly 104. As will be described in more detail below, the processor 202 can analyze an electrical signal from the steering angle sensor 128 to obtain information about the angle of rotation of the steering wheel assembly 104 and/or the rate of angular rotation of the steering wheel assembly 104 and adjust the imaging unit 108 image signal based on that information. For example, the processor 202 can receive an electrical signal from the steering angle sensor 128 and process the electrical signal to identify the orientation/angle of rotation of the steering wheel assembly and/or the rate of angular rotation of the steering wheel assembly. The received signal from the steering angle sensor 128 may be analyzed to adjust the imaging unit 108 and/or the image signal to compensate for the angle of rotation of the steering wheel assembly 104 and/or the rate of angular rotation of the steering wheel assembly 104. For example, the imaging unit 108 may be adjusted to rotate or zoom in or out based on the signal from the steering angle sensor 128. In another example, the image signal captured that corresponds to the imaging area 110 may be adjusted to correct for the angle of rotation of the steering wheel assembly 104 and/or the rate of angular rotation of the steering wheel assembly 104.

Adjusting the imaging unit 108 and/or light source 122 to correct for the angle of rotation of the steering wheel assembly 104 and/or the rate of angular rotation of the steering wheel assembly 104, can include, for example, accounting for a change in geometry between the imaging unit 108 and the occupant, such as the driver, adjusting the shutter speed and/or frame rate of the camera 120, adjusting the intensity of the light being emitted from the light source 122, adjusting which light source 122 is active at a given time, adjusting the angle of the camera lens, adjusting the gain, focus and/or optical filter of the camera 120, adjusting the wavelength or range of wavelengths of light emitted from the light source 122, and the like, or a combination thereof.

The image signal captured that corresponds to the imaging area 110 can also be adjusted to correct for the angle of rotation of the steering wheel assembly 104 and/or the rate of angular rotation of the steering wheel assembly 104. Adjusting the image signal can include, for example, adjusting the contrast of the image signal, adjusting the orientation of the image signal, adjusting the gain of the image signal, accounting for a change in geometry between the imaging unit and the driver or other occupant (e.g., transforming the coordinate system of the image signal), accounting for distortion and/or blur in the image signal, and the like.

The analysis of the image signal from the imaging unit 108 and/or the electrical signal output from the steering angle sensor 128 is described above as being carried out by processor 202. However, in other implementations, the functions described above may be carried out in whole or in part on one or more additional processors and/or processing units. For example, the OMS 100 can comprise one or more additional processing units and/or processors.

In some implementations, the OMS 100 can further comprise a disabling unit configured to temporarily disable all or some of the OMS 100 operations when a driver signal is received. The driver signal can be indicative of the driver performing some operation that would prevent proper operation of the OMS 100. The driver signal can include, for example, a signal output upon rotation of the steering wheel assembly 104 of the vehicle by at least a predetermined amount and/or for a predetermined amount of time. For example, the driver signal can be output when the driver rotates the steering wheel assembly 104 to turn the vehicle. The signal indicating rotation of the steering wheel assembly 104 can, for example, be obtained from the steering wheel assembly angle sensor 128. The driver signal can, in some implementations, cease to be output when the steering wheel is returned to a substantially central position for at least a predetermined amount of time. For example, the driver signal can cease to be output when the driver has completed the turn of the corner and resumed normal driving.

The rate and/or angle of rotation of the steering wheel assembly can also be determined by analyzing sequential signals from the camera to monitor the change in position of reliable, fixed features of the vehicle within the imaging area 110 (e.g., position of doors, position of windows, position of roof). Furthermore, such reliable, fixed features can be added to the vehicle within the imaging area to function as reference features to be used by the OMS 100. For example, optically transparent, but IR visible symbols or shapes can be placed on the vehicle seat, headliner, and/or seat belt, in an a priori pattern, which can be used by the OMS 100 to derive the angle of rotation of the steering wheel assembly.

In some implementations, the OMS 100 can communicate data through an automotive clock spring, such as the automotive clock spring 50 described in relation to FIGS. 6-9 below. Exemplary automotive clock springs include a rotary-type electrical connection that permits rotation of the rotatable portion of the steering wheel assembly 104 while maintaining an electrical connection between vehicle system components disposed on the rotating portion of the steering wheel assembly 104 and components disposed outside of the rotating portion. In certain implementations, the automotive clock spring can be used to electrically couple the imaging unit 108 to at least one other vehicle system during rotation of steering wheel assembly 104. Furthermore, the clock spring can also electrically couple the imaging unit 108, the light source 122, and the steering angle sensor 128 to a power source, such as the vehicle battery, and/or a processing unit 200 disposed outside of the rotating portion of the steering wheel assembly.

FIGS. 6-10 illustrate various implementations of automotive clock spring 50 that may be electrically coupled to the vehicle occupant imaging system 109. In particular, FIG. 6 illustrates a front view of the automotive clock spring 50. The clock spring 50 includes a rotor 54 and a stator 52. The rotor 54 is fixed relative to the rotatable portion of the steering wheel assembly 104. In the implementation shown in FIG. 6, the rotor 54 includes a central aperture 55 for receiving the steering shaft 107 to couple the rotor 54 to the steering shaft 107. The steering shaft 107 and the rotor 54 are configured to rotate together about axis B, which extends through the aperture 55. The stator 52 is disposed radially outwardly of the rotor 54 and is statically coupled to the steering column 106 or another non-rotating portion of the steering assembly 104.

The clock spring 50 further includes processor 202*a* disposed in the rotor 54, processor 202*b* disposed in the stator 52, steering angle sensor 128 disposed in the stator 52, a set of wires 58 extending between and electrically coupling processors 202*a* and 202*b*, electrical connectors 56*a*, 56*b* disposed on a face of a housing of the rotor 54, wires 62*a*, 62*b* extending between the electrical connectors 56*a*, 56*b*, respectively, and the processor 202*a*, and an electrical connector 60 disposed on a face of a housing for the stator 52.

In the implementation shown in FIG. 6, the steering angle sensor 128 is disposed in the housing of the stator 52. The steering angle sensor 128 is electrically coupled to the set of wires 58 that electrically couple the processors 202*a* and 202*b*. Thus, the angle of rotation or rate of angular rotation captured by the steering angle sensor 128 may be electrically communicated to the processor 202*a* or processor 202*b* via wires 58. According to other implementations (not shown), as noted above, the steering angle sensor 128 may be disposed in the housing of the rotor 54 or between another set of non rotating and rotating components of the steering wheel assembly.

The implementation in FIG. 6 also includes electrical connectors 56*a*, 56*b* disposed on the face of the housing of the rotor 54. The connectors 56*a*, 56*b* are configured for receiving mating connectors from the imaging unit 108 and light source 122, which, as described above, are disposed on a rotating portion of the steering wheel assembly 104. In one implementation, the electrical wires from the imaging unit 108 and light source 122 may be routed to the electrical connectors 56*a*, 56*b* through the steering shaft 107 to keep the wires hidden and out of the way of the vehicle operator. The connectors 56*a*, 56*b* allow for more efficient installation of the imaging unit 108 and the light source 122 onto the steering wheel assembly 104. Furthermore, although only two connectors 56*a*, 56*b* are shown in FIG. 6, in other implementations, there may be one or more than two connectors. For example, there may be an electrical connector for each imaging unit 108 and light source 122 of the OMS 100.

Figure 9:
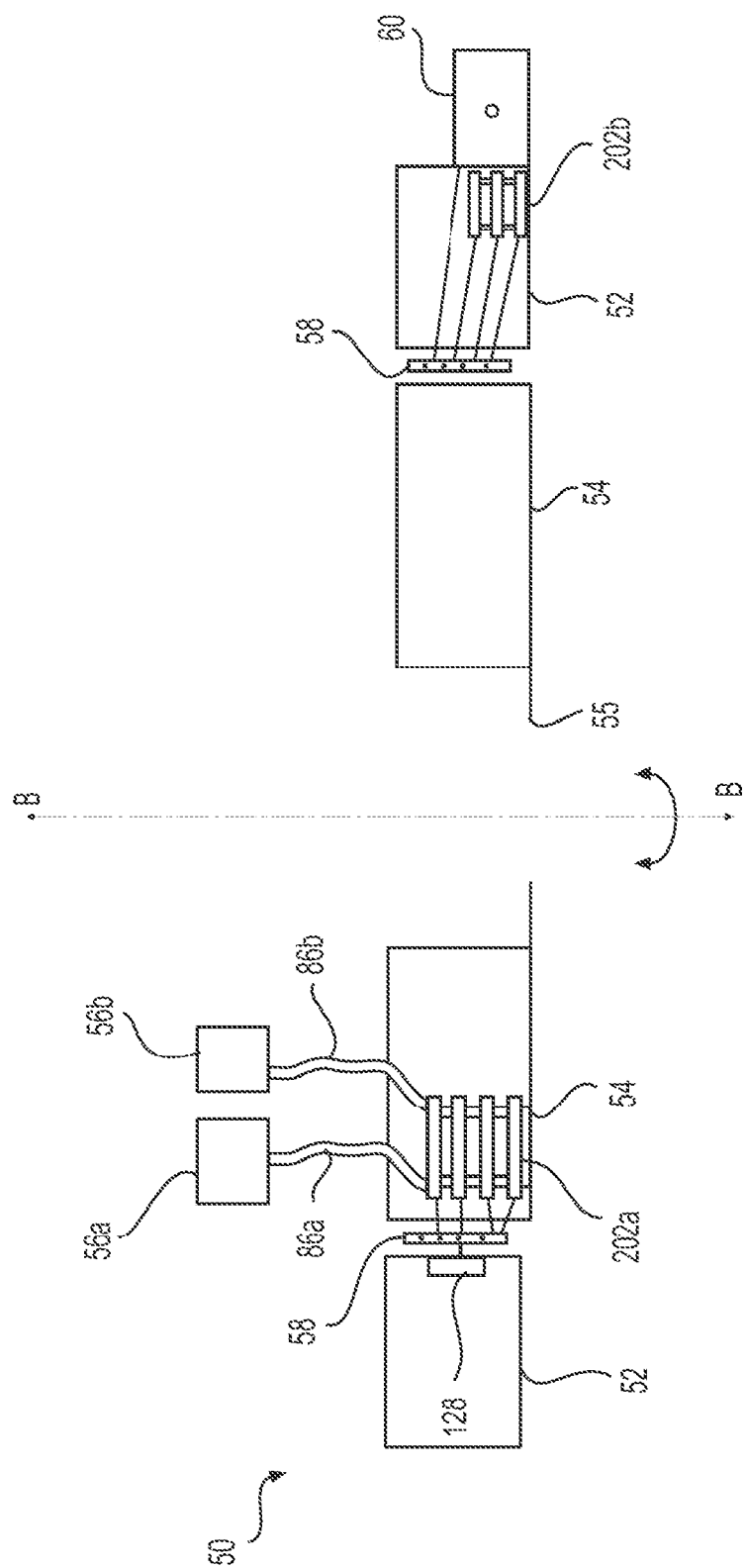
FIG. 9 is a side cut out view of a clock spring according to another implementation.

In some implementations, such as shown in FIG. 9, the connectors 56*a*, 56*b* are coupled to the processor 202*a* via lengths of insulated, electrical wires 86*a*, 86*b* that extend out of the face of the housing of the rotor 54 (e.g., pigtails) toward the rotation portion of the steering wheel assembly 104.

The set of electrical wires 58 may be coupled adjacent each other via a flat tape 59 that includes the electrical wires 58 separated by a dielectric material 57. The electrical tape 59 is configured to wrap and unwrap around the rotor 54 during rotation of the steering wheel assembly without losing a connection between the processors 202*a*, 202*b* and without breaking the wires within the tape 58. The image signals or calculated data electrically communicated through the wires 58 of the tape 59 may also be communicated to another processing unit 200 of the OMS 100 disposed outside of the clock spring 50 or another vehicle system disposed outside of the clock spring 50 via the electrical connector 60 disposed on the housing of the stator 52. The stator connector 60 and the wires 58 of the tape 59 may also be used to electrically communicate data and/or signals between components mounted on the rotating portion of the steering wheel and other vehicle systems, such as cruise control, air bag and vehicle safety systems, steering heating control, audio and user communication systems, and the dynamic stability control system. Furthermore, processed image signals and/or data related thereto may be communicated by processor 202*a* and/or 202*b* to other vehicle systems, such as, for example, vehicle safety systems, user communication systems, in-vehicle and external passive sensors (e.g., passenger/driver occupant sensor(s), rear occupant sensor(s), reverse camera, external radars, etc.), and vehicle control systems (e.g., seat positioning systems, steering assembly positioning systems, semi-autonomous or autonomous driving systems, mirror positioning systems, window positioning systems, lighting systems, armrest positioning systems, and/or seatbelt positioning systems). And, in a further implementation, processor 202*a* and/or 202*b* may receive data from these other vehicle systems. The data received by the processor 202*a* and/or 202*b* may be used by the processor 202*a*, 202*b* to identify which portions of the image signal should be selected and processed further and/or communicated to these systems or other vehicle systems.

The depth of the clock spring 50 may be increased as compared to conventional clock springs to accommodate the addition of one or more of processors 202*a*, 202*b* into the clock spring 50, according to certain implementations. For example, in one implementation, the depth of the clock spring 50, which extends in a direction parallel to the rotational axis of the rotor 54, is increased from about 30 millimeters to between about 60 and about 70 millimeters. The diameter of the clock spring 50 is kept generally the same as convention clock springs so as to fit within the steering column 106 of the vehicle.

In one implementation, the tape 59 may include eight wires 58, or traces, laid out side by side and separated by dielectric material 57. The dielectric material 57 shields the wires 58 from electrical interference with each other and other components in the clock spring 50 and steering column 106. The tape 59 is wound tightly around the rotor 54 about 3.5 turns to allow the steering wheel assembly 104 to be rotated and the tape 59 to unwind and wind with the rotation of the steering wheel assembly 104. However, in other implementations, the tape 59 may include more than or less than eight wires 58 and may be wound one or more turns around the rotor 54, depending on the anticipated rotational movement of the steering wheel assembly 104. In addition, there may be more than one tape 59 extending between the rotor 54 and the stator 52. Generally, the number and nature of the wiring is based on wire gauge and/or the type of components mounted on the rotatable portion of the steering wheel assembly 104, such as, for example, the OMS 100 components, driver air bag system, steering wheel heating system, human machine interface systems (e.g., switches and/or touch sensitive surfaces configured for receiving input from a user), the light bar feedback system, and the horn.

Processors 202a and 202b each include a plurality of stacked, arcuate-shaped, printed circuit boards. The arcuate shape of the processor 202a, 202b allows them to fit within the rotor 54 and stator 52 of the clock spring 50 without interfering with the rotation of the rotor 54 and movement of the wires 58 between the rotor 54 and stator 52. And, stacking the printed circuit boards provides sufficient surface area for the processors 202a, 202b to perform the functions described herein. However, in other implementations, there may be only one arcuate-shaped printed circuit board or the printed circuit boards may be flat and/or not stacked.

Processors 202a and 202b are similar to processor 202 and separately or together may perform one or more functions of processor 202 described above, according to various implementations. The functions to be performed by each processor 202a, 202b, may be selected based on several factors, including, for example, the rate at which the image signals are being captured, the size of the image signals, the number of imaging units 108 and light sources 122 disposed on the rotating portion of the steering wheel assembly 104, and the ability of the housing and/or the steering wheel assembly 104 to dissipate thermal energy from the heat generating components. For example, in certain implementations, the processor 202a may be configured for electrically receiving image signals captured by the imaging unit 108 and selecting at least a portion of the image signals for communicating to the processor 202b; electrically receiving at least one of an angle of rotation or rate of angular rotation of the steering wheel assembly 104 from the steering angle sensor 128 and adjusting an orientation of the image signals based on the received angle of rotation or rate of angular rotation; electrically receiving at least one of an angle of rotation or rate of angular rotation of the steering wheel assembly 104 from the steering angle sensor 128 and adjusting the imaging unit 108 based on the received angle of rotation or rate of angular rotation; compressing the selected image signals prior to communicating the image signals to the processor 202b; controlling an amount of light emitted from the light source 122; and saving at least a portion of the selected image signals to a memory. In some implementations, selecting at least a portion of the image signals for communicating to the processor 202b includes identifying and selecting one or more portions of the image signal related to one or more occupant information parameters.

Furthermore, in certain implementations, the memory may be disposed on the printed circuit board(s) in the rotor 54, elsewhere in the rotor 54, outside of the rotor 54 (e.g., in the stator 52 or in another portion of the vehicle), or a combination thereof.

In other implementations, the processor 202a may be configured for selecting at least a portion of the image signals related to occupant information parameters, calculating data from the selected signals, and communicating the calculated data to the processor 202b.

Figure 10:
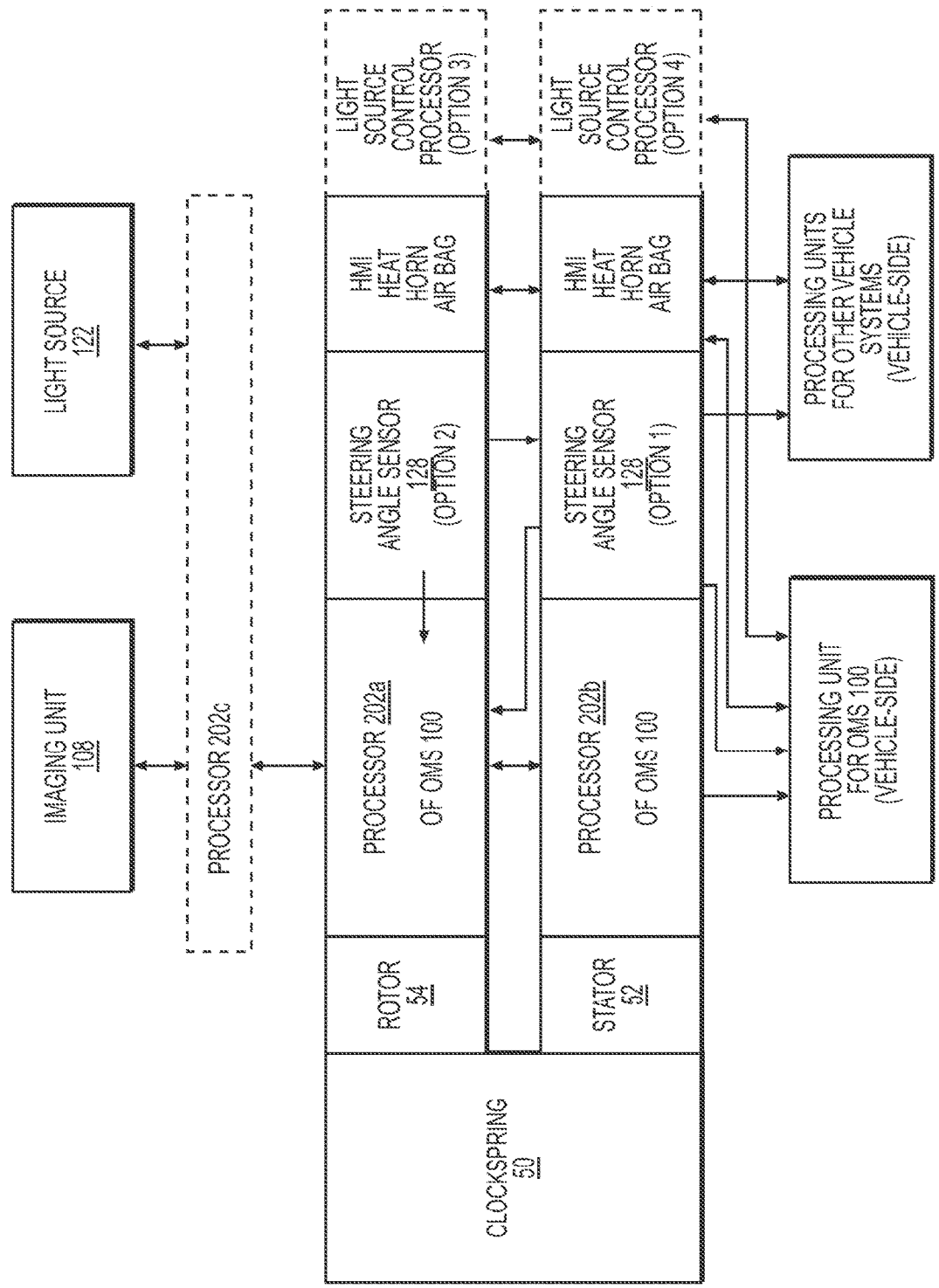
FIG. 10 is a schematic view of various components of the OMS according to one implementation.

In yet another implementation, which is shown schematically in FIG. 10, a processor 202c may be disposed adjacent the imaging unit 108. This processor 202c may be configured for electrically receiving image signals captured by the imaging unit 108 and selecting at least a portion of the image signals for communicating to processor 202a and/or calculating data from the selected signals.

In addition, in an implementation in which processor 202a is configured for compressing the image signal prior to communicating the image signal to processor 202b, processor 202b may be configured for decompressing the compressed image signals.

Although FIGS. 6 and 9 illustrate the light source 122 as being electrically coupled to the processor 202a, one or more light sources 122 may instead be coupled to and controlled by the processor 202b via wires 58 or to other processors disposed in the rotor 54 and/or stator 52, according to other implementations (not shown). For example, one of the connectors 56a, 56b may be coupled to processor 202b via wire 62b or 86b and wires 58 such that the light source 122 that is coupled to the connector 56a, 56b is electrically coupled to the processor 202b. In such an implementation, the processor 202b is configured for controlling the light source 122.

As noted above, processor 202a may be configured for identifying and selecting at least a portion of the image signals related to one or more occupant information parameters for communicating to the processor 202b. In certain implementations, the processor 202b is further configured for smoothing, filtering, and/or analyzing the received image signals.

Processors 202a and 202b may also be electrically coupled to a power source disposed within the vehicle via the stator connector 60 and wires 58. Power from the power source is available to the imaging unit 108 and the light source 122 via one or more of the processors 202a, 202b according to certain implementations. In other implementations (not shown), power may be available directly to the imaging unit 108 and light source 122 via individual wires coupled to wires 58.

In some implementations, if the physical size of processor 202a is sufficient to throw the rotation of the rotor 54 off balance, a counter balance may be included in the rotor 54 opposite the processor 202a to balance the rotational momentum of the rotor 54.

Various implementations provide an improved packaging solution for image detection systems within a vehicle. In particular, by processing the image signal in processor 202a disposed within the rotor 54 of the clock spring 50, the raw image signal from the imaging unit 108 is received and processed closer to the imaging unit 108, which prevents loss or interference with the signal that may occur over longer distances between the imaging unit 108 and the processor. This arrangement also allows for efficient communication of the image signals used for determining occupant information parameters, which improves the operation of the occupant monitoring system 100. In particular, if the imaging unit 108 is configured to capture image signals at a rate of 60 frames per second, the processor receiving the image signals would need to process 20 megabytes of data every 10 seconds. Such requirements could require a processor that is physically too large to install within a typical clock spring. Furthermore, there are too few wires within typical clock springs to accommodate the transmission at that data transmission rate. Thus, various implementations overcome these constraints by including a first processing unit in the rotor that is configured for selecting at least a portion of the image signals received and communicating the selected portion of image signals (or calculated data from the selected portion of image signals) to a second processing unit outside of the rotor for further processing and analysis.

FIG. 10 illustrates a schematic flow of signals and/or data between various components of the OMS 100 and other vehicle systems through the clock spring 50, according to various implementations. In particular, the light source 122 and the imaging unit 108 are disposed on the rotating portion of the steering wheel assembly 104 and are electrically coupled to processor 202*a* disposed on the rotor 54. Other vehicle systems, such as human machine interface systems (e.g., touch pad(s), touch sensitive areas on the steering wheel assembly, and/or switches for interfacing with one or more vehicle systems, such as HVAC, audio, user communication, etc.), heater system for heating the steering wheel, horn activation, and the driver airbag system, may also be disposed on the rotating portion of the steering wheel assembly 104. These systems may be in communication with other processors disposed outside of the rotor 54 via wires 58 extending between the rotor 54 and the stator 52 or in communication with processor 202*a* and/or 202*b*. Furthermore, as noted above, the processor 202*a* or processor 202*b* may be further configured for controlling the light source 122. Or in other implementations as depicted by the dotted lines shown in FIG. 10, a separate processor may be disposed in the rotor 54 or stator 52 for controlling the light source 122. Furthermore, signals and/or data from the processors 202*a*, 202*b* or other processors disposed in the rotor 54 and/or stator 52 and from other systems disposed on the rotating portion of the steering wheel assembly 104 may be communicated to vehicle-side processing units, such as the processing unit(s) of the OMS 100, for further analysis and/or processing.

Although the implementations described above describe the clock spring 50 as used with components of the OMS 100, clock spring 50 may be coupled to other data acquisition systems and/or systems acquiring signals having a relatively high bandwidth. For example, in various implementations, at least one data acquisition unit may be mounted on a rotatable portion of a vehicle steering wheel assembly that is rotatable about a steering column. The first processing unit disposed within the rotor is configured for electrically receiving signals captured by the data acquisition unit and selecting at least a portion of the signals for communicating to a second processing unit. The second processing unit is disposed outside of the rotor in the vehicle (e.g., in the stator or outside of the stator) and is electrically coupled to the set of electrical wires extending between the rotor and the stator. The selected signals are electrically communicated through the set of electrical wires.

Figure 11B:
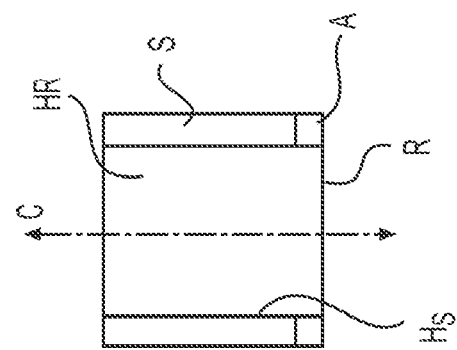
FIGS. 11A and 11B illustrate a slip ring according to one implementation.
Figure 11A:
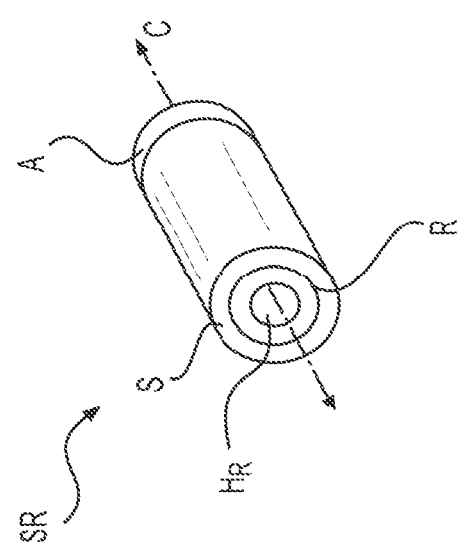
Figure 12:
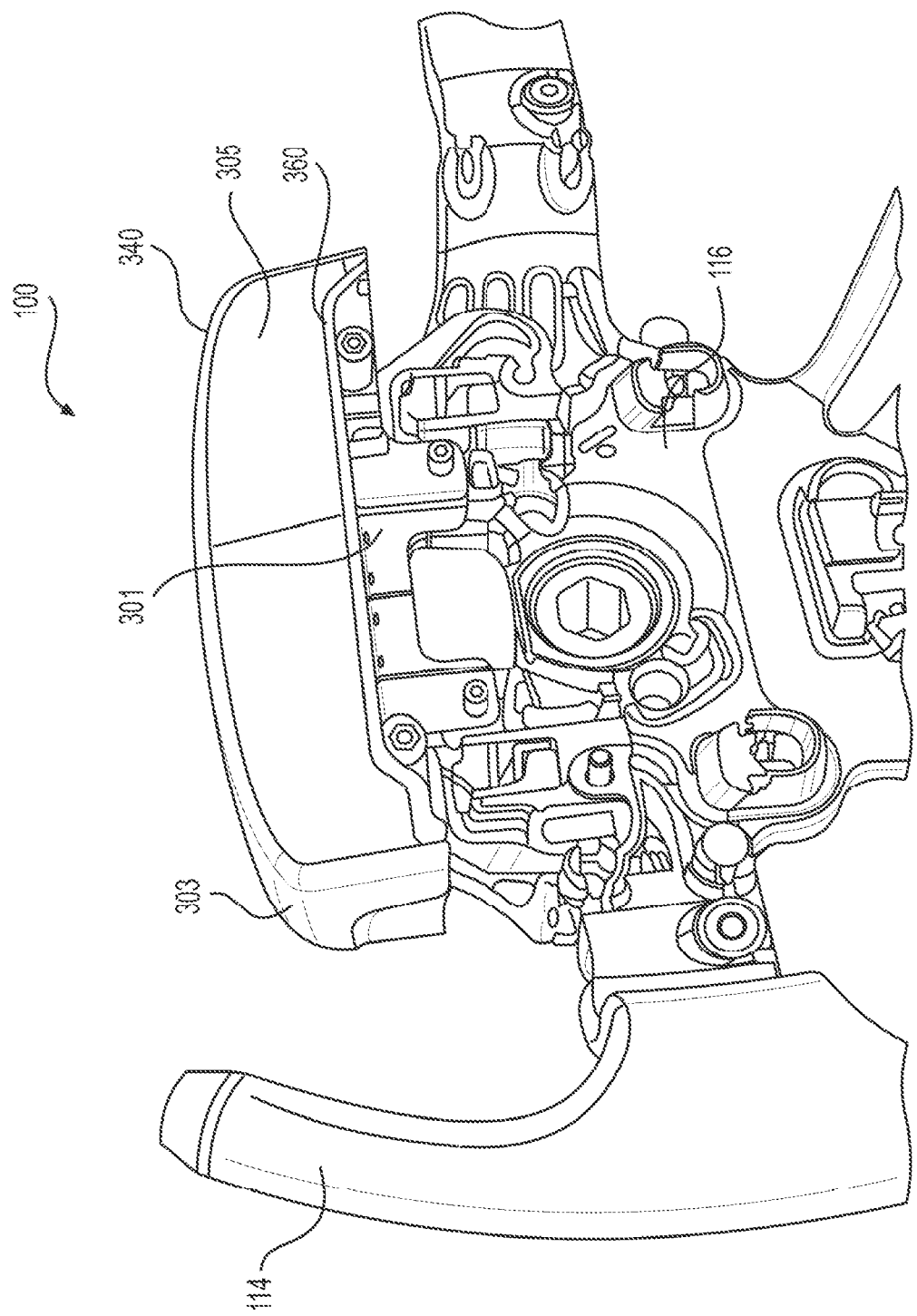
FIG. 12 is a perspective view of various components of the OMS, including the lens, assembled together, according to one implementation.
Figure 13A:
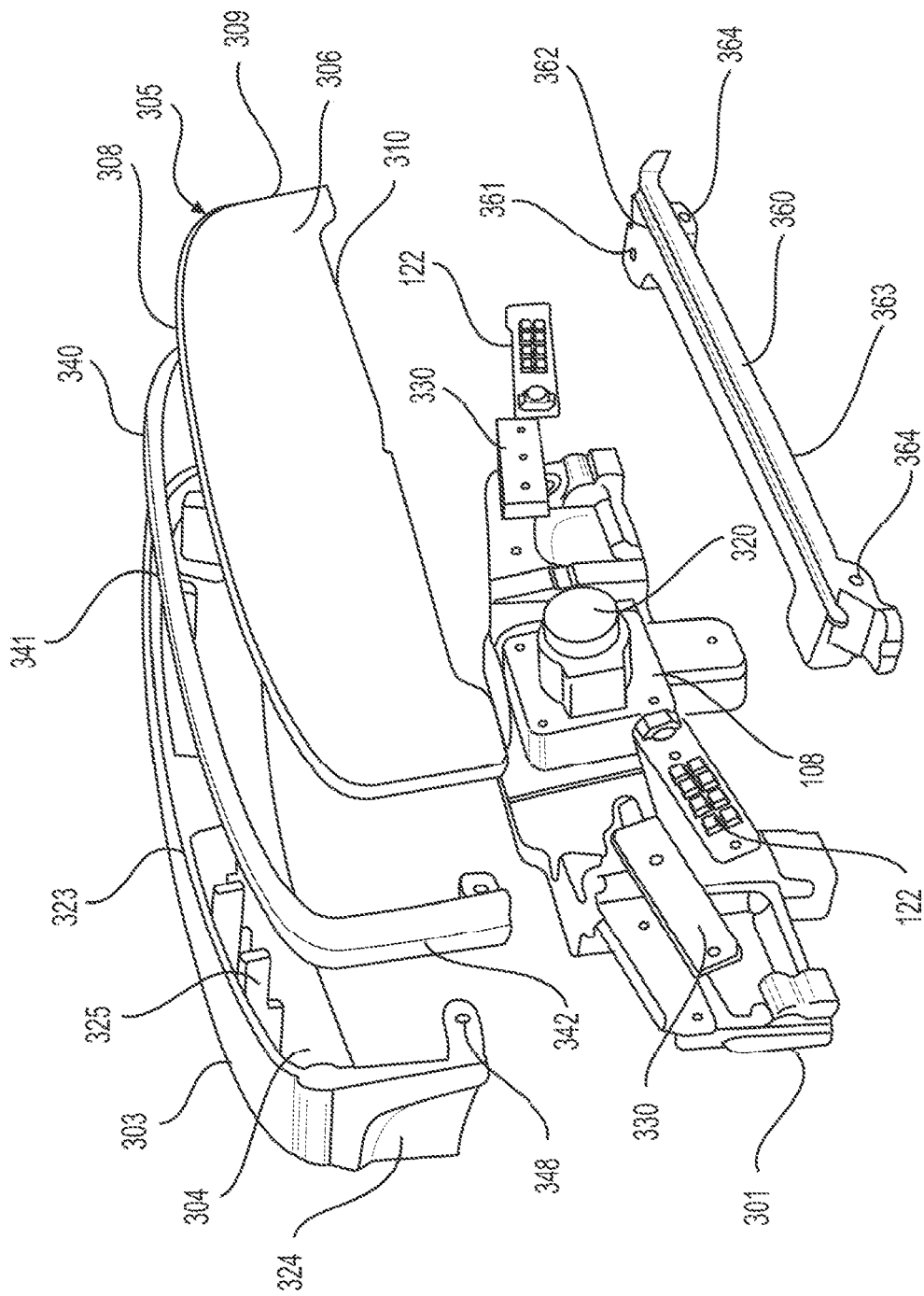
FIG. 13A is a perspective, exploded front view of the OMS shown in FIG. 12.
Figure 13B:
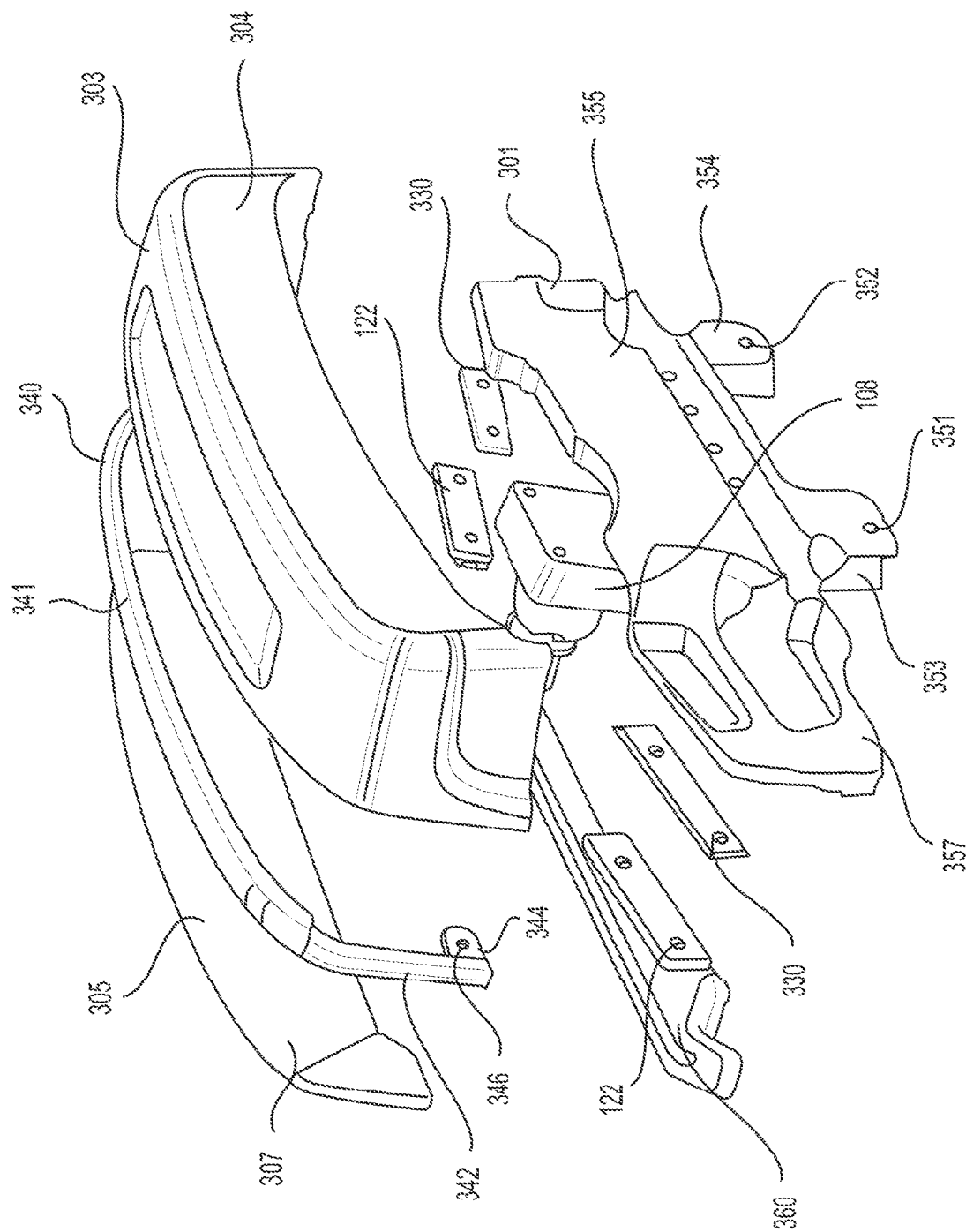
FIG. 13B is a perspective, exploded rear view of the OMS shown in FIG. 12.
Figure 14:
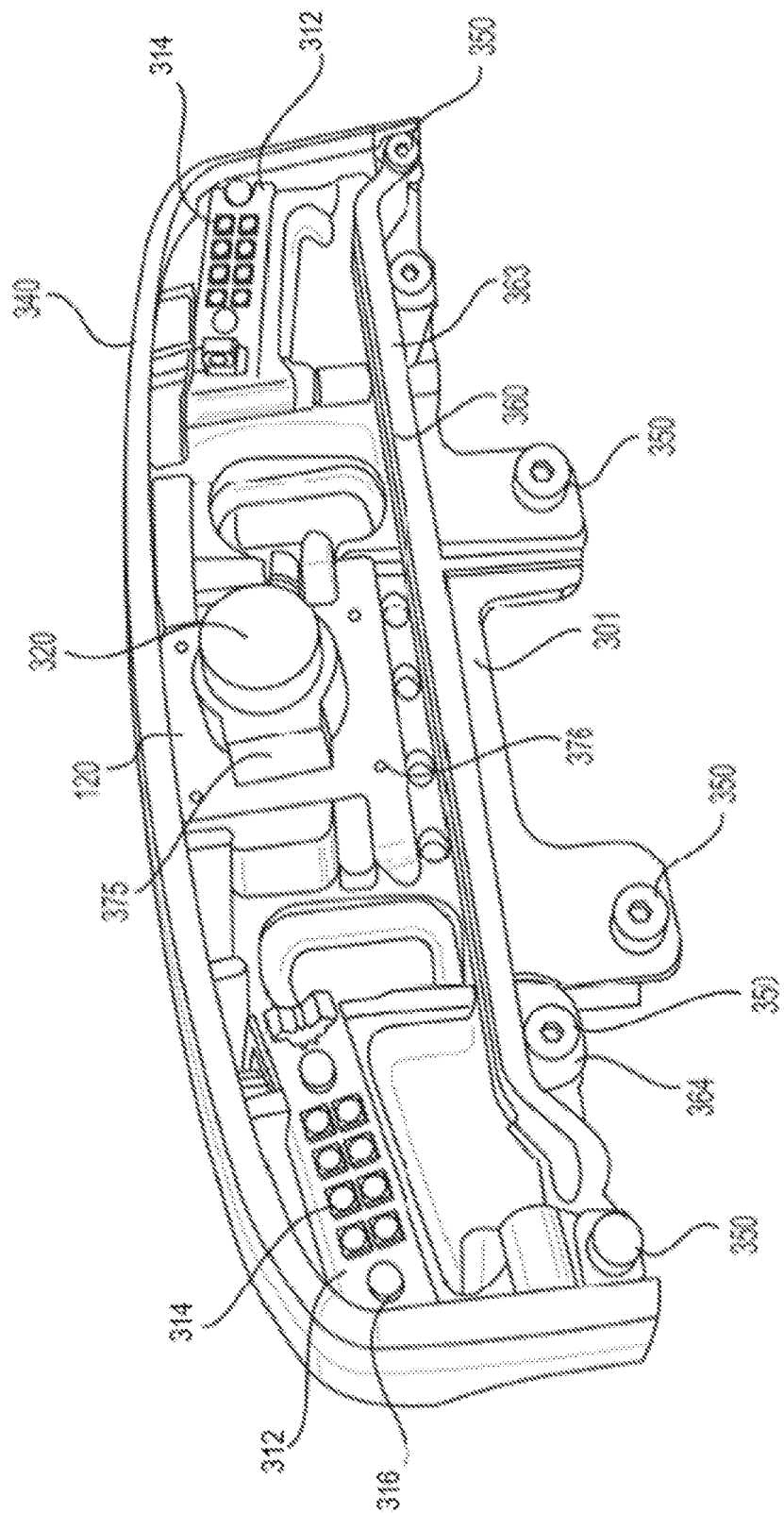
FIG. 14 is a perspective, assembled front view of the OMS shown in FIG. 12 without the lens.

In other implementations, such as shown in FIGS. 11A and 11B, a slip ring SR may be used instead of a clock spring to route electrical wires extending between the rotatable portion of the steering wheel assembly 104 and the non-rotatable portions of the steering wheel assembly and/or steering column 106. The slip ring SR includes a rotor portion R and a stator portion S. The rotor portion R is coupled to the rotating portion of the steering wheel assembly 104 and defines a hollow shaft Hr extending around its axis of rotation C. The rotor portion R is engaged within a hollow shaft Hs of the stator portion S such that the rotor portion R can rotate within the hollow shaft Hs of the stator portion S about the axis of rotation C. The stator portion S is coupled to a stationary portion of the steering wheel assembly 104 or steering column 106. The rotor portion R may also include an annular lip A that extends radially outwardly from one end of the rotor portion R and axially engages an outer axial end E of the stator portion S to prevent axial movement of the rotor portion R relative to the stator portion S. The electrical wires from components of the OMS 100 and other systems that may be disposed on the rotatable portion of the steering wheel assembly extend through the hollow shaft Hr of the rotor portion R and are configured to rotate with the rotor portion R.

In some implementations, the OMS 100 can be constructed as a single modular unit. For example, the single modular unit can be a self-contained unit including the camera 120, light source 122, and/or the processing unit 200 or a portion thereof. When constructed as a single modular unit, the OMS 100 can be conveniently packaged and conveniently installed in any steering wheel assembly 104. The single modular unit can be coupled to the steering wheel assembly 104 using any suitable fastening mechanism, such as, for example, screws, hooks, clips, or any other form of mechanical fastener known in the art, or adhesive (e.g., gluing), soldering, welding, or any other fastening technique known in the art. Configuring the OMS 100 as a single modular unit can allow for commonization of the electronics (e.g., integration) and therefore faster electronic communication.

FIGS. 12-15 and 17-20 show various implementations of how various components of the OMS 100 may be coupled to the steering wheel assembly 104. In particular, according to the implementation shown in FIGS. 12-15, the OMS 100 includes a mounting bracket 301, a housing 303, a lens 305, and imaging unit 108. The mounting bracket 301 includes a body 355 to which the imaging unit 108 is coupled and mounting tabs 353, 354 that extend from a lower edge of the body 355. Each tab 353, 354 defines an opening 351, 352, respectively, that aligns with openings defined in an upper area of the frame of the hub 116 of the steering wheel assembly 104. Each set of aligned openings receives a screw 350 to secure the mounting bracket 301 to the hub 116. However, in other implementations, the mounting bracket 301 may be attached to the steering wheel assembly 104 such that it extends upwardly from the central portion 112 using other suitable fastening mechanisms, such as, for example, hooks, clips, or any other form of mechanical fastener known in the art, or adhesive (e.g., gluing), soldering, welding, or any other fastening technique known in the art.

The mounting bracket 301 may be formed of aluminum, a magnesium alloy, steel or other suitable material capable of supporting the OMS 100 components and transferring at least a portion of the heat generated from the components to the frame of the steering wheel assembly 104. The mounting bracket 301 may also be integrally formed or molded with the central portion 112 of the steering wheel assembly 104.

The housing 303 includes a back surface 304 that is disposed adjacent to the back cover 126 of the steering wheel assembly 104, an upper surface 323 that extends transversely to the back surface 304, and side surfaces 324 that extend downwardly from side edges of the upper surface 323 and transversely from the back surface 304. The back surface 304, side surfaces 324, and upper surface 323 define an area therebetween that is configured for fitting around at least a portion of the body 355 of the mounting bracket 301. The upper surface 323 may include fins 325 that extend in the direction from a front perimeter of the housing 303 to the back surface 304 and are distinct and spaced apart from each other in the direction between the side surfaces 323. These fins 325 provide more surface area so as to be a more effective heat sink and provide structural reinforcement for the upper surface 323 of the housing 303.

Figure 17B:
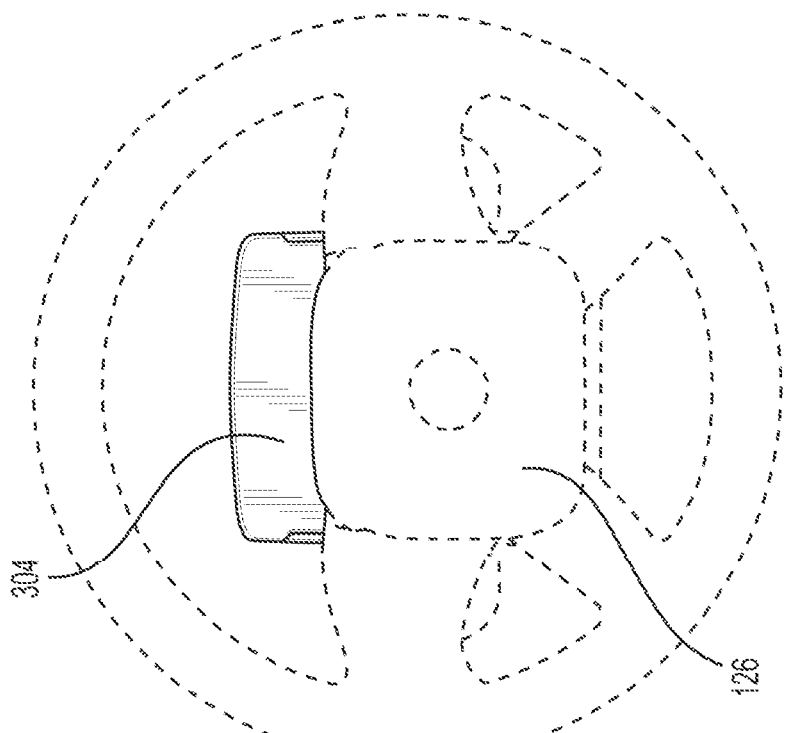
FIGS. 17A and 17B are front perspective and rear views, respectively, of a housing according to one implementation.
Figure 17A:
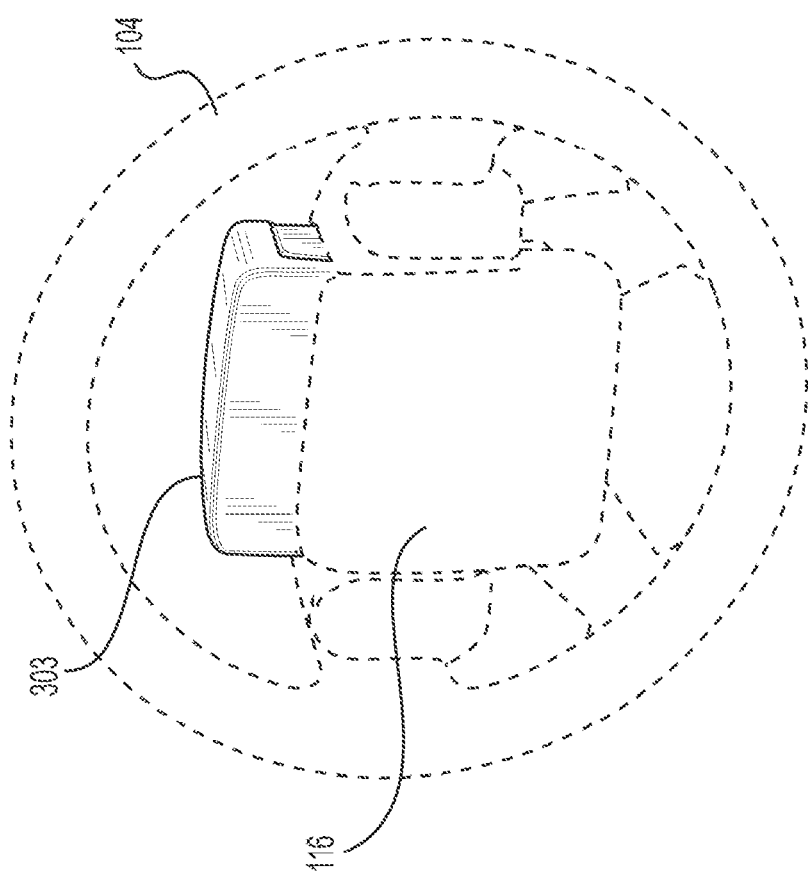

In the implementation shown in FIG. 17B, the back surface 304 fits flush with, or within the same plane as, the back cover 126 of the steering wheel assembly 104. However, in the implementations shown in FIGS. 18B and 19B, the back surfaces 304', 304", respectively, are not flush with the back covers 126', 126", respectively, but are disposed in a plane that is spaced inwardly (toward the front of the assembly 104', 104", respectively) from the plane that includes the back covers 126', 126".

In the implementations shown in FIGS. 12-15 and 17A, the upper surface 323 and side surfaces 324 of the housing 303 define a substantially rectangular shaped perimeter. The perimeter may be slightly arcuate shaped along the upper surface 323 and/or have rounded corners between the upper 323 and side surfaces 324 to blend in aesthetically with the steering wheel assembly 104.

However, in the implementation shown in FIGS. 18A-18B, the upper surface 323' of the housing 303' defines a perimeter that includes a rounded, semi-circular central portion 380 that extends upwardly from the steering wheel assembly 104', and the side surfaces 324' of the housing 303' are angled or skewed toward each other and the central portion 380. This shape may blend in aesthetically with the shape of steering wheel assembly 104' shown in FIGS. 18A and 18B. And, in the implementation shown in FIGS. 19A and 19B, the upper surface 323" of the housing 303' defines a perimeter that includes a trapezoidal shaped central portion 385 that extends upwardly from the steering wheel assembly 104". Side surfaces 324" of the housing 303" are angled or skewed toward each other and the central portion 385. This shape may blend in aesthetically with the shape of the steering wheel assembly 104" shown in FIG. 19A.

The imaging unit 108 is coupled to the mounting bracket 301 adjacent a central portion of the body 355 of the mounting bracket 301. In the implementation shown in FIGS. 13A-15, the imaging unit 108 is camera 120 that includes a lens 320, such as, for example, an adjustable lens or a fixed lens. The camera lens 320 is disposed at a distal end of the camera 120, and light enters the camera 120 via the lens 320. In the implementation shown in FIG. 14, the camera lens 320 is secured to the camera 120 using at least one side set screw 375, and camera 120 is coupled to the mounting bracket 301 using screws 376. However, as noted above, other types of imaging units may be used in other implementations, and other fastening mechanisms may be used to couple the camera 120 to the mounting bracket 301 and/or within the housing 303.

In addition, in some implementations, the light source 122 is coupled to the mounting bracket 301 and is disposed adjacent the imaging unit 108. For example, in the implementation shown in FIGS. 13A-15, the light source 122 includes two printed circuit boards 312 each having four pairs of LEDs 314 disposed thereon. One of the printed circuit boards 312 is coupled to the mounting bracket 301 on a right side of the imaging unit 108, and the other printed circuit board is coupled to the mounting bracket 301 on a left side of the imaging unit 108. A thermal coupling material 330 configured for transferring heat between the printed circuit board and the mounting bracket 301 is disposed between the printed circuit board and the mounting bracket 301. The thermal coupling material 330 may be a thermal coupling pad, such as a foam pad having thermally conductive materials disposed therein, or a thermal coupling paste, for example. The pad, for example, may include adhesive on both sides for attaching to a back surface of the printed circuit boards and a front surface of base 355 of the mounting bracket 301. In addition to the adhesive or as an alternative to the adhesive, each pad may define openings that align with openings defined in the printed circuit board and the mounting bracket for receiving a screw 316 to secure the pad and the printed circuit board 312 to the mounting bracket 301.

Figure 15:
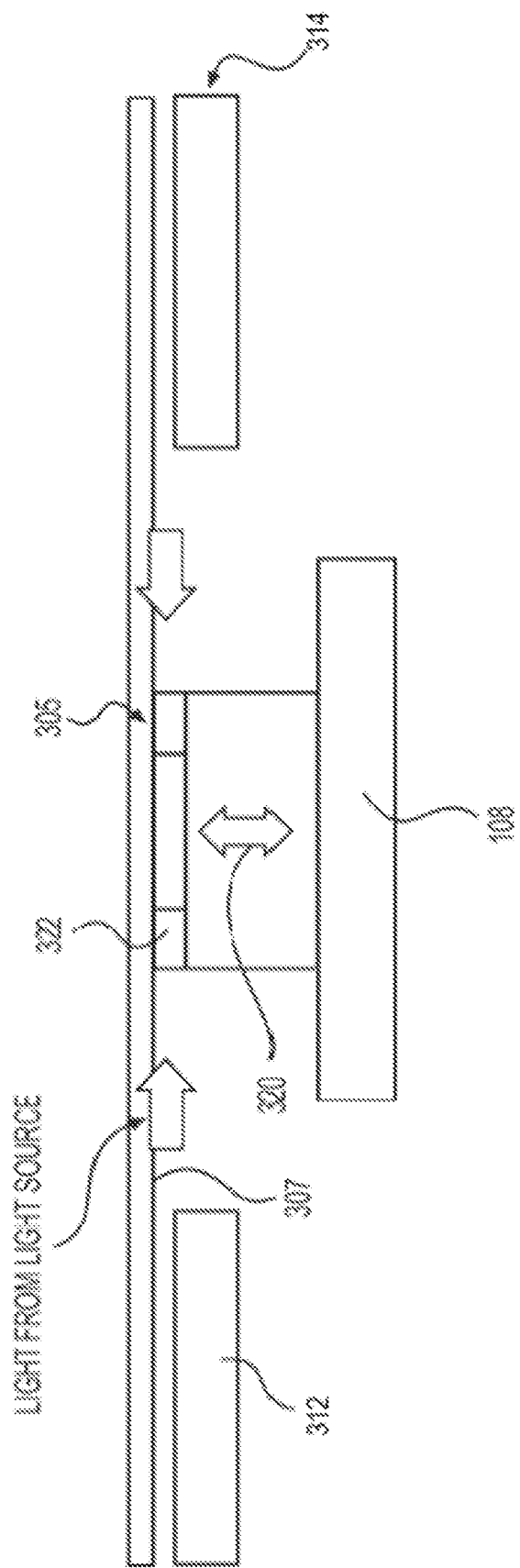
FIG. 15 is a schematic, top view of certain components of the OMS shown in FIG. 12.

In various implementations, the light emitted from the light source 122 may internally reflect from the lens 305 or otherwise reach the camera lens 320 or other type of imaging unit 108 before passing through the lens 305. To prevent the light from the light source 122 from entering the imaging unit 108 prior to exiting the lens 305, a light blocking material may be disposed between a distal end of the imaging unit 108 and the light source 122. For example, as shown in FIG. 15, a ring 322 of compressible material, such as a polymeric foam, silicone, rubber, etc., may be extend between a distal end of the camera lens 320 and the back surface 307 of the lens 305. The ring 322 is annular shaped to correspond to the outer perimeter of the camera lens 320, but in other implementations, the ring 322 may be shaped to correspond to the perimeter of other types of imaging units 108. The compressible material allows the camera lens 320 to be adjusted (e.g., zoom in or out) in the direction of the lens 305 while maintaining contact with compressible material.

Furthermore, the light blocking material may be secured in position using various fastening mechanisms, such as, for example, screws, hooks, clips, or any other form of mechanical fastener known in the art, or adhesive (e.g., gluing), soldering, welding, or any other fastening technique known in the art, a thread (e.g., a DSLR camera filter ring), and/or a combination thereof.

Figure 20:
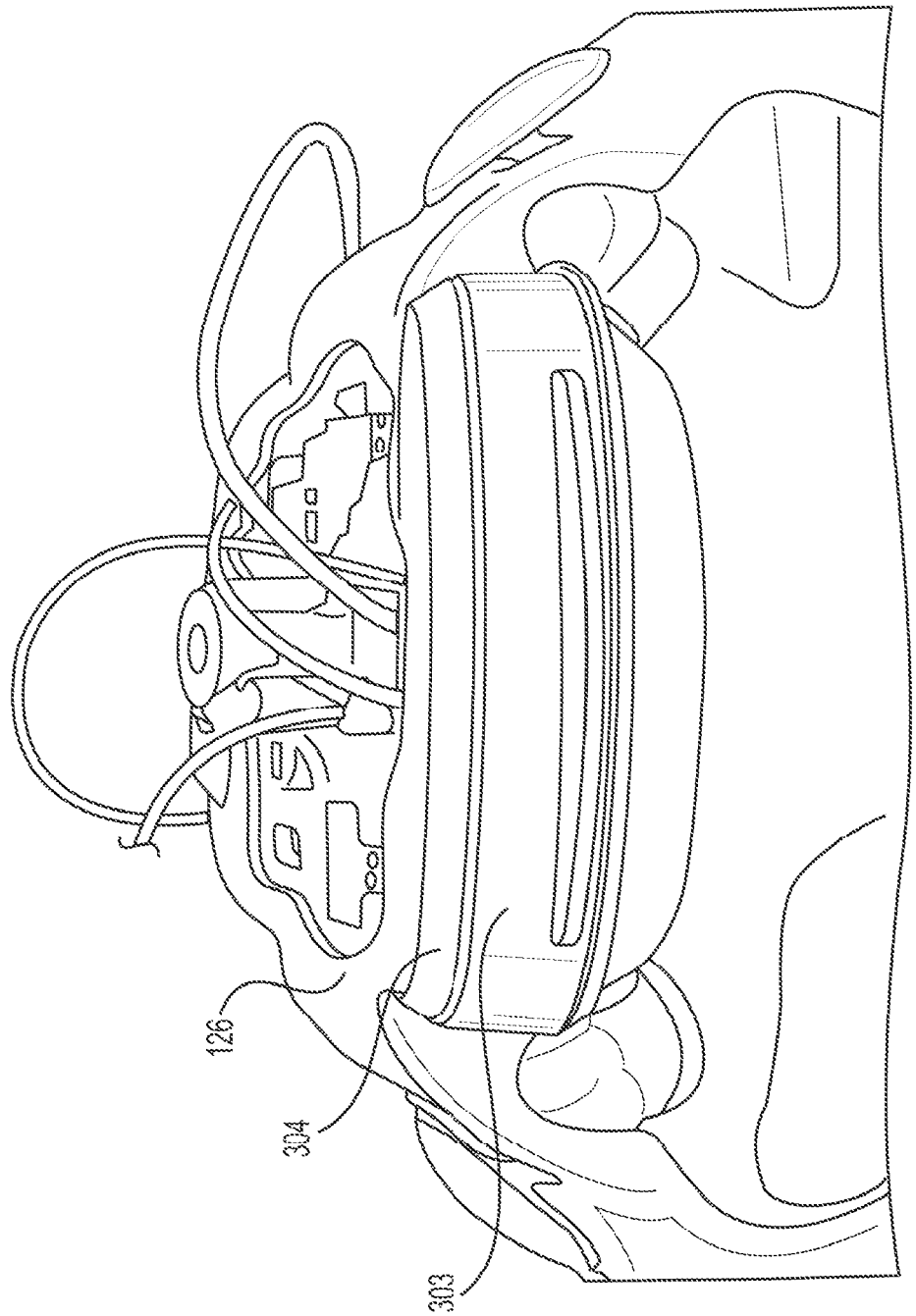
FIG. 20 is a top view of the steering wheel assembly and the housing shown in FIG. 12 coupled thereto, according to one implementation.

As shown in FIG. 20, the electrical wires coupling the light source 122 and the imaging unit 108 to at least one processor and/or power source may be extended from the central portion 112 of the steering wheel assembly 104 through the opening in the back cover 126 configured for coupling to the steering shaft 106. As noted above, the wires may be electrically coupled to processor 202a in the rotor 54, processor 202b in the stator 52 of the automotive clock spring 50, and/or to one or more processors disposed outside of the automotive clock spring 50. Furthermore, in some implementations, the wires may be coupled to processor 202c disposed within the housing 301, and the processor 202c may be coupled to the mounting bracket 301 or be otherwise disposed in the housing 301. As noted above, the processor 202c may be coupled to processor 202a in the rotor 54 of the automotive clock spring 50 and/or the processor 202b in the stator 52 of the clock spring 50. And, in some implementations, the processor 202c may be disposed on one or both of the printed circuit boards 312 shown in FIG. 14. Furthermore, in one implementation (not shown), the OMS 100 may include one printed circuit board on which the processor 202c and the light source 122 are disposed.

The lens 305 includes a front surface 306, a back surface 307 opposite the front surface 306, an upper perimeter 308, a lower perimeter 310, and side perimeters 309 extending between the upper 308 and lower perimeters 310. The back surface 307 is disposed facing the imaging unit 108, the front surface 306 is disposed facing the interior of the vehicle.

Figure 16:
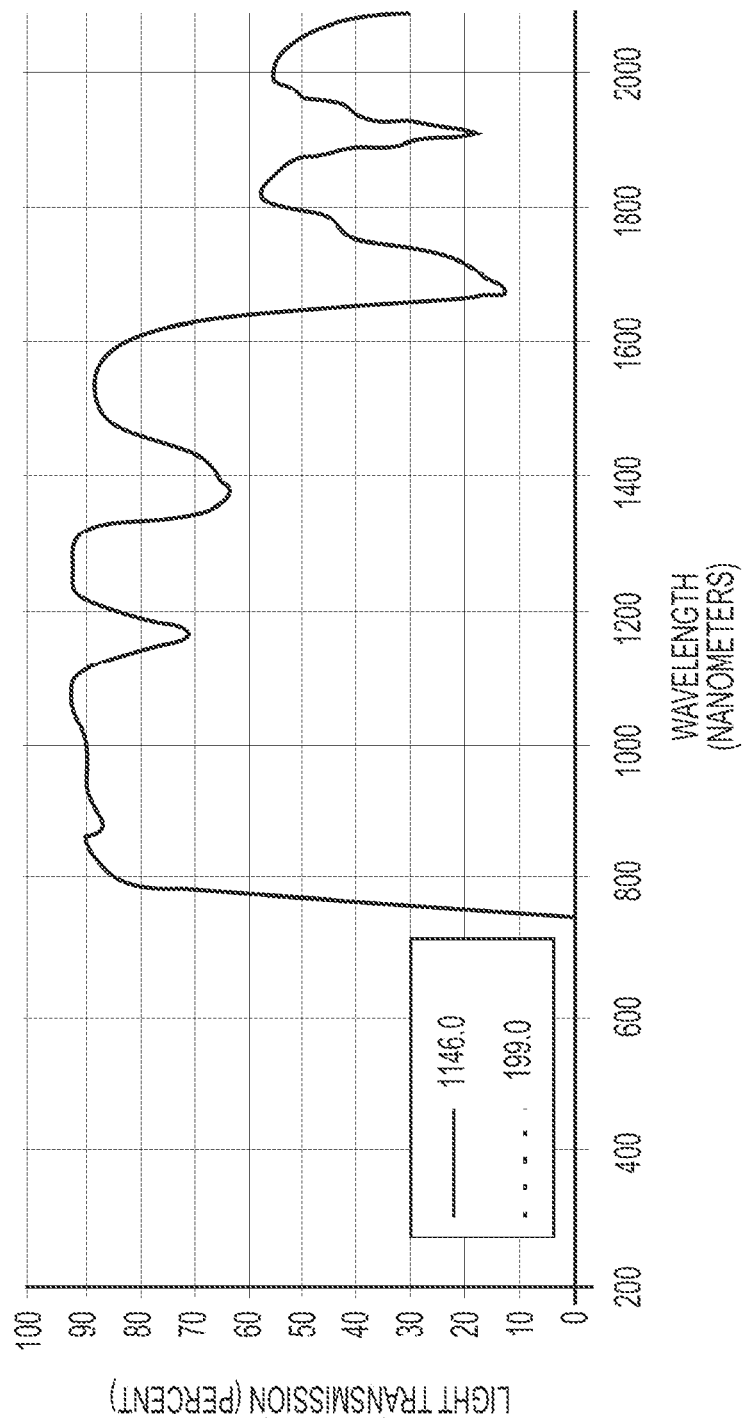
FIG. 16 is a spectral transmission curve showing the percent of light transmitted at various wavelengths through an ACRYLITE lens, according to one implementation.

In an implementation in which the imaging unit 108 detects infrared image signals, the lens 305 may be configured for optically blocking visible light and allowing infrared light to pass through the lens 305. For example, the lens 305 may be formed from of poly(methyl methacrylate) (PMMA) or other acrylic-like material. In the implementation shown in FIGS. 12-13B, the lens 305 is formed from ACRYLITE, which is a PMMA, acrylic 1146-0 grade, black material manufactured by Evonik Industries. ACRYLITE is opaque to visible light but allows the transmission of infrared light starting at about 750 nanometers. ACRYLITE also blocks the transmission of ultraviolet light. FIG. 16 illustrates the percentage of light that passes through ACRYLITE at various wavelengths. As shown, no light under about 750 nanometers passes through the ACRYLITE. The lens 305 may further be cut from a sheet of the visible light blocking material or molded to a particular shape.

In other implementations, the lens may be formed from any polycarbonate material, such as, for example, polycarbonate (e.g., LEXAN), acrylonitrile butadiene styrene polycarbonate (ABS-PC), PC-ABS, acrylic-styrene-acrylonitrile terpolymer polycarbonate (ASA-PC), or other plastics that include polycarbonate as a major alloying element. In addition, the lens may be formed from glass, cellulose acetate butyrate (CAB) or butyrate, glycol modified polyethylene terephthalate (PET-G), or other polymers, for example.

Furthermore, in some implementations, an optical film or coating/paint may be applied to one or both of the back surface 307 or front surface 306 of the lens 305 that blocks visible and/or UV light and allows transmission of infrared light.

The lens 305 shown in FIGS. 12-19B are flat, but in other implementations, the lens may be curved.

In the implementations shown in FIGS. 12-19B, a trim piece 340 and a lens support piece 360 are used to prevent movement of the lens 305 relative to the housing 303 and steering wheel assembly 104. In particular, the trim piece 340 includes an upper portion 341 and side portions 342. The upper portion 341 is shaped to follow the shape of the front perimeter of the upper portion 323 of housing 303, and the side portions 342 are shaped to follow the shape of the front perimeter of side portions 324 of the housing 303. The lens 305 is disposed between the front perimeter of the housing 303 and the trim piece 340 to secure the upper perimeter 308 and side perimeters 309 of the lens 305 from movement relative to the housing 303. In addition, the lens support piece 360 has an elongated body and includes an upper surface 361 that defines a channel 362 extending along a length of the elongated body. The lens support piece 360 is disposed adjacent where the mounting bracket 301 is coupled to the steering wheel assembly 104 and extends between the front perimeters of the side portions 342 of the trim piece 340. At least a portion of the lower perimeter 310 of the lens 305 engages the channel 362 to prevent movement of the lower perimeter 310 of the lens 305 relative to the housing 303. The lens support piece 360 may also cover a gap between the central hub 116 of the steering wheel assembly 104 and the lower perimeter 310 of the lens 305. However, in other implementations, the lens 305 may be secured to the housing 303 without any trim or lens support pieces, it may be secured by single or multiple trim pieces, or it may be secured by the housing and the lens support piece without any trim pieces.

The trim piece 340 includes tabs 344 that extend inwardly from each of the side portions 342. Each tab 344 defines an opening 346 that aligns with openings 348 defined through the housing 303 and openings 357 defined through the mounting bracket 301. To secure the trim piece 340 and the housing 303 to the mounting bracket 301, a screw 350 is engaged through aligned openings 346, 348, 357 on each side of the trim piece 340, housing 303, and mounting bracket 301.

The trim piece 340 may be formed of a rigid material, such as a plastic, metal, glass, or ceramic material. In addition, in the trim piece 340 may be dyed, coated, plated, or painted a particular color. For example, in the implementation shown in FIGS. 12-17B, the trim piece 340 is coated, plated, or painted with a chrome color. However, in other implementations, the trim piece 340 may be colored differently, such as colored black or grey to match the housing or the steering wheel assembly.

Similarly, the lens support piece 360 may be formed of similar rigid materials and may also be dyed, coated, plated, or painted a particular color. In addition, the lens support piece 360 may be coupled to the mounting bracket 301 via screws, clips, adhesive, or other suitable fastening mechanism. In the implementation shown in FIGS. 12-15, the lens support piece 360 includes bosses 364 that extend from a lower surface 363 of the lens support piece 360. The bosses 364 define openings that align with openings defined in the mounting bracket 301. A screw 350 is engaged in the aligned opening in the lens support piece 360 and the mounting bracket 301 to secure the lens support piece 360 adjacent the mounting bracket 301. In the implementations shown in FIGS. 12A through 20, various components of the OMS 100 are coupled to the central portion 112 of the steering wheel assembly. By coupling the imaging unit 108 to the central portion 112, such as is described above, the imaging unit 108 is closer to one or more occupants in the vehicle cabin and can thus receive higher resolution image signals of the imaging area than when the imaging unit is disposed further from the occupants in the vehicle, such as on the steering column 106 or elsewhere in the vehicle cabin. Furthermore, coupling the imaging unit 108 to the central portion 112 allows for a greater field of view when the image signals are adjusted based on steering angle or a rate of angular rotation. In addition, by coupling the imaging unit to the rotatable portion of the steering wheel assembly, the field of view of the imaging unit is not further obscured by the rotatable portions of the steering wheel assembly when the position of the steering wheel assembly relative to the driver or other occupant is tilted upwardly or extended.

In addition, in the implementations described above in relation to FIGS. 12 through 20, the imaging unit 108 is not visible to the driver or other occupants, which prevents the OMS 100 from distracting or intimidating the driver or other occupants. Furthermore, the modularity of the implementations described above in relation to FIGS. 12 through 30 allows the OMS 100 to be integrated more quickly and easily into existing and new steering wheel assemblies 104. By disposing the housing 303 and other components adjacent the back cover 126 of the steering wheel assembly 104, it is easier to route the electrical wires from the OMS 100 components and allows the housing 303 to be coupled to a non-deployable surface, as compared to coupling the components closer to the deployable surface of the driver air bag area. Furthermore, by having the OMS 100 disposed on the upper portion of the hub 116 of the steering wheel assembly 104, the OMS 100 has an unobstructed view of the occupants of the vehicle even during steering wheel assembly rotation, and the OMS 100 is disposed just below the instrument panel in the field of the view of the driver, which may reduce the amount of distraction.

As provided herein, the OMS 100 can be used to monitor a driver or other occupant in a vehicle. Using the OMS 100 to monitor the driver or other occupant can include providing and/or coupling the OMS 100 to the steering wheel assembly 104 of the vehicle. The OMS 100 can include any/all of the OMS 100 components described herein. As outlined above, the OMS 100 can include the imaging unit 108 configured to capture an image signal corresponding to imaging area 110 in the vehicle, where the imaging area 110 encapsulates the driver and/or other vehicle occupant. The imaging unit 108 can, for example, be fixed to a steering wheel, a steering column, or a dashboard. In some embodiments, the imaging unit can be fixed to an articulating camera mount structure. In other embodiments, the imaging unit 108 can be configured to rotate with the central portion 112 of the steering wheel assembly 104. The steering wheel assembly 104 can be configured to rotate relative to the vehicle's steering column 106.

Monitoring the driver and/or occupant can further include capturing an image signal corresponding to the imaging area 110 in the vehicle and processing the image signal to identify an analysis region. The analysis region can be analyzed to determine an occupant information parameter, and the occupant information parameter can, in turn, be analyzed to determine an occupant state. An output signal can then be provided based on the determined occupant state. In some implementations, the OMS 100 can further include a processing unit 200 to perform one or more of the processing, analyzing and outputting steps of the OMS 100. The vehicle can also include a processing unit 200 separate from the OMS 100 where one or more of the processing, analyzing and outputting steps of the OMS 100 are performed by this (remote) processing unit 200.

In some implementations, the OMS 100 is used to monitor the occupants during semi-autonomous or autonomous driving mode. Semi-autonomous or autonomous driving mode indicates a driving state wherein the vehicle operates, at least partially, without requiring certain driver inputs. For example, semi-autonomous or autonomous driving mode includes operating modes in which the vehicle operates without requiring the driver to contact the steering wheel, accelerate, brake, and/or change lanes. The spatial position that an occupant prefers while fully operating the vehicle may not be the best position for monitoring the same occupant during semi-autonomous or autonomous driving mode. Spatial positioning set by the driver (or other occupant) is based on the occupant's comfort and ability to see the vehicle's surroundings, whereas the optimal positioning of an occupant during semi-autonomous or autonomous driving mode is based, at least in part, on the ability of the OMS to fully capture the occupant within the FOV of the imaging unit 108. In some implementations, the OMS 100 monitors the occupants during semi-autonomous or autonomous driving mode to ensure the occupants are in the best spatial positions, mental states, and physical states to exchange some degree of control between the semi-autonomous or autonomous driving system and the driver.

For example, in some implementations, the OMS 100 recognizes if the occupant is in an unsafe position, for example, too close to the dashboard, the windshield, or the air bags. If the occupant is in the unsafe position, an adjustment signal is generated and communicated to the seat positioning system to move the occupant to a safer location.

Figure 21:
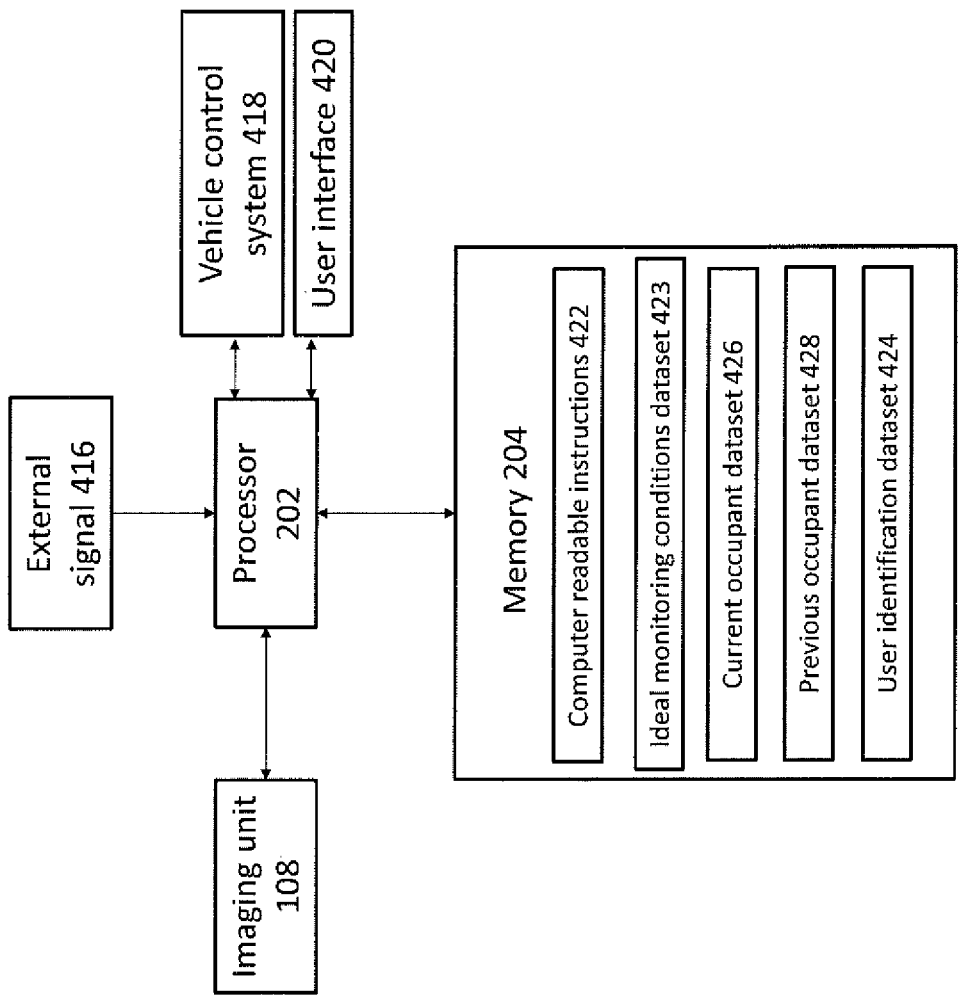
FIG. 21 is a schematic illustrating the interaction of the processor with other aspects of the vehicle and the occupant monitoring system.

FIG. 21 is a schematic diagram of processor 202 interfacing with the imaging unit 108, the memory 204, and a user interface 420, for the purpose of receiving external signals 416 and communicating adjustment signals to vehicle control systems 418. Computer readable instructions 422 stored on the memory 204 cause the processor 202 to initiate a monitoring loop, such as the monitoring loop described below in relation to FIG. 22. In the implementation shown, the memory 204 stores various datasets, such as monitoring conditions datasets 423, current and older occupant datasets 426, 428, and user identification datasets 424, all of which will be described in more detail below. While FIG. 22 shows a method that includes a monitoring loop, it should be understood that certain monitoring processes can be performed without the need for a loop (i.e., by analyzing a single image).

Figure 22:
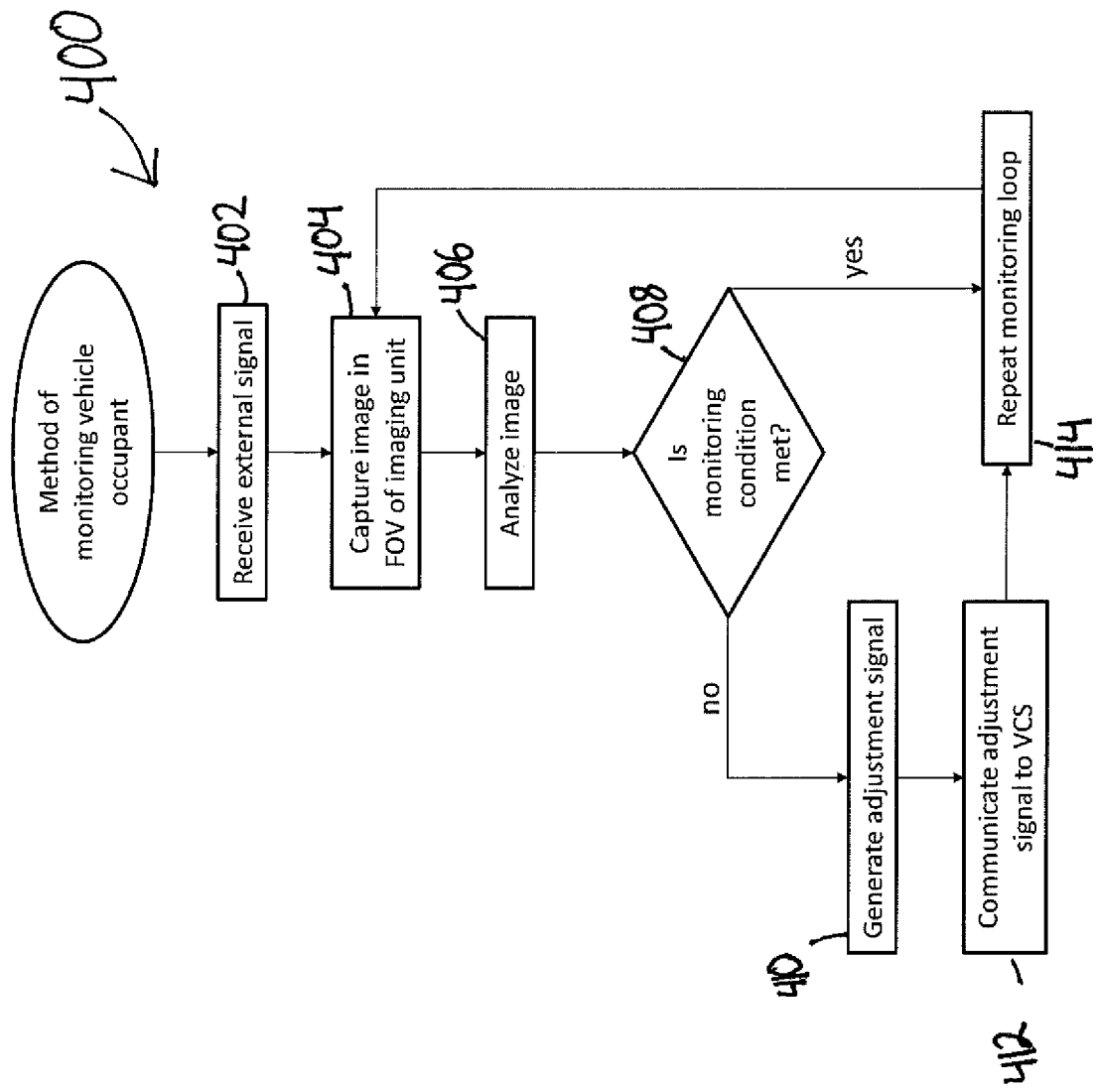
FIG. 22 illustrates a method of monitoring a vehicle occupant.

FIG. 22 illustrates a method 400 of monitoring the vehicle occupant. The method includes a monitoring loop in which information received from the OMS 100 is periodically used to generate adjustment signals for communication to one or more vehicle control systems (VCS) 418. The method 400, illustrated in FIG. 22, begins at step 402 with the receipt of the external signal 416. In response to receiving external signal 416, the processor 202 captures an image in the field of view (FOV) of the imaging unit 108, as shown in step 404. The external signal 416 may include, for example, the starting of a vehicle engine, the unlocking of a car door (for example, via a wireless signal or a manual lock), an adjustment of seat positioning settings, an adjustment of steering assembly positioning settings, the locking or unlocking of the seat buckle, a request from a user interface, and/or a signal from at least one VCS 418 that the vehicle is operating in a semiautonomous or an autonomous driving mode. In some examples, the external signal may indicate that the occupant is in a seat, or that the occupant is in contact with a steering wheel or at least one dashboard control. Thus, the external signal may indicate to the OMS 100 that the occupant is still in the car, even if the occupant is not within the FOV of imaging unit 108. Next, in step 406, the processor 202 analyzes the image to determine if at least one monitoring condition is met. The decision step of this analysis is shown as step 408. A monitoring condition is a rule used to determine if the occupant is in a state or position that enables monitoring by the OMS 100. If the monitoring condition is not met, the computer readable instructions 422 cause the processor 202 to generate an adjustment signal (step 410) and communicate the adjustment signal to a VCS 418 (step 412). A VCS 418 can include, but is not limited to, seat positioning systems, steering assembly positioning systems, mirror positioning systems, window positioning systems, armrest positioning systems, occupant "left behind" monitoring systems, semi-autonomous or autonomous driving systems, lighting systems, and/or seatbelt positioning systems. In some implementations, especially during semi-autonomous or autonomous driving mode, the steering wheel and the steering column can be decoupled and controlled as two separate vehicle control systems. Decoupling the steering wheel from the steering column can enable secondary non-driving control functions (for example, as a means for information entry and/or monitoring; e.g. a workstation) while the vehicle operates in semi-autonomous or autonomous driving mode. In such a scenario, if there is a request from the VCS to transition back to normal driving, the steering wheel can provide information on the need for the driver to resume normal driving control and then provide normal steering function. Regardless of whether the monitoring condition is met, the monitoring loop is repeated in step 414. Repetition of the monitoring loop can take place automatically, without input from an occupant. Alternatively, a single image can be captured and analyzed to determine if the monitoring condition is met. The processor 202 can generate and communicate an adjustment signal based on this single image.

The monitoring condition may take into consideration any of the previously described occupant information parameters. A monitoring condition may be, for example, the presence of the occupant in the FOV, the position of the occupant within the FOV, the proximity of the occupant to the imaging unit 108, the area and distance of the occupant's face, and/or the angle of the occupant's face. For example, the absence of the occupant from the center of the FOV may trigger adjustment signals to be generated and communicated to the seat positioning system to move the occupant closer to the FOV. In addition or alternatively, adjustment signals may be generated and communicated to the steering assembly positioning system to move the steering assembly closer to the occupant if the occupant is too far from the imaging unit 108 or further away if the occupant is too close to the imaging unit 108. In implementations where the imaging unit 108 is positioned on the steering column or steering wheel, the distance between the steering column and/or steering wheel and the occupant may be adjusted to allow the imaging unit 108 to more accurately visualize biological or emotional states of the occupant, such as heart rate, breathing rate, facial expression and/or eye movements. Adjustment signals can include, for example, changes to the seat height, the seat angle, the seat proximity to imaging unit 108, the angle and/or length of steering column 106, the telescoping setting of the steering column, and/or the angle of steering wheel assembly 104. An adjustment signal may also cause a change in one or more lighting systems within the vehicle to better enable visualization of the occupant by the OMS 100. And, in some implementations, the adjustment signal may affect a portion of the imaging unit 108. For example, the lens or angle of the imaging unit 108 may be adjusted to reduce glare that may obscure information about the occupant's gaze.

Figure 23:
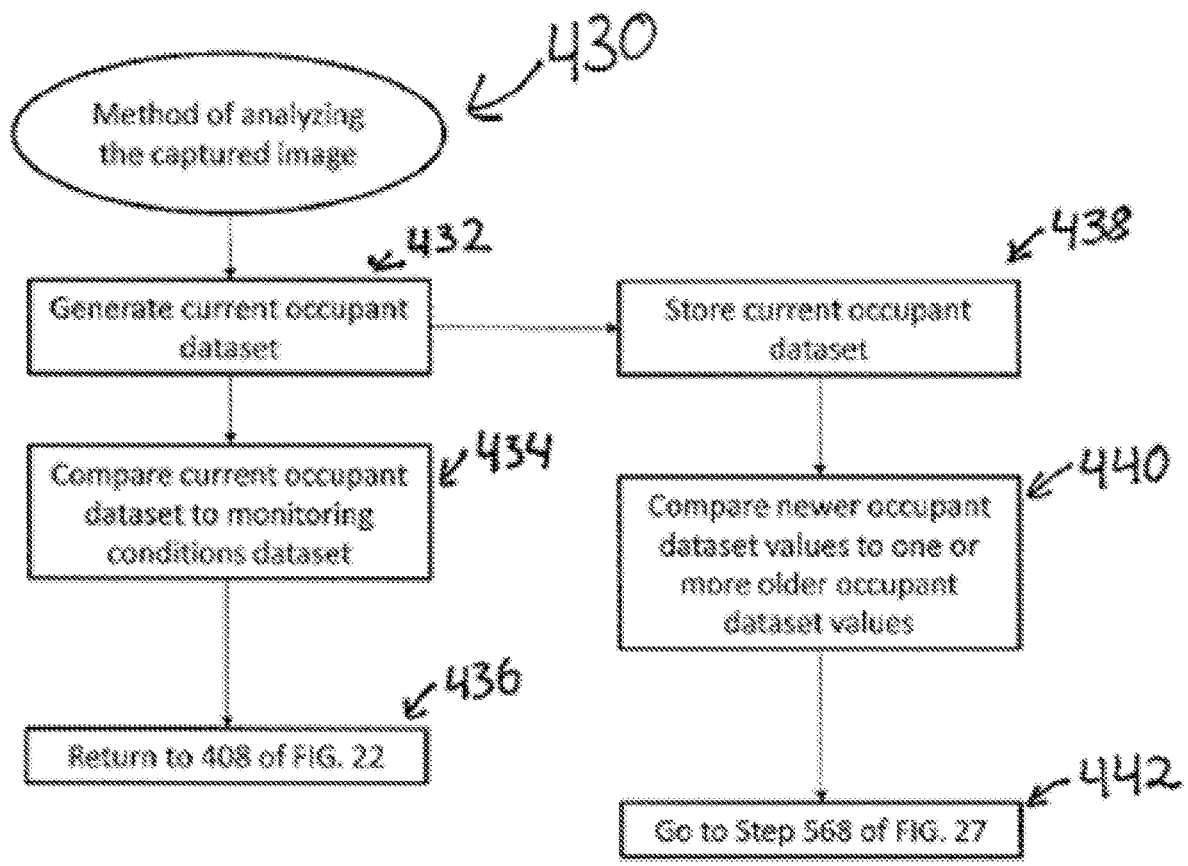
FIG. 23 illustrates a method of analyzing a captured image.

FIG. 23 illustrates a method 430 of analyzing a captured image according to one implementation. This method 430 provides an exemplary way of carrying out step 406 of the method 400 illustrated in FIG. 22. Beginning at step 432, a current occupant dataset 426 is generated. The current occupant dataset 426 is a collection of occupant information parameters that describes the image numerically. For example, the current occupant dataset 426 may include at least one value pertaining to the presence of the occupant in the FOV, the position of the occupant within the FOV, the proximity of the occupant to the imaging unit, the area of the occupant's face, the angle of the occupant's face, and/or the position, area, and angle of other bodily components of the occupant (such as, for example, the neck, chest, stomach, arm, leg, hand, and/or foot).

Next, in step 434, the current occupant dataset 426 is compared to a monitoring conditions dataset 423 stored in the memory 204 to determine if the monitoring conditions are met. The monitoring conditions dataset 423 holds ranges of acceptable numeric values for one or more occupant information parameters (with respect to whether or not the occupant can be properly monitored). For example, as described above, one monitoring condition may be whether the occupant is positioned within the FOV. The monitoring condition dataset, for this particular monitoring condition, holds a range of acceptable values that correlate to the position of the occupant relative to the center and/or perimeter of the FOV to allow the OMS to monitor the occupant. The range may be set, for example, to ensure a coverage region that allows continuous tracking of the face and/or other occupant bodily components even if the occupant's head and/or other occupant bodily components translates and/or rotates, which enables continuous active tracking that accounts for occupant positional shifts (e.g., if the occupant slumps in the seat gradually over time). Another monitoring condition may include the distance of bodily component(s) of the occupant to the imaging unit 108. The monitoring conditions dataset 423 may store the range of distances that enables acceptable resolution of facial features and/or features of other bodily components.

Referring still to FIG. 23, once the current occupant dataset 426 has been compared to the monitoring conditions dataset, the processor decides, in step 436, if the monitoring condition is met, which corresponds to step 408 of FIG. 22. If the monitoring condition is not met, an adjustment signal may be generated based on deviations between the current occupant dataset and the monitoring conditions dataset. The adjustment signal is then communicated to the VCS 418, and, in some implementations, the monitoring loop can be repeated as shown in FIG. 22.

Referring to step 438 of FIG. 23, the current occupant dataset 426 may also be stored to the memory 204 (or other storage) with a time stamp. Storing the current occupant dataset 426 with a time stamp enables the comparison of the current occupant dataset 426 to one or more older occupant datasets 428, which is shown in step 440. For example, an older occupant dataset 428 may contain information about the occupant's preferred position values as part of a user identification dataset 424. Deviations of the current occupant dataset 426 from the preferred position values may lead the processor 202 to generate an adjustment signal based on occupant-preferred position values and communicate the adjustment signal to VCS 418, which is shown as steps 568 and 570 in FIG. 27 and is described below.

Figure 24:
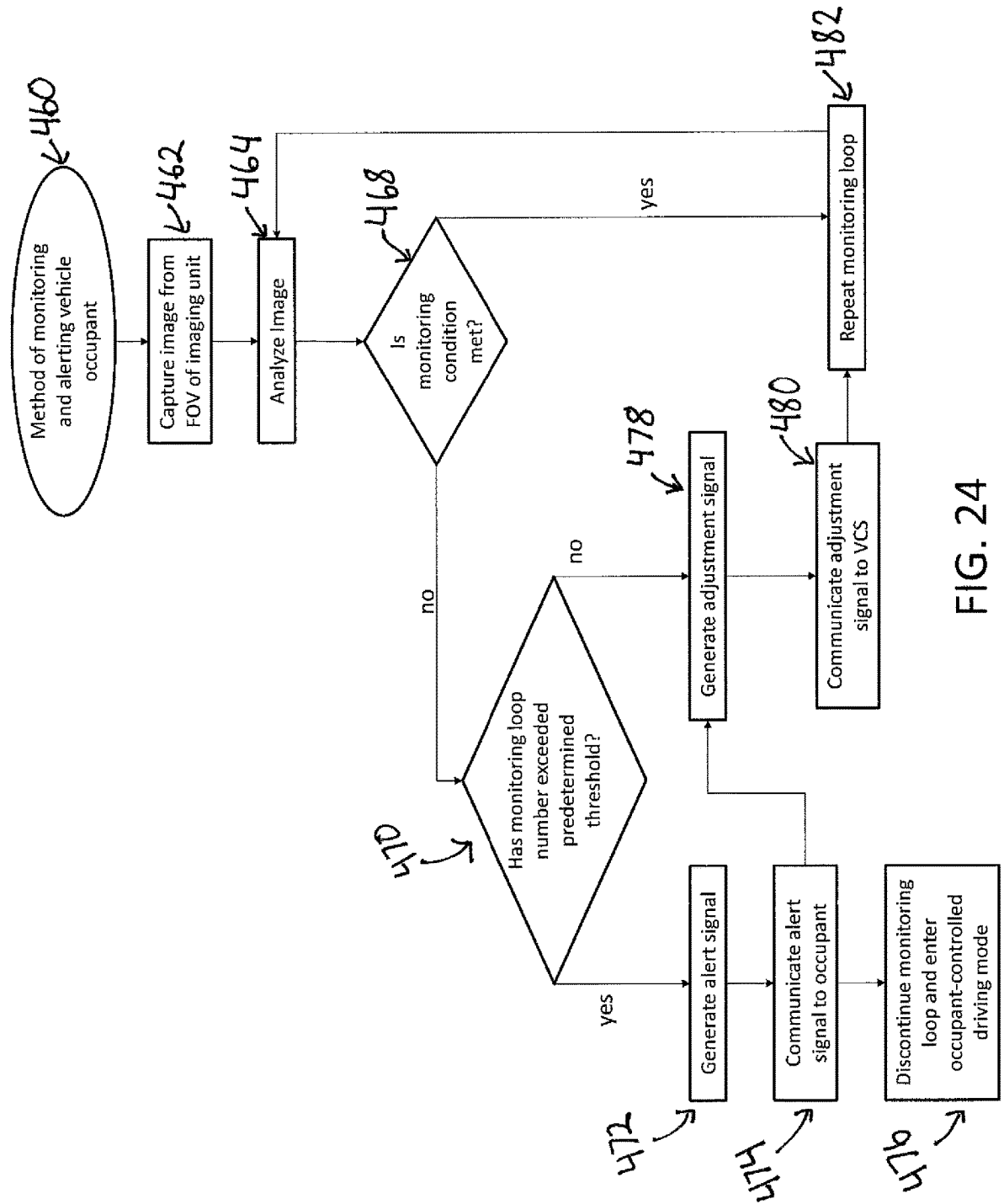
FIG. 24 illustrates a method of monitoring and alerting a vehicle occupant.

FIG. 24 illustrates a method 460 of monitoring and alerting a vehicle occupant. Method 460 begins at step 462 with capturing an image from the field of view of the imaging unit 108. The image is analyzed in step 464, and in step 468 the processor 202 determines if a monitoring condition is met. Steps 462, 464, and 468 of FIG. 24 correspond to steps 404, 406, and 408, respectively, of method 400 shown in FIG. 22. In step 470, the processor 202 determines if the monitoring loop number has exceeded a predetermined threshold. If the monitoring loop number has exceeded a predetermined threshold, an alert signal is generated in step 472 and communicated to an occupant in step 474. Communication to the occupant may include, for example, an audio warning, a light, or a haptic warning. The haptic warning may include, for example, vibration of the occupant's seat, the steering wheel, and/or the seatbelt. After alerting the occupant in step 474, the OMS can either continue adjustment attempts in steps 478, 480, and 482, or discontinue the monitoring and exit the semi-autonomous or autonomous driving mode, which is shown as step 476. In some embodiments, the processor 202 can generate an alert signal based on the capture and analysis of a single image (i.e., without requiring a monitoring loop).

Figure 25:
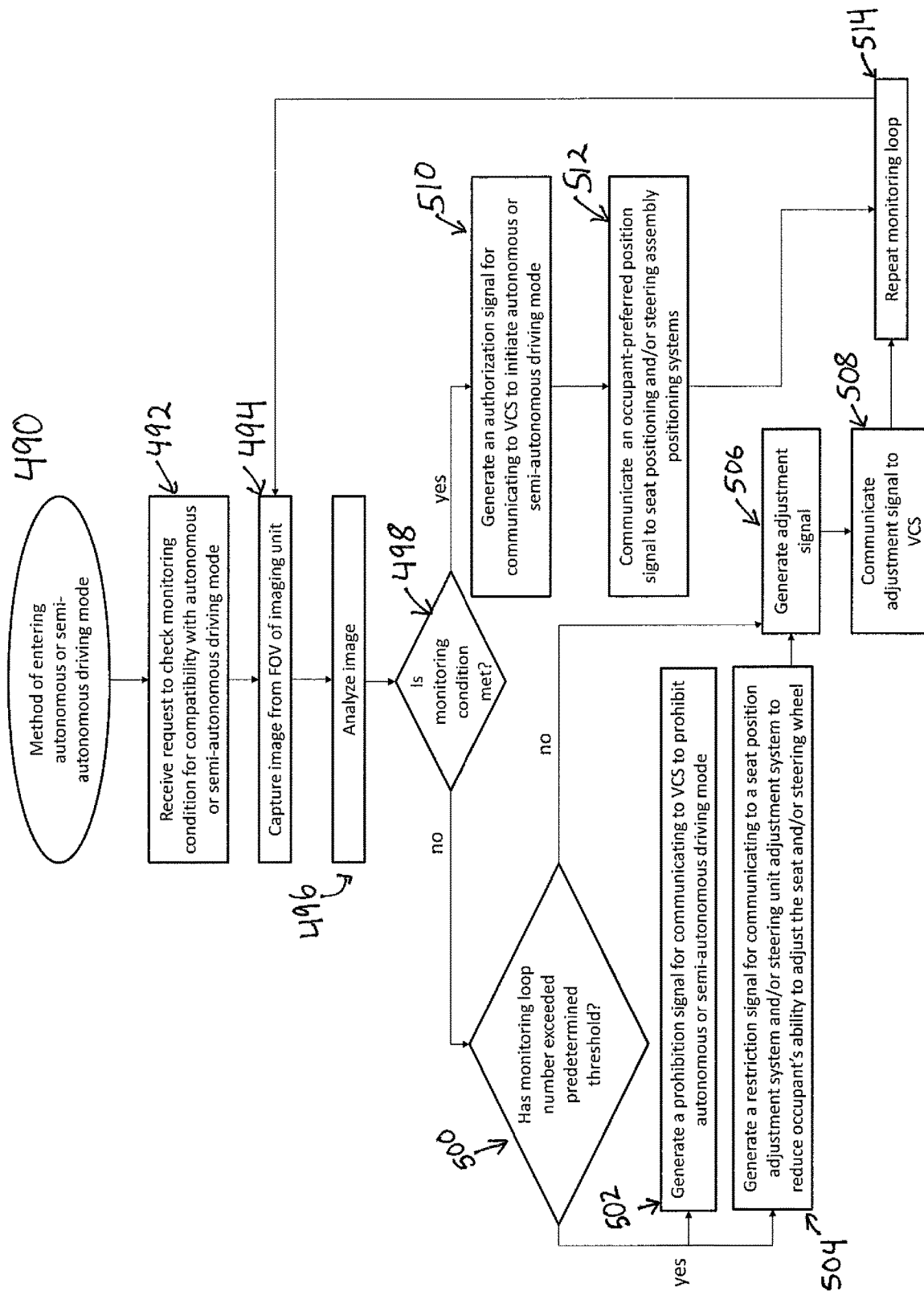
FIG. 25 illustrates a method of entering autonomous or semi-autonomous driving mode.

FIG. 25 illustrates a method 490 of entering semi-autonomous or autonomous driving mode. The method begins at step 492, with the receipt of an external signal in the form of a request to check one or more monitoring conditions for compatibility with semi-autonomous or autonomous driving mode. An image is then captured within the FOV of the imaging unit 108 in step 494 and analyzed in step 496. At step 498, the processor 202 determines if the monitoring condition is met. If the monitoring condition is met, the processor 202 generates an authorization signal to initiate semi-autonomous or autonomous driving mode in step 510 for communicating to the VCS 418. The VCS 418 may be, for example, the semi-autonomous or autonomous driving mode system, or any of the aforementioned vehicle control systems. The processor 202 communicates an occupant-preferred position signal to a VCS 418, such as the seat positioning and/or steering assembly positioning systems, as shown in step 512. The occupant-preferred position signal is associated with the position that the occupant prefers during semi-autonomous or autonomous driving mode. The occupant-preferred position signal causes vehicle control systems 418, such as the seat positioning and/or steering assembly positioning systems, to adjust the seat or steering assembly to their occupant-preferred positions.

Referring still to FIG. 25, the processor 202 takes a separate course if the monitoring condition is not met in step 498. At step 500, the processor 202 determines whether the number of monitoring loop cycles has exceeded a predetermined threshold. If the number of monitoring loop cycles has not surpassed the predetermined threshold, the processor continues making adjustments via the VCS 418, as shown in steps 506 and 508, and repeating the monitoring loop, as shown in step 514, in attempts to meet the monitoring condition. If the number of monitoring loop cycles has surpassed the predetermined threshold, at step 502 the processor 202 generates a prohibition signal for communicating to a VCS 418 such as, for example, the semi-autonomous or autonomous driving system, or any of the aforementioned vehicle control systems. The prohibition signal prohibits the VCS 418 from assuming semi-autonomous or autonomous driving mode. The processor 202 may also generate a restriction signal for communication to a VCS 418, such as the seat positioning and/or the steering assembly positioning systems. The restriction signal may reduce the occupant's ability to adjust the steering assembly and/or the seat position, so that additional attempts to adjust the VCS (steps 506 and 508) are not confounded by the occupant's movements when the monitoring loop is repeated in step 514. In some embodiments, the processor 202 can generate restriction or prohibition signals based on the capture and analysis of a single image (i.e., without requiring a monitoring loop).

Figure 26:
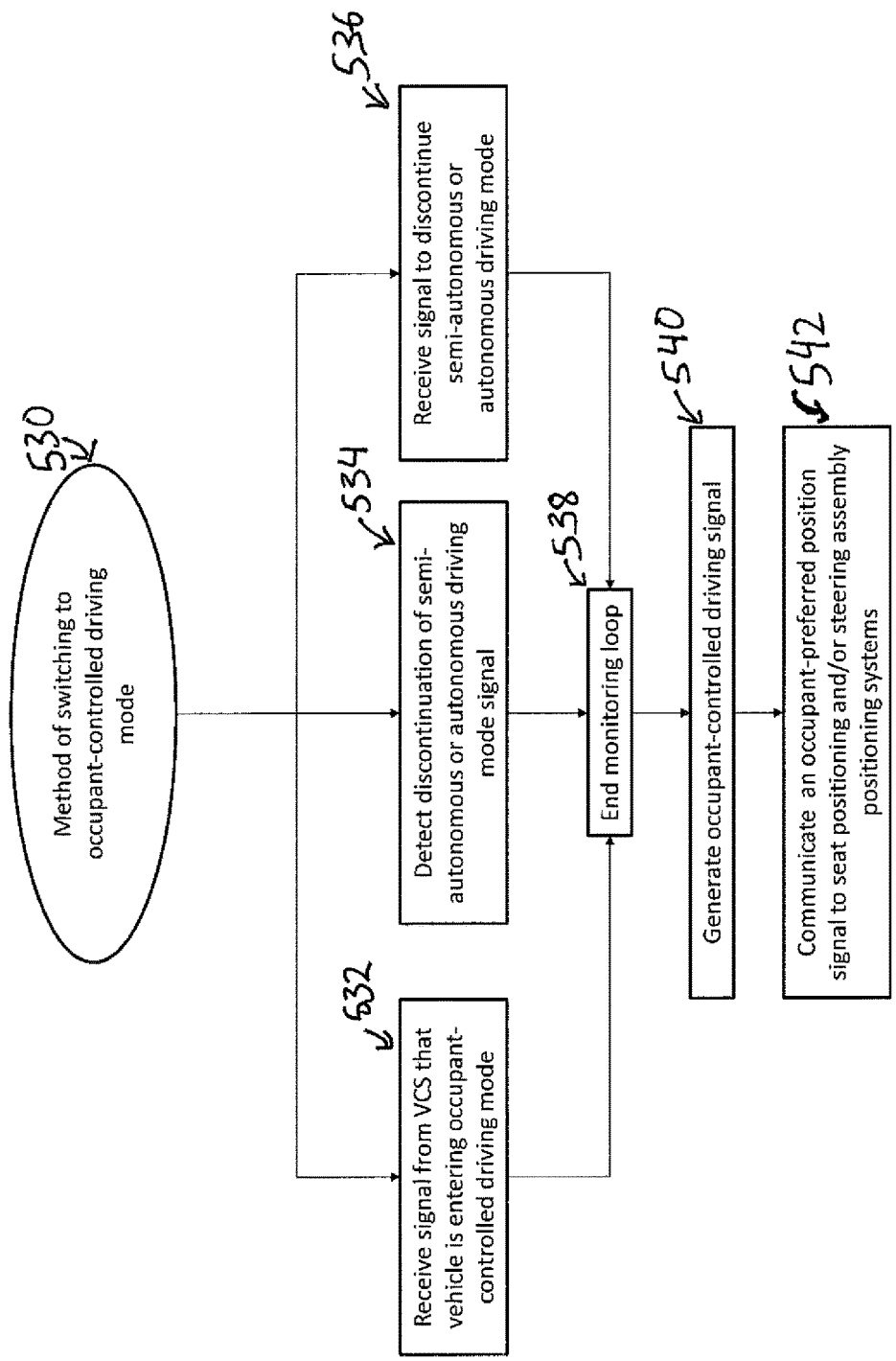
FIG. 26 illustrates a method of switching to occupant-controlled driving mode.

FIG. 26 illustrates a method 530 of switching to an occupant-controlled driving mode. The method 530 may be initiated by any one of three beginning steps 532, 534, or 536. In step 532, the processor 202 receives a signal from a VCS 418 that the vehicle is entering occupant-controlled driving mode. The VCS 418 sending the signal may be, for example, the semi-autonomous or autonomous driving system. Alternatively, or in addition, the processor 202 may detect a discontinuation in a signal that indicates the vehicle is operating in semi-autonomous or autonomous mode, as shown in step 534. Alternatively, or in addition, the processor 202 may receive a signal to discontinue semi-autonomous or autonomous driving mode, as shown in step 536. This signal could come from a VCS 418 or, for example, from a user interface 420 as discussed in detail below. Any of these steps can lead to the cessation of the monitoring loop, as shown in step 538. Then, in step 540, the processor 202 generates an occupant-controlled driving signal. The occupant-controlled driving signal is associated with an occupant-preferred position signal. In step 542, processor 202 retrieves the occupant-preferred position signal associated with the occupant-controlled driving signal and communicates the occupant-preferred position signal to a VCS 418, such as the seat positioning or the steering assembly positioning systems. The VCS 418 then alters the spatial position of one or more occupant-interfacing devices to assume their occupant-preferred positions.

Figure 27:
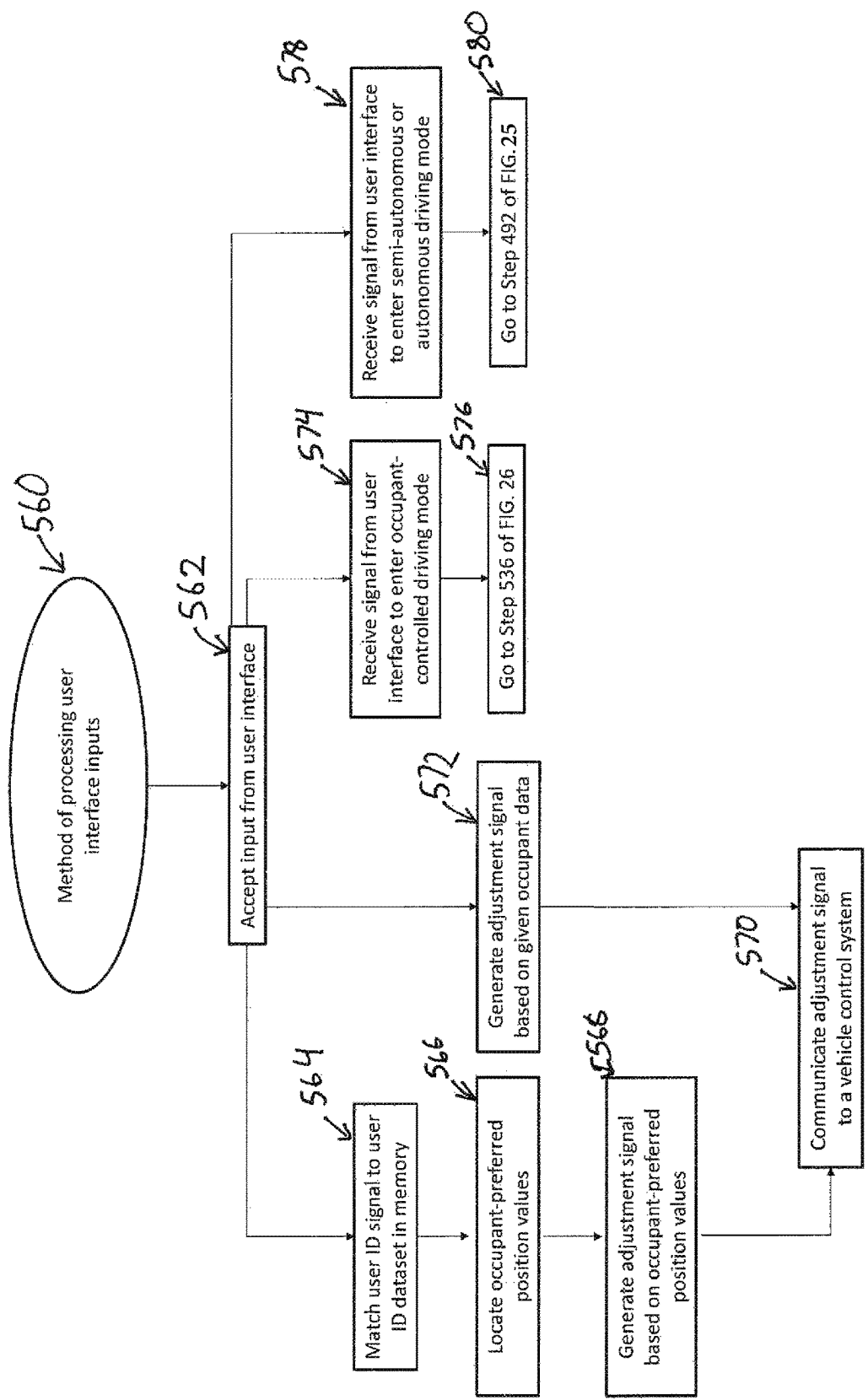
FIG. 27 illustrates a method of processing user interface inputs.

FIG. 27 illustrates a method 560 of processing user interface inputs. The method begins at step 562 with the processor 202 accepting user input from the user interface 420. The user interface may include a screen, a button, a rocker switch, a rotary dial, a joystick, and/or a microphone to accept voice commands, for example. User input may also be accepted via other portions of the vehicle that are configured to receive gestures from the occupant. With gesture sensing, the occupant conveys instructions to the OMS 100 via recognizable touches to the wheel, the column, the center console, the camera, or any other part of the vehicle that can be integrated with the processor. Exemplary gestures sensed include the occupant swiping right on the dashboard to enter semi-autonomous or autonomous driving mode or the occupant making contact with the steering wheel in a particular manner to indicate the desire to enter occupant-controlled driving mode. For example, making contact with the steering wheel may include touching or turning the steering wheel, depending, for example, on whether the wheel is coupled or decoupled from the steering system. Gestures detectable by OMS are not limited to those requiring physically touching a device. Such gestures could include movements of a hand in the free space within a specified region, adjacent to, or in proximity to a physical device (for example, moving hand towards a light control). In some implementations, for example, the steering assembly control system is configured for communicating to the processor 202 the occupant's desire to enter occupant-controlled driving mode. The processor 202 then sends an adjustment signal to the seat positioning system to assume the occupant-controlled driving position.

The user input can, in some embodiments, be used to create a user identification (ID) signal. For example, the user input can be a fingerprint, vasculature images, an audio identifier (such as voice matching or a password), a retinal scan, a haptic signal (such as Morse code or an alternative tapped code), or a numeric and/or alphabetic identification code. However, the user ID signal may also be generated in other ways. For example, an image captured by the imaging unit 108 can be analyzed, a current occupant dataset created, and the current occupant dataset compared to older stored images to identify the occupant. In step 564 of method 560, the user ID signal is matched to a user ID dataset 424 that is stored in the memory 204. The user ID dataset 424 comprises user parameters that are associated with occupants that have previously used the OMS 100. In step 566, the processor 202 accesses occupant-preferred position values that are part of the particular user's ID dataset 424. In step 568, the processor 202 generates an adjustment signal based on the occupant-preferred position values, and in step 570, the processor 202 communicates the adjustment signal to a VCS 418. For example, the processor 202 may communicate the adjustment signal to the seat positioning and/or steering assembly positioning systems.

Alternatively, as shown in step 572, an adjustment signal may be generated based on given user input, such as, for example, the occupant height and/or weight. For example, if an occupant cannot be captured within the FOV of the imaging unit 108, an adjustment signal can be sent to the seat positioning system to raise or lower the seat until the occupant's face and/or other bodily components can be captured. If, for example, the imaging unit 108 is located on the steering column 106, the angle or length of the steering column may be adjusted to properly capture the occupant's face and/or other bodily components within the FOV. In another example, an occupant may manually adjust the seat position during semi-autonomous or autonomous mode to relax. The OMS 100 recognizes that the occupant is no longer within the FOV and adjusts the steering assembly accordingly to bring the imaging unit 108 into a better position to monitor the occupant.

User input may, in some instances, communicate a desire to enter an occupant controlled driving mode, as shown in step 574. In response, in step 576, the processor 202 moves to step 536 of FIG. 26 (receipt of the signal to discontinue semi-autonomous or autonomous driving mode). Alternatively, the user input may communicate a desire to enter the semi-autonomous or autonomous driving mode, as shown in step 578. In response, in step 580, the processor 202 moves to step 492 of FIG. 25. Upon the indication of the desire to enter semi-autonomous or autonomous driving mode, the processor 202 may generate adjustment signals that reflect the occupant's preferred "relax mode" position (e.g., seat reclined, steering assembly slightly retracted) and communicate the signal to the VCS 418. The OMS 100 ensures that the occupant's preferred "relax mode" position continues to enable occupant monitoring and maintains safe positioning with respect to the other elements of the vehicle. In some embodiments, the imaging unit 108 may be equipped with a wide angle lens or independently articulating camera to enable the occupant to relax in a broader region of the vehicle while still being monitored. The wide angle lens or articulating camera may reduce the number of seat or steering assembly adjustments that take place while the occupant is relaxing.

In some implementations, the OMS 100 may be configured to restrict the car from starting unless the monitoring conditions are met.

In some implementations, for example, when the imaging unit 108 is positioned on the steering column, the rotation of the steering wheel can temporarily block the visualization of the occupant. In this scenario, the monitoring loop may be temporarily paused until a clearer view of the occupant is obtainable. Also, in semi-autonomous or autonomous driving mode, a steering wheel that is decoupled from the steering system may be rotated if, for example, a spoke is blocking the camera.

In some implementations, an occupant's position can be updated due to a change in a driving mode, without use of the OMS 100. Such an occupant positioning system integrates a user interface 420 and/or a vehicle control system (VCS) 418 with a processor 202 and the seat and/or steering assembly positioning systems. For example, user input from the user interface 420 and/or signals from the VCS 418 can cause the processor 202 to shift the vehicle into (or out of) autonomous or semi-autonomous driving mode. Upon the receipt of the user request or the VCS 418 generated signal to enter semi-autonomous or autonomous driving mode, the processor 202 may generate signals that reflect the occupant's preferred "relax mode" position (e.g., seat reclined, steering assembly slightly retracted) for semi-autonomous or autonomous driving mode. The occupant-preferred position signal associated with semi-autonomous or autonomous driving mode causes the VCS 418, for example, a steering assembly positioning system and/or a seat positioning system, to shift positions of the steering wheel and/or the seat, respectively, to accommodate the occupant preferred position for semi-autonomous or autonomous driving. Likewise, upon the receipt of the user request or the VCS 418 generated signal to enter occupant controlled driving mode, the processor 202 may generate signals that cause the steering assembly positioning system and/or the seat positioning system to shift positions of the steering wheel and/or seat, respectively, to accommodate the occupant preferred position for occupant controlled driving. The occupant-preferred position signal associated with occupant controlled driving mode causes the VCS 418, for example, a steering assembly positioning system or a seat positioning system, to shift steering assembly or seat positions, respectively, to accommodate the occupant preferred position for occupant controlled driving. While the OMS 100 can be of assistance for ensuring the occupant is also in an optimal position for continued monitoring, it is not necessary to ensure that the steering assembly and/or seat are in the occupant's preferred positions for the given mode of driving.

Figure 28:
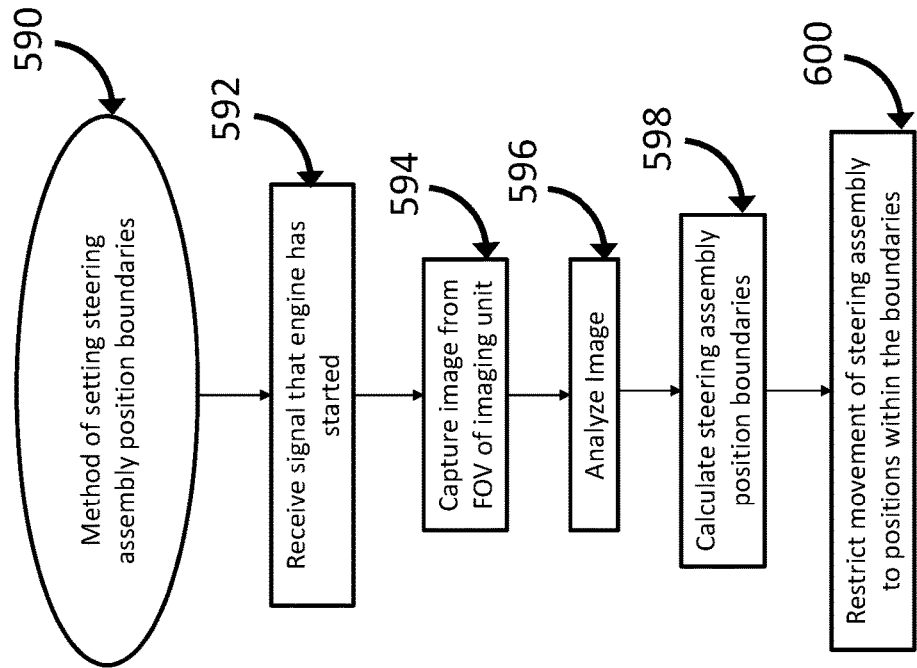
FIG. 28 illustrates a method of setting steering assembly position boundaries.

FIG. 28 illustrates a method 590 of setting boundaries on the position of the steering assembly. In implementations where the imaging unit 108 is positioned on the steering assembly, movement of the steering assembly by the occupant can cause the imaging unit 108 to be in a position that is sub-optimal for monitoring. Method 590 restricts the movement of the steering assembly to positions that enable monitoring conditions to be met. To set boundaries on the steering assembly position, the processor 202 receives the signal that the vehicle engine has started in step 592. In step 594, one or more images are captured from the FOV of the imaging unit 108. In some implementations, the steering assembly may move automatically between captures to acquire images from multiple steering assembly positions (such that the boundary calculation utilizes a number of steering assembly positions). The one or more images are analyzed in 596. In step 598, steering assembly position boundaries are calculated based on the image analysis. In step 600, movement of the steering assembly is restricted to positions within the calculated boundaries. Thus, the occupant cannot manually move the steering assembly to a position that is out of the boundary range. In some implementations, the movement of the steering assembly can be restricted prior to enabling movement of the vehicle.

While the foregoing description and drawings represent the preferred implementation of the present invention, it will be understood that various additions, modifications, combinations and/or substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. One skilled in the art will appreciate that the invention may be used with many modifications of structure, arrangement, proportions, materials, and components and otherwise, used in the practice of the invention, which are particularly adapted to specific environments and operative requirements without departing from the principles of the present invention. In addition, features described herein may be used singularly or in combination with other features. The presently disclosed implementations are, therefore, to be considered in all respects as illustrative and not restrictive, the scope of the invention being indicated by the appended claims and not limited to the foregoing description.

It will be appreciated by those skilled in the art that changes could be made to the implementations described above without departing from the broad inventive concept thereof. It is understood, therefore, that this invention is not limited to the particular implementations disclosed, but it is intended to cover modifications within the spirit and scope of the present invention, as defined by the following claims.

What is claimed is:

1. An occupant monitoring system (OMS) for monitoring a vehicle occupant, the OMS comprising:
   an imaging unit positioned on a steering wheel assembly of a vehicle, the imaging unit having a field of view (FOV) directed towards the vehicle occupant; and
   a processor in communication with the imaging unit, a memory, and one or more vehicle control systems disposed within the vehicle, wherein the processor executes computer-readable instructions stored on the memory, the instructions cause the processor to:

capture, by the imaging unit, one or more first images in the FOV;

calculate steering wheel assembly position boundaries based on the one or more first images, wherein the steering wheel assembly position boundaries define a range of positions of the steering wheel assembly that enable monitoring of the vehicle occupant; and initiate cycling of a monitoring loop upon receipt of a signal from external to the OMS, the monitoring loop comprising:

capturing a second image in the FOV of the imaging unit;

analyzing the second image to determine if a monitoring condition is met, wherein the monitoring condition includes a position of the eyes of the vehicle within an analysis region of the FOV, the analysis region defining a range of acceptable values for the position of the eyes of the vehicle occupant relative to a center of the FOV; and generating an adjustment signal for a seat positioning system or a steering wheel assembly positioning system if the monitoring condition is not met, wherein the adjustment signal includes instructions to adjust the seat positioning system or the steering wheel assembly positioning system such that the eyes of the vehicle occupant are within the range of acceptable values relative to the center of the FOV, wherein movement of the steering wheel assembly is restricted to positions within the steering wheel assembly position boundaries.

2. The occupant monitoring system of claim 1, wherein the OMS is in communication with the seat positioning system and the steering wheel assembly positioning system, and wherein the computer-readable instructions further cause the processor to communicate the adjustment signal to the seat positioning system and the steering wheel assembly positioning system.

3. The occupant monitoring system of claim 1, wherein the adjustment signal comprises information about a seat height, a seat angle, a seat proximity to the imaging unit, or a combination thereof.

4. The occupant monitoring system of claim 1, wherein the adjustment signal comprises information about a steering column angle, a steering column length, or a steering wheel angle.

5. The occupant monitoring system of claim 1, wherein the imaging unit is positioned on a steering wheel, on a steering wheel column, or on a dashboard of the vehicle.

6. The occupant monitoring system of claim 1, wherein the computer-readable instructions further cause the processor to repeat the monitoring loop.

7. The occupant monitoring system of claim 1, wherein the monitoring condition further comprises at least one of the following criteria: presence of the vehicle occupant in the FOV, a position of the vehicle occupant within the FOV, a proximity of the vehicle occupant to the imaging unit, an angle of the face of the vehicle occupant, or an orientation of the eyes of the vehicle occupant within the FOV.

8. The occupant monitoring system of claim 1, wherein the signal from external to the OMS is a request to check the monitoring condition for compatibility with a semi-autonomous or autonomous driving mode.

9. The occupant monitoring system of claim 8, wherein if the monitoring condition is met, the computer-readable instructions further cause the processor to:

generate an authorization signal for communicating to one or more of the one or more vehicle control systems to initiate the semi-autonomous or autonomous driving mode if the monitoring condition is met.

10. A positioning system for updating an occupant position based on a change in a driving mode, the positioning system comprising:

an imaging unit positioned on a steering wheel assembly of a vehicle, the imaging unit having a field of view (FOV) directed towards a vehicle occupant; and a processor in communication with a memory, a user interface, or one or more vehicle control systems disposed within the vehicle, wherein the processor executes computer-readable instructions stored on the memory upon receipt of an external signal indicating that the vehicle is entering either an occupant-controlled driving mode or a semi-autonomous or autonomous driving mode, the computer-readable instructions causing the processor to:

capture, by the imaging unit, one or more first images in the FOV;

calculate steering wheel assembly position boundaries based on the one or more first images, wherein the steering wheel assembly position boundaries define a range of positions of the steering wheel assembly that enable monitoring of the vehicle occupant;

generate a position signal for communicating to a seat positioning system or a steering assembly positioning system, wherein the position signal causes the seat positioning system or the steering assembly positioning system to adjust a seat or the steering wheel assembly, respectively, to a predetermined occupant preferred position, capture, by the imaging unit, a second image in the FOV;

analyze the second image to determine if a monitoring condition is met, where the monitoring condition includes a position of the eyes of the vehicle occupant within an analysis region of the FOV, the analysis region defining a range of acceptable values for the position of the eyes of the vehicle occupant relative to a center of the FOV; and generate an adjustment signal for the seat positioning system or the steering positioning system if the monitoring condition is not met, wherein the adjustment signal includes instructions to adjust the seat positioning system or the steering assembly positioning system such that the eyes of the vehicle occupant are within the range of acceptable values relative to the center of the FOV, wherein movement of the steering wheel assembly is restricted to positions within the steering wheel assembly position boundaries.

11. The positioning system of claim 10, wherein the external signal indicates that the vehicle is entering the semi-autonomous or autonomous driving mode, wherein the position signal is an occupant-preferred position signal for the semi-autonomous or autonomous driving mode, and wherein the predetermined occupant preferred position is the occupant-preferred position for the semi-autonomous or autonomous driving mode.

12. The positioning system of claim 10, wherein the signal from external to the OMS indicates that the vehicle is entering an occupant controlled driving mode, the position signal is an occupant preferred position signal for the occupant-controlled driving mode, and the predetermined occupant preferred position is the occupant-preferred position for the occupant controlled driving mode.

13. The positioning system of claim 10, wherein the external signal is generated by a user input.

14. The positioning system of claim 10, wherein the external signal is generated by the seat positioning system or the steering positioning system.

15. An occupant monitoring system (OMS) for monitoring at least ono a vehicle occupant, the OMS comprising:
- an imaging unit positioned on a steering wheel assembly of a vehicle, the imaging unit having a field of view (FOV) directed towards the vehicle occupant, and
- a processor in communication with the imaging unit, a memory, a seat positioning system and a steering assembly positioning system disposed within the vehicle, wherein the processor executes computer-readable instructions stored on the memory, wherein upon receipt of a signal from external to the OMS by the processor, the instructions cause the processor to:
- capture, by the imaging unit, one or more first images in the FOV;
- calculate steering wheel assembly position boundaries based on the one or more first images, wherein the steering wheel assembly position boundaries define a range of positions of the steering wheel assembly that enable monitoring of the vehicle occupant;
- capture, by the imaging unit, a second image in the FOV;
- analyze the second image to determine if a monitoring condition is met, where the monitoring condition includes a position of the eyes of the vehicle occupant within an analysis region of the FOV, the analysis region defining a range of acceptable values for the position of the eyes of the vehicle occupant relative to a center of the FOV; and
- if the monitoring condition is not met, generate an adjustment signal for the seat positioning system or the steering assembly positioning system, where the adjustment signal includes instructions to adjust the seat positioning system or the steering assembly positioning system such that the eyes of the vehicle occupant are within the range of acceptable values relative to the center of the FOV, wherein movement of the steering wheel assembly is restricted to positions within the steering wheel assembly position boundaries.

16. The occupant monitoring system of claim 15, wherein the computer-readable instructions further cause the processor to:
- generate an occupant dataset based on the captured image, wherein data of the occupant dataset comprises at least one value pertaining to a presence of the vehicle occupant in the FOV, a position of the vehicle occupant within the FOV, a proximity of the vehicle occupant to the imaging unit, an angle of the face of the vehicle occupant, a position of a bodily component, an area of a bodily component, an angle of the bodily component, or an orientation of the eyes of the vehicle occupant within the FOV.

17. The occupant monitoring system of claim 16, wherein the computer-readable instructions further cause the processor to:
- compare the occupant dataset to a monitoring conditions dataset, and
- generate the adjustment signal for communicating to the the seat positioning system or the steering assembly positioning system based on deviations of the occupant dataset from the monitoring conditions dataset.

18. The occupant monitoring system of claim 15, wherein if the monitoring condition is not met, the computer-readable instructions further cause the processor to:
- generate a prohibition signal for communicating to a vehicle control system to prohibit a semi-autonomous or autonomous driving mode.

19. The occupant monitoring system of claim 1, wherein the one or more first images comprise at least two images, wherein the computer-readable instructions further cause the processor to:
- generate second adjustment signals for the steering wheel assembly to cause the steering wheel assembly to move from a first position to a second position between capturing a first image of the at least two images and a second image of the at least two images.

* * * * *